United States Patent
Hatambeiki

(12) 
(10) Patent No.: US 12,307,884 B2
(45) Date of Patent: *May 20, 2025

(54) SYSTEMS AND METHODS FOR ASSOCIATING SERVICES AND/OR DEVICES WITH A VOICE ASSISTANT

(71) Applicant: Universal Electronics Inc., Scottsdale, AZ (US)

(72) Inventor: Arsham Hatambeiki, San Francisco, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,065

(22) Filed: Jul. 27, 2023

(65) Prior Publication Data

US 2023/0368653 A1 Nov. 16, 2023

Related U.S. Application Data

(63) Continuation of application No. 17/673,145, filed on Feb. 16, 2022, now Pat. No. 11,756,412, which is a (Continued)

(51) Int. Cl.
*G08C 17/02* (2006.01)
*G08C 23/04* (2006.01)
(Continued)

(52) U.S. Cl.
CPC ............. *G08C 17/02* (2013.01); *G08C 23/04* (2013.01); *H04N 21/42226* (2013.01); (Continued)

(58) Field of Classification Search
CPC .... G08C 17/02; G08C 23/04; G08C 2201/20; G08C 2201/30; G08C 2201/40; (Continued)

(56) References Cited

U.S. PATENT DOCUMENTS 4,626,848 A 12/1986 Ehlers
4,703,359 A 10/1987 Rumbolt
(Continued)

FOREIGN PATENT DOCUMENTS

CN 103179208 A 6/2013
CN 103685746 A 3/2014
(Continued)

OTHER PUBLICATIONS

"Data Formats for IR Remote Controls," Vishay Semiconductors, Document No. 80071, Rev. A2, {Aug. 27, 2003), 5 pp.
(Continued)

*Primary Examiner* — Adnan Aziz
(74) *Attorney, Agent, or Firm* — Greenberg Traurig, LLP

(57) ABSTRACT

A password less login using a smart device is caused to retrieve from a cloud-server a one-time use code. The smart device is associated with a virtual user account to control a plurality of controllable devices with a device app installed on a smart device. The one-time use code is provided to a controllable device and the controllable device is caused to provide the one-time use code back to the smart device. The app causes the one-time use code provided back to the smart device by the controllable device to be authenticated. In response to the one-time use code being authenticated, the controllable device is bound to the app whereupon the controllable device is controllable through use of the app.

8 Claims, 25 Drawing Sheets

Related U.S. Application Data continuation-in-part of application No. 17/552,361, filed on Dec. 16, 2021, now Pat. No. 11,792,185, which is a continuation-in-part of application No. 17/137,960, filed on Dec. 30, 2020, now Pat. No. 11,700,412, said application No. 17/673,145 is a continuation of application No. 16/778,241, filed on Jan. 31, 2020, now Pat. No. 11,113,954, and a continuation-in-part of application No. 16/717,546, filed on Dec. 17, 2019, now Pat. No. 11,451,618, said application No. 16/778,241 is a continuation of application No. 16/199,463, filed on Nov. 26, 2018, now Pat. No. 10,937,306, which is a continuation of application No. 15/900,342, filed on Feb. 20, 2018, now Pat. No. 10,922,958, which is a continuation of application No. 15/789,547, filed on Oct. 20, 2017, now Pat. No. 10,325,486, which is a continuation of application No. 15/259,847, filed on Sep. 8, 2016, now Pat. No. 9,842,492, which is a continuation of application No. 14/136,023, filed on Dec. 20, 2013, now Pat. No. 9,449,500, which is a continuation-in-part of application No. 13/899,671, filed on May 22, 2013, now Pat. No. 9,437,105, which is a continuation of application No. 13/657,176, filed on Oct. 22, 2012, now Pat. No. 9,215,394.

(60) Provisional application No. 62/956,478, filed on Jan. 2, 2020, provisional application No. 62/789,857, filed on Jan. 8, 2019, provisional application No. 61/680,876, filed on Aug. 8, 2012, provisional application No. 61/552,857, filed on Oct. 28, 2011.

(51) Int. Cl.
*H04N 21/422* (2011.01)
*H04N 21/4363* (2011.01)

(52) U.S. Cl.
CPC ..... *G08C 2201/20* (2013.01); *G08C 2201/30* (2013.01); *G08C 2201/40* (2013.01); *G08C 2201/70* (2013.01); *G08C 2201/92* (2013.01); *G08C 2201/93* (2013.01); *H04N 21/42225* (2013.01); *H04N 21/4363* (2013.01)

(58) Field of Classification Search
CPC ............ G08C 2201/70; G08C 2201/92; G08C 2201/93; G06F 9/44526; G06F 8/61; G06F 3/167; G05B 2219/2642; G05B 15/02; H04N 21/42227; H04N 21/4367; H04N 21/44218; H04N 21/42225; H04N 21/442203; H04N 21/42226; H04N 21/4363; H04N 21/43615; H04L 67/10; H04L 67/125; H04L 63/0838; H04W 12/48; H04W 12/55
See application file for complete search history.

(56) References Cited

U.S. PATENT DOCUMENTS

| | | |
|---|---|---|
| 4,746,919 A | 5/1988 | Reitmeier |
| 4,959,810 A | 9/1990 | Darbee |
| 4,998,292 A | 3/1991 | Eigeldinger |
| 5,255,313 A | 10/1993 | Darbee |
| 5,341,166 A | 8/1994 | Garr |
| 5,410,326 A | 4/1995 | Goldstein |
| 5,452,291 A | 9/1995 | Eisenhandler |
| 5,481,256 A | 1/1996 | Darbee |
| 5,519,457 A | 5/1996 | Nishigaki |
| 5,537,104 A | 7/1996 | Van Dort |
| 5,552,917 A | 9/1996 | Darbee |
| 5,614,906 A | 3/1997 | Hayes |
| 5,689,663 A | 11/1997 | Williams |
| 5,726,645 A | 3/1998 | Kamon |
| 5,835,156 A | 11/1998 | Blonstein |
| 5,839,097 A | 11/1998 | Klausner |
| 5,889,506 A | 3/1999 | Lopresti |
| 5,909,183 A | 6/1999 | Borgstahl |
| 5,949,351 A | 9/1999 | Hahm |
| 5,959,539 A | 9/1999 | Adolph |
| 5,959,751 A | 9/1999 | Darbee |
| 5,990,884 A | 11/1999 | Douma |
| 6,005,490 A | 12/1999 | Higashihara |
| 6,008,735 A | 12/1999 | Chiloyan |
| 6,014,092 A | 1/2000 | Darbee |
| 6,097,441 A | 8/2000 | Allport |
| 6,127,961 A | 10/2000 | Stacy |
| 6,133,847 A | 10/2000 | Yang |
| 6,148,241 A | 11/2000 | Ludtke |
| 6,157,319 A | 12/2000 | Johns |
| 6,160,491 A | 12/2000 | Kitao |
| 6,177,931 B1 | 1/2001 | Alexander |
| 6,208,341 B1 | 3/2001 | Van Ee |
| 6,208,384 B1 | 3/2001 | Schultheiss |
| 6,211,870 B1 | 4/2001 | Foster |
| 6,259,892 B1 | 7/2001 | Helferich |
| 6,344,817 B1 | 2/2002 | Verzulli |
| 6,473,099 B1 | 10/2002 | Goldman |
| 6,529,556 B1 | 3/2003 | Perdue |
| 6,567,011 B1 | 5/2003 | Young |
| 6,597,374 B1 | 7/2003 | Baker |
| 6,633,281 B2 | 10/2003 | Lin |
| 6,650,248 B1 | 11/2003 | O'Donnell |
| 6,665,020 B1 | 12/2003 | Stahl |
| 6,690,392 B1 | 2/2004 | Wugoski |
| 6,724,339 B2 | 4/2004 | Conway |
| 6,748,278 B1 | 6/2004 | Maymudes |
| 6,781,518 B1 | 8/2004 | Hayes |
| 6,791,467 B1 | 9/2004 | Yuval |
| 6,795,130 B2 | 9/2004 | Shibamiya |
| 6,826,699 B1 | 11/2004 | Sun |
| 6,850,252 B1 | 2/2005 | Hoffberg |
| 6,909,378 B1 | 6/2005 | Lambrechts |
| 6,940,562 B2 | 9/2005 | Sato |
| 6,947,101 B2 | 9/2005 | Arling |
| 6,968,399 B2 | 11/2005 | Noda |
| 6,971,072 B1 | 11/2005 | Stein |
| 6,980,150 B2 | 12/2005 | Conway, Jr. |
| 7,013,434 B2 | 3/2006 | Masters |
| 7,046,161 B2 | 5/2006 | Hayes |
| 7,136,709 B2 | 11/2006 | Arling et al. |
| 7,154,566 B2 | 12/2006 | Gustafson |
| 7,254,777 B2 | 8/2007 | Hayes |
| 7,259,696 B2 | 8/2007 | Lee |
| 7,271,732 B2 | 9/2007 | Harada |
| 7,375,673 B2 | 5/2008 | Spilo |
| 7,379,778 B2 | 5/2008 | Hayes |
| 7,429,932 B1 | 9/2008 | Newell |
| 7,436,346 B2 | 10/2008 | Walter |
| 7,519,393 B2 | 4/2009 | Bahl |
| 7,554,614 B2 | 6/2009 | Satou |
| 7,562,128 B1 | 7/2009 | Caris |
| 7,589,642 B1 | 9/2009 | Mui |
| 7,671,758 B1 | 3/2010 | Seidel |
| 7,768,421 B2 | 8/2010 | Suzuki |
| 7,827,319 B2 | 11/2010 | Kimura |
| 7,831,930 B2 | 11/2010 | Dresti |
| 7,907,222 B2 | 3/2011 | Haughawout |
| 7,936,287 B1 | 5/2011 | Lee |
| 7,944,370 B1 | 5/2011 | Harris |
| 7,969,514 B2 | 6/2011 | Haughawout et al. |
| 8,040,888 B1 | 10/2011 | Macadam |
| 8,068,184 B2 | 11/2011 | Hicks |
| 8,098,337 B2 | 1/2012 | Martch |
| 8,132,105 B1 | 3/2012 | Dubil |
| 8,179,404 B2 | 5/2012 | Nagatomo |
| 8,189,120 B2 | 5/2012 | Doyle |
| 8,199,258 B2 | 6/2012 | Tokoro |
| 8,200,582 B1* | 6/2012 | Zhu ............ G06Q 20/382 705/64 |

(56) References Cited

U.S. PATENT DOCUMENTS

| | | |
|---|---|---|
| 8,203,436 B2 | 6/2012 | Ikeda |
| 8,260,975 B1 | 9/2012 | Schanin |
| 8,269,892 B2 | 9/2012 | Asada |
| 8,342,915 B1 | 1/2013 | Vogel |
| 8,373,556 B2 | 2/2013 | Lalonde |
| 8,429,713 B2 | 4/2013 | Candelore |
| 8,477,179 B2 | 7/2013 | Tatsuta |
| 8,508,401 B1 | 8/2013 | Patel |
| 8,509,400 B2 | 8/2013 | Liu |
| 8,525,938 B2 | 9/2013 | Haughawout |
| 8,633,986 B1 | 1/2014 | Hughes |
| 8,704,698 B2 | 4/2014 | Park |
| 8,810,732 B1 | 8/2014 | Bozarth |
| 8,839,334 B2 | 9/2014 | Lee |
| 8,854,192 B1 | 10/2014 | Harris |
| 8,854,556 B2 | 10/2014 | Haughawout |
| 8,881,205 B2 | 11/2014 | Friedman |
| 8,995,981 B1 | 3/2015 | Aginsky |
| 9,019,435 B2 | 4/2015 | Barnett et al. |
| 9,047,761 B2 | 6/2015 | Haughawout |
| 9,088,663 B2 | 7/2015 | Arling |
| 9,098,868 B1 | 8/2015 | Issa |
| 9,123,236 B2 | 9/2015 | Haughawout |
| 9,239,837 B2 | 1/2016 | Chardon |
| 9,350,850 B2 | 5/2016 | Pope |
| 9,380,250 B2 | 6/2016 | Barnett |
| 9,451,306 B2 | 9/2016 | Sarukkai |
| 9,489,835 B2 | 11/2016 | Haughawout |
| 9,554,061 B1 | 1/2017 | Proctor, Jr. |
| 9,599,981 B2 | 3/2017 | Crabtree |
| 9,648,358 B2 | 5/2017 | Ellis |
| 9,792,133 B2 | 11/2017 | Lee et al. |
| 9,852,615 B2 | 12/2017 | Perez |
| 9,978,263 B2 | 5/2018 | Haughawout |
| 10,074,364 B1 | 9/2018 | Wightman |
| 10,217,352 B2 | 2/2019 | Arling |
| 10,397,749 B1 | 8/2019 | Barua |
| 10,553,106 B2 | 2/2020 | Jeon |
| 10,593,196 B2 | 3/2020 | Arling |
| 10,600,317 B2 | 3/2020 | Haughawout |
| 10,902,716 B2 | 1/2021 | Perez |
| 11,006,165 B2 | 5/2021 | Barnett |
| 11,398,148 B2 | 7/2022 | Perez |
| 11,405,677 B2 | 8/2022 | Barnett |
| 11,716,458 B2 | 8/2023 | Marino |
| 2001/0005197 A1 | 6/2001 | Mishra |
| 2001/0043145 A1 | 11/2001 | James, Jr. |
| 2002/0124249 A1 | 9/2002 | Shintani |
| 2002/0140569 A1 | 10/2002 | Van Ee |
| 2002/0158771 A1 | 10/2002 | Mears |
| 2002/0174270 A1 | 11/2002 | Stecyk |
| 2002/0194299 A1 | 12/2002 | Yasaki |
| 2002/0194596 A1 | 12/2002 | Srivastava |
| 2003/0028761 A1 | 2/2003 | Platt |
| 2003/0095156 A1 | 5/2003 | Klein |
| 2003/0095211 A1 | 5/2003 | Nakajima |
| 2003/0103088 A1 | 6/2003 | Dresti |
| 2003/0115599 A1 | 6/2003 | Bennington |
| 2003/0122698 A1 | 7/2003 | Horie |
| 2003/0141987 A1 | 7/2003 | Hayes |
| 2003/0163542 A1 | 8/2003 | Bulthuis |
| 2003/0189509 A1 | 10/2003 | Hayes |
| 2004/0010327 A1 | 1/2004 | Terashima |
| 2004/0056789 A1 | 3/2004 | Arling |
| 2004/0070491 A1 | 4/2004 | Huang |
| 2004/0075602 A1 | 4/2004 | Griesau |
| 2004/0078822 A1 | 4/2004 | Breen |
| 2004/0113892 A1 | 6/2004 | Mears |
| 2004/0143847 A1 | 7/2004 | Suzuki |
| 2004/0148632 A1 | 7/2004 | Park |
| 2004/0163073 A1 | 8/2004 | Krzyzanowski |
| 2004/0203387 A1 | 10/2004 | Grannan |
| 2004/0207535 A1 | 10/2004 | Stevenson |
| 2004/0210933 A1 | 10/2004 | Dresti |
| 2004/0228605 A1 | 11/2004 | Quan |
| 2004/0235463 A1 | 11/2004 | Patel |
| 2004/0255329 A1 | 12/2004 | Compton |
| 2004/0257239 A1 | 12/2004 | Griesau |
| 2004/0266419 A1 | 12/2004 | Arling |
| 2005/0028208 A1 | 2/2005 | Ellis |
| 2005/0052423 A1 | 3/2005 | Harris et al. |
| 2005/0068222 A1 | 3/2005 | Krzyzanowski |
| 2005/0076153 A1 | 4/2005 | Nedellec |
| 2005/0097618 A1 | 5/2005 | Arling |
| 2005/0110651 A1 | 5/2005 | Martis |
| 2005/0151726 A1 | 7/2005 | Wouters |
| 2005/0154787 A1 | 7/2005 | Cochran |
| 2005/0159823 A1 | 7/2005 | Hayes |
| 2005/0160468 A1 | 7/2005 | Rodriguez |
| 2005/0195823 A1 | 9/2005 | Chen |
| 2005/0210498 A1 | 9/2005 | Scott, III |
| 2005/0220194 A1 | 10/2005 | Compton |
| 2005/0221792 A1 | 10/2005 | Mattisson |
| 2005/0243057 A1 | 11/2005 | Sugiyama |
| 2005/0273817 A1 | 12/2005 | Rodriguez |
| 2006/0007015 A1 | 1/2006 | Krzyzanowski |
| 2006/0044175 A1 | 3/2006 | Choi |
| 2006/0080408 A1 | 4/2006 | Istvan |
| 2006/0080707 A1 | 4/2006 | Laksono |
| 2006/0095401 A1 | 5/2006 | Krikorian |
| 2006/0095596 A1 | 5/2006 | Yung |
| 2006/0146184 A1 | 7/2006 | Gillard |
| 2006/0150123 A1 | 7/2006 | Goodwin et al. |
| 2006/0156109 A1 | 7/2006 | Kojima |
| 2006/0168618 A1 | 7/2006 | Choi |
| 2006/0197753 A1 | 9/2006 | Hotelling |
| 2006/0200538 A1 | 9/2006 | Yuh |
| 2006/0227032 A1 | 10/2006 | Alberto |
| 2006/0245725 A1 | 11/2006 | Lim |
| 2006/0263091 A1 | 11/2006 | Shimizu |
| 2006/0271997 A1 | 11/2006 | Jacoby |
| 2007/0052547 A1 | 3/2007 | Haughawout |
| 2007/0063860 A1 | 3/2007 | Escobosa |
| 2007/0063862 A1 | 3/2007 | Lippincott |
| 2007/0130607 A1 | 6/2007 | Thissen |
| 2007/0165555 A1 | 7/2007 | Deng |
| 2007/0220150 A1 | 9/2007 | Garg |
| 2007/0225828 A1 | 9/2007 | Huang |
| 2007/0229465 A1 | 10/2007 | Sakai |
| 2007/0268360 A1 | 11/2007 | Ahlgren |
| 2007/0288610 A1 | 12/2007 | Saint Clair |
| 2007/0288932 A1 | 12/2007 | Horvitz |
| 2007/0292135 A1 | 12/2007 | Guo |
| 2008/0004954 A1 | 1/2008 | Horvitz |
| 2008/0005764 A1 | 1/2008 | Arling |
| 2008/0007616 A1 | 1/2008 | Baladhandayuthapani |
| 2008/0044006 A1 | 2/2008 | Kitagawa |
| 2008/0046219 A1 | 2/2008 | Carmi |
| 2008/0098426 A1 | 4/2008 | Candelore |
| 2008/0098464 A1* | 4/2008 | Mizrah .......... G06F 21/36 726/5 |
| 2008/0120673 A1 | 5/2008 | Dong |
| 2008/0126591 A1 | 5/2008 | Kwon |
| 2008/0134237 A1 | 6/2008 | Tu et al. |
| 2008/0139181 A1 | 6/2008 | Lokshin |
| 2008/0141316 A1 | 6/2008 | Igoe |
| 2008/0155071 A1 | 6/2008 | Lindstrom |
| 2008/0168519 A1 | 7/2008 | Rao |
| 2008/0187028 A1 | 8/2008 | Lida |
| 2008/0195857 A1 | 8/2008 | Douillet |
| 2008/0221715 A1 | 9/2008 | Krzyzanowski |
| 2008/0231762 A1 | 9/2008 | Hardacker |
| 2008/0244097 A1 | 10/2008 | Candelore et al. |
| 2008/0247544 A1 | 10/2008 | Candelore |
| 2008/0278567 A1 | 11/2008 | Nakajima |
| 2008/0319852 A1 | 12/2008 | Gardner |
| 2008/0320531 A1 | 12/2008 | Kim |
| 2008/0320542 A1 | 12/2008 | Guzman |
| 2009/0015723 A1 | 1/2009 | Doumuki |
| 2009/0031419 A1 | 1/2009 | Laksono |
| 2009/0040091 A1 | 2/2009 | Carlson |
| 2009/0051824 A1 | 2/2009 | Satou |
| 2009/0079813 A1 | 3/2009 | Hildreth |
| 2009/0092397 A1 | 4/2009 | Taguchi |

(56) References Cited

U.S. PATENT DOCUMENTS

| | | |
|---|---|---|
| 2009/0094645 A1 | 4/2009 | Ting |
| 2009/0106785 A1 | 4/2009 | Pharn |
| 2009/0113478 A1 | 4/2009 | Haughawout |
| 2009/0115723 A1 | 5/2009 | Henty |
| 2009/0121905 A1 | 5/2009 | Griffin, Jr. |
| 2009/0156051 A1 | 6/2009 | Doyle |
| 2009/0156251 A1 | 6/2009 | Cannistraro |
| 2009/0157198 A1 | 6/2009 | Morikawa |
| 2009/0167555 A1 | 7/2009 | Kohanek |
| 2009/0172746 A1 | 7/2009 | Aldrey |
| 2009/0195407 A1 | 8/2009 | Nakano et al. |
| 2009/0207039 A1 | 8/2009 | Haijima |
| 2009/0239587 A1 | 9/2009 | Negron |
| 2009/0248909 A1 | 10/2009 | Hironaka |
| 2009/0254500 A1 | 10/2009 | Stecyk |
| 2009/0254778 A1 | 10/2009 | Huang |
| 2009/0265163 A1 | 10/2009 | Lehmann et al. |
| 2009/0284656 A1 | 11/2009 | Suzuki |
| 2009/0289829 A1 | 11/2009 | Maier |
| 2009/0296731 A1 | 12/2009 | Lida |
| 2009/0298535 A1 | 12/2009 | Klein |
| 2010/0013998 A1 | 1/2010 | Mortensen |
| 2010/0014834 A1 | 1/2010 | Flynn |
| 2010/0034522 A1 | 2/2010 | Ng |
| 2010/0037264 A1 | 2/2010 | Hardacker |
| 2010/0039282 A1 | 2/2010 | Hostage |
| 2010/0043046 A1 | 2/2010 | Sen |
| 2010/0052843 A1 | 3/2010 | Cannistraro |
| 2010/0079682 A1 | 4/2010 | Martch |
| 2010/0118193 A1 | 5/2010 | Boyden et al. |
| 2010/0131682 A1 | 5/2010 | Huang |
| 2010/0134317 A1 | 6/2010 | Breuil |
| 2010/0135279 A1 | 6/2010 | Petersson |
| 2010/0138764 A1 | 6/2010 | Hatambeiki |
| 2010/0149017 A1 | 6/2010 | Besshi |
| 2010/0153990 A1 | 6/2010 | Ress |
| 2010/0157169 A1 | 6/2010 | Yoshida |
| 2010/0177245 A1 | 7/2010 | Ohnuma |
| 2010/0182236 A1 | 7/2010 | Pryor |
| 2010/0194983 A1 | 8/2010 | Iguchi |
| 2010/0228611 A1 | 9/2010 | Shenfield |
| 2010/0271560 A1 | 10/2010 | Higuchi |
| 2010/0296558 A1 | 11/2010 | Matsushita |
| 2010/0315279 A1 | 12/2010 | Hamai |
| 2010/0328547 A1 | 12/2010 | Mayorga |
| 2011/0074591 A1 | 3/2011 | Arling |
| 2011/0102230 A1 | 5/2011 | Vergis |
| 2011/0122317 A1 | 5/2011 | Chen |
| 2011/0125301 A1 | 5/2011 | Inoue |
| 2011/0138327 A1 | 6/2011 | Scott |
| 2011/0142059 A1 | 6/2011 | Bedingfield, Sr. |
| 2011/0156944 A1 | 6/2011 | Ward |
| 2011/0179149 A1 | 7/2011 | Kazan |
| 2011/0181386 A1 | 7/2011 | Lee |
| 2011/0187928 A1 | 8/2011 | Crabtree |
| 2011/0273287 A1 | 11/2011 | Lalonde |
| 2011/0273625 A1 | 11/2011 | McMahon et al. |
| 2011/0274008 A1 | 11/2011 | Lida |
| 2011/0283129 A1 | 11/2011 | Guillerm |
| 2011/0285818 A1 | 11/2011 | Park |
| 2011/0289113 A1 | 11/2011 | Arling |
| 2011/0291971 A1 | 12/2011 | Masaki et al. |
| 2011/0302619 A1 | 12/2011 | Hale |
| 2011/0314153 A1 | 12/2011 | Bathiche |
| 2012/0013449 A1 | 1/2012 | Penisoara |
| 2012/0013807 A1 | 1/2012 | Arora |
| 2012/0019400 A1 | 1/2012 | Patel |
| 2012/0019633 A1 | 1/2012 | Holley |
| 2012/0021684 A1 | 1/2012 | Schultz et al. |
| 2012/0025957 A1 | 2/2012 | Yang |
| 2012/0050310 A1 | 3/2012 | Patel |
| 2012/0062805 A1 | 3/2012 | Candelore |
| 2012/0069246 A1 | 3/2012 | Thornberry |
| 2012/0069894 A1 | 3/2012 | Sakimura |
| 2012/0082461 A1 | 4/2012 | Meyer |
| 2012/0084452 A1 | 4/2012 | Pettit |
| 2012/0084662 A1 | 4/2012 | Navarro |
| 2012/0086869 A1 | 4/2012 | Friedlander |
| 2012/0105721 A1 | 5/2012 | Huang |
| 2012/0131245 A1 | 5/2012 | Wilcox |
| 2012/0133841 A1 | 5/2012 | Vanderhoff |
| 2012/0144416 A1 | 6/2012 | Wetzer |
| 2012/0146918 A1 | 6/2012 | Kreiner |
| 2012/0171958 A1 | 7/2012 | Cornett |
| 2012/0173003 A1 | 7/2012 | Kim |
| 2012/0185580 A1 | 7/2012 | Detert |
| 2012/0196536 A1 | 8/2012 | Koo |
| 2012/0236161 A1 | 9/2012 | Kwon |
| 2012/0242526 A1 | 9/2012 | Perez |
| 2012/0249890 A1 | 10/2012 | Chardon |
| 2012/0274547 A1 | 11/2012 | Raeber |
| 2012/0274857 A1 | 11/2012 | Maxwell |
| 2012/0274863 A1 | 11/2012 | Chardon et al. |
| 2012/0278693 A1 | 11/2012 | Black |
| 2012/0284758 A1 | 11/2012 | Adjesson |
| 2012/0291128 A1 | 11/2012 | Jayawardena |
| 2012/0297040 A1 | 11/2012 | Amano |
| 2012/0330943 A1 | 12/2012 | Weber |
| 2013/0005250 A1 | 1/2013 | Kim |
| 2013/0057774 A1 | 3/2013 | Yoshida |
| 2013/0058522 A1 | 3/2013 | Raesig |
| 2013/0069769 A1 | 3/2013 | Pennington et al. |
| 2013/0085851 A1 | 4/2013 | Pedro |
| 2013/0106977 A1 | 5/2013 | Chu |
| 2013/0107131 A1 | 5/2013 | Barnett |
| 2013/0198005 A1 | 8/2013 | Xiong |
| 2013/0249679 A1 | 9/2013 | Arling |
| 2013/0258918 A1 | 10/2013 | Rudland |
| 2013/0265248 A1 | 10/2013 | Nagahara |
| 2013/0276010 A1 | 10/2013 | Drayson |
| 2013/0298147 A1 | 11/2013 | Klein |
| 2013/0304817 A1 | 11/2013 | Hu |
| 2014/0085059 A1 | 3/2014 | Chen |
| 2014/0115631 A1 | 4/2014 | Mak |
| 2014/0157305 A1 | 6/2014 | Del Sordo |
| 2014/0222861 A1 | 8/2014 | Arling |
| 2014/0235526 A1 | 8/2014 | Srivastava |
| 2014/0279047 A1 | 9/2014 | Wang |
| 2014/0337879 A1 | 11/2014 | Arling |
| 2015/0032541 A1 | 1/2015 | Haddad |
| 2015/0187206 A1 | 7/2015 | Saurin |
| 2015/0289030 A1 | 10/2015 | Roberts |
| 2016/0017585 A1 | 1/2016 | Plate |
| 2016/0057537 A1 | 2/2016 | Robinson |
| 2016/0125733 A1 | 5/2016 | Sallas |
| 2016/0173961 A1 | 6/2016 | Coan |
| 2017/0024119 A1 | 1/2017 | Wild |
| 2017/0168595 A1 | 6/2017 | Sakaguchi |
| 2017/0205783 A1 | 7/2017 | Tannenbaum |
| 2017/0279497 A1 | 9/2017 | Schultz et al. |
| 2017/0289484 A1 | 10/2017 | Arling |
| 2018/0130469 A1 | 5/2018 | Gruenstein |
| 2018/0211651 A1 | 7/2018 | Hall |
| 2019/0033446 A1 | 1/2019 | Bultan |
| 2019/0261043 A1 | 8/2019 | Hideki |
| 2019/0287525 A1 | 9/2019 | Kim |
| 2019/0379887 A1 | 12/2019 | Marino |
| 2020/0092641 A1 | 3/2020 | Smus |
| 2020/0204613 A1 | 6/2020 | Hatambeiki |
| 2021/0120301 A1 | 4/2021 | Xu |
| 2021/0368562 A1 | 11/2021 | Hatambeiki |
| 2022/0030296 A1 | 1/2022 | Satheesh |
| 2022/0051554 A1 | 2/2022 | Tchedikian |
| 2022/0053230 A1 | 2/2022 | Tchedikian |
| 2022/0109669 A1 | 4/2022 | Yuh |
| 2022/0294639 A1 | 9/2022 | Amsalem |
| 2023/0106761 A1 | 4/2023 | Coffman |

FOREIGN PATENT DOCUMENTS

| | | | |
|---|---|---|---|
| CN | 101910960 A | 6/2014 | |
| CN | 102541547 B | 12/2015 | |
| CN | 103999137 A | 4/2017 | |
| CN | 109587016 A | * 4/2019 | ....... G06K 19/06037 |

(56) References Cited

FOREIGN PATENT DOCUMENTS

| | | |
|---|---|---|
| DE | 197098002 A1 | 9/1998 |
| EP | 0513443 B1 | 11/1999 |
| EP | 1722341 A1 | 11/2006 |
| EP | 2265003 A2 | 12/2010 |
| EP | 3084744 A1 | 10/2016 |
| EP | 1489575 B1 | 7/2017 |
| EP | 2490195 B1 | 4/2022 |
| GB | 2166328 A | 6/1989 |
| JP | 05083765 A | 7/2009 |
| JP | 2010034853 A | 2/2010 |
| JP | 2013085225 A | 5/2013 |
| KR | 10-2011-0051788 | 5/2011 |
| KR | 10-2013-0070764 | 6/2013 |
| WO | 8911137 W | 11/1989 |
| WO | 9732290 | 9/1997 |
| WO | 0013344 A1 | 3/2000 |
| WO | 0017738 | 3/2000 |
| WO | 0034851 | 6/2000 |
| WO | 0039772 | 7/2000 |
| WO | 0147130 | 6/2001 |
| WO | 03044684 | 5/2003 |
| WO | 03044756 W | 5/2003 |
| WO | 0383801 | 10/2003 |
| WO | 0451592 | 6/2004 |
| WO | 05036325 | 4/2005 |
| WO | 2007105142 A1 | 9/2007 |
| WO | 2011053008 A2 | 5/2011 |
| WO | 2015095637 A1 | 6/2015 |
| WO | 2016126609 A2 | 8/2016 |
| WO | 2018198036 A1 | 11/2018 |
| WO | 2018224812 A1 | 12/2018 |
| WO | 2019236764 A1 | 12/2019 |
| WO | WO-2020172134 A1 * | 8/2020 ............ G06F 21/35 |
| WO | 2020232336 A1 | 11/2020 |

OTHER PUBLICATIONS

2010 Spring BD-Players, BOP IP & RS-232 Control Version 1. 00. 00, Edited Dec. 8, 2010 {"Remote Code Commands Lisi"} https://www.pioneerelectronics.com/SlaticFiles/PUSA/Files/Home%20Custom%20In ,tall/2010%20Pioneer"/o20BDP330_IP &_RS-232_ Commands.pdf), 3 pp.
AT2400 AllTouch Remote Control User's Guide, Scientific Atlanta Inc., (2002), 2 pp.
Commission Decision in ITC-337-TA-1200, 45 pp.
Connecting the Explorer 8300HDTM Digital Video Recorder Manual, Scientific Atlantic Inc. (2005), 27 pp.
Declaration of Samuel H. Russ, PhD, 100 pp.
Expert Report of Dr. Craig Rosenberg from ITC-337-TA-1200 dated Nov. 19, 2020 (Redacted Relevant Pages—Non Confidential Version), 9 pp.
Extended European search report issued of European patent application No. 19871693.8 dated Jun. 14, 2022, 10 pages.
Extended European Search Report issued on European patent application No. 19908998.8, dated Sep. 27, 2022, 10 pages.
Extended European search report issued on European patent application No. 20909517.3, dated Jan. 5, 2022, 10 pages.
Extended European search report issued on European patent application No. 20910756.4, dated Dec. 20, 2022, 11 pages.
Extended European Search Report issued on European patent application No. 21217138.3, dated Apr. 7, 2022, 12 pages.
File History of U.S. Pat. No. 10,600,317 to Haughawout.
Final Office Action issued on U.S. Appl. No. 16/199,463, Notification Date of May 6, 2020, 14 pgs.
Final Office Action issued on U.S. Appl. No. 16/778,638, Notification date of Jul. 23, 2020, 6 pgs.
User Manual Harmony 900—Remote Control User Guide, Version 1.0, Logitech, 59 pp.
Infrared Data Association Serial Infrared Physical Layer Specification, Version 1.4, May 30, 2001, 1994, Infrared Data Association, 68 pgs.
Initial Determination in ITC-337-TA-1200, 154 pp.
Int. Search Report and Written Opinion issued on PCT application No. PCT/US22/33028, dated Oct. 14, 2022, 20 pages.
International CES 2000 Report—Universal Electronics Inc. (2000) http://www.remotecentral.com/ces2000/uei.hlm), 2 pp.
ITC Commission Opinion, Inv. No. 337-TA-1200, issued Dec. 3, 2021, 46 pp.
ITC Markman Order, Inv. No. 337-TA-1200, filed Oct. 1, 2020.
Logitech Harmony 900 Universal Remote Review, by David Rees, The Gadgeteer, User Review 2 (hllps://the-gadgeteer.com/2010/01/25/logitech-harmony-900-universal-remotereview/), 16 pp.
Michael Brown, Product Reviews—Logitech Harmony 900 Review, User Review Sep. 1, 14, 2009) {https://www.digitaltrends.com/gadget-reviews/logitech-harmony-900-review/), 18 pp.
Non-Final Office Action issued in U.S. Appl. No. 17/461,237, dated Aug. 17, 2022, 8 pgs.
Non-Final Office Action issued in U.S. Appl. No. 17/665,219, dated Feb. 16, 2023, 10 pgs.
Non-Final Office Action issued on U.S. Appl. No. 16/114,762, Notification Date of Feb. 14, 2020, 13 pgs.
Non-Final Office Action issued on U.S. Appl. No. 16/457,309, Notification Date of Mar. 6, 2020, 17 pgs.
Non-Final Office Action issued on U.S. Appl. No. 16/540,635, Notification Date of Feb. 24, 2020, 11 pgs.
Non-Final Office Action issued on U.S. Appl. No. 16/778,638, Notification Date of Mar. 6, 2020, 8 pgs.
Non-Final Office Action issued on U.S. Appl. No. 17/375,566, dated Jan. 21, 2022, 19 pgs.
Non-Final Office Action issued on U.S. Appl. No. 17/527,532, dated Feb. 10, 2022, 10 pgs.
Prosecution History of U.S. Pat. No. 10,593,196 to Arling, 459 pp.
Office Action issued on U.S. Appl. No. 17/527,390, dated Feb. 3, 2022, 6 pgs.
Office action issued on Brazilian patent application No. BR112014010028-4, dated May 17, 2022, 7 pages.
Patent Owners Preliminary Response in IPR2021-00299, 63 pp.
Patent Owner Infringement Claim Chart of U.S. Pat. No. 10,593,196 marked Ex. 5 in ITC-337-TA-1200 (Redacted Relevant Pages—Non Confidential Version), 9 pp.
Non-final Office Action from U.S. Appl. No. 18/229,841, dated Mar. 19, 2024, 6 pp.
Non-final Office Action from U.S. Appl. No. 18/233,192, dated Mar. 21, 2024, 17 pp.
Office Action from EP application No. 21217138.3, dated Mar. 19, 2024, 10 pp.
Non-final Office Action from U.S. Appl. No. 17/887,624, dated Apr. 5, 2024, 32 pp.
Non-final Office Action from U.S. Appl. No. 17/888,602, dated May 21, 2024, 20 pp.
China National Intellectual Property Administration, Second Office Action issued in CN App. No. 201480057944.0, Dated Jul. 16, 2019, 21 pgs.
VCR CommanderTM Service User's Guide, Scientific—Atlanta Inc. (2000), 28 pp.
Digital Video Recorder with TiVo, Spring and Fall 2001, Service Update Guide, 65 pgs.
Direct TV TiVo Installation Guide, Hughes Network Systems, 68 pgs.
EPO, examination report issued on European patent application No. 14801064.8, dated Jul. 11, 2019, 4 pages.
ETSI TS 102 006 v1 .3.1, (May 2004), Technical Specification, Digital Video Broadcasting (DVB); Specification for System Software Update in DVB Systems, European Broadcasting Union, 39 pgs.
European Patent Office, extended European Search Report issued on European patent application No. 12844121.9, dated Mar. 5, 2015, 6 pages.
European Patent Office, extended European Search Report issued on European patent application No. 14801064.8, dated Apr. 18, 2016, 8 pages.
European Patent Office, extended European Search Report issued on European patent application No. 14872863.7, dated Nov. 25, 2016, 8 pages.

(56) References Cited

OTHER PUBLICATIONS

Final Office Action issued on U.S. Appl. No. 15/900,232, dated Dec. 13, 2018, 15 pages.
Final Office Action issued on U.S. Appl. No. 15/900,342, dated Nov. 29, 2018, 19 pages.
HDMI Specification Version 1.3a, Hitachi, Lid., et al., Nov. 10, 2006, 2001-2006 by Hitachi, Lid., et al., 276 pgs.
High-Definition Multimedia Interface, HDMI Licensing, LLC, Specification Version 1.3a, Nov. 10, 2006, pp. 1-276.
In re reexam of U.S. Pat. No. 10,600,317 to Haughawout et al., for System and Method for Simplified SetUp of a Universal Remote Control, Declaration of Mr. John Tinsman Under 37 C.F.R. § 1.132, 122 pgs.
Int. Search Report and Written Opinion of the Int. Searching Authority issued on Int. Appln. No. PCT/US12/62161, received Jan. 23, 2013, 12 pages.
Int. Search Report and Written Opinion of the Int. Searching Authority issued on Int. Appln. No. PCT/US14/38151, received Jun. 27, 2014, 9 pages.
International Search Report and Written Opinion issued on PCT application No. US19/54315, dated Jan. 2, 2020, 16 pages.
ISA/KR, Int'l Search Report issued in Appln. No. PCT/US12/60390, dated Jul. 18, 2013, 4 pgs.
ISA/KR, Written Opinion issued in Appln. No. PCT/US12/60390, dated Jul. 18, 2013, 7 pgs.
User Interface—Infrared Learner {Remote Control), Application Note AN2092, Cypress Semiconductor, Document No. 001-41063, {Nov. 11, 2002), 7 pp.
Universal Electronics Inc., "Universal Electronics Teams up with Sensory to Deliver Smart Home Digital Assistant Platform with Embedded Voice Control and Branded Assistant Experience." Jan. 4, 2019 {Jan. 4, 2019) Retrieved on Aug. 19, 2022 {Aug. 19, 2022) from <https://universalelectronicsinc.gcs-web.com/news-releases/newselease-details/universal-electronics-teams-sensory-deliver-smart-home-digital> , 2 pp.
United States Court of Appeals for the Federal Circuit, in re: Universal Electronics, Inc., 2022-1757, Opinion filed for the court by Reyna, Taranto, and Stoll, Circuit Judges, Nonprecedential Opinion. Date entered/ received: Jun. 14, 2023, 4 pgs.
U.S. Appl. No. 61/680,876 to Arling et al.
Logitech Unveils Harmony 680 Remote: Maestro of the Living Room Media Center PC, Logitech NASDAQ:LOGI, 4 pgs.
Non-final Office Action from U.S. Appl. No. 17/686,039, mailed May 10, 2023, 14 pp.
Non-final Office Action from U.S. Appl. No. 17/686,180, mailed May 23, 2023, 13 pp.
Non-Final Office Action issued on U.S. Appl. No. 16/156,766, Notification Date of Oct. 4, 2019, 10 pgs.
Non-Final Office Action issued on U.S. Appl. No. 16/196,756, Notification Date of Sep. 6, 2019, 9 pgs.
Non-Final Office Action issued on U.S. Appl. No. 16/197,552, Notification Date of Sep. 19, 2019, 10 pgs.
Non-Final Office Action issued on U.S. Appl. No. 16/197,748, Notification Date of Sep. 6, 2019, 9 pgs.
Non-Final Office Action issued on U.S. Appl. No. 16/783,971, dated Sep. 2, 2020, 8 pgs.
Non-Final Office Action issued on U.S. Appl. No. 16/814,493, dated Feb. 19, 2021, 15 pgs.
Non-Final Office Action issued on U.S. Appl. No. 16/838,736 dated Mar. 18, 2021, 15 pgs.
Norme Internationale International Standard, CEI IEC 61883-1, First edition, Feb. 1998, Consumer audio/video equipment-Digital interface-Part 1 :General, Copyright International Electrotechnical Commission, Ref. No. EI/IEC 61883-1:1998, Order No. W2248667, 100 pgs.
Personal TV Owner's Guide, TiVo, PHILIPS, 1999 by TiVo, Inc., USA, 153 pgs.
Petition for Inter Partes Review of U.S. Pat. No. 10,600,317, Case No. IPR2021-00263, *Roku, Inc.* v. *UEI, Inc.*, 94 pp.
Petition for Inter Partes Review of U.S. Pat. No. 10,600,317, Case No. IPR2021-00264, *Roku, Inc.* v. *UEI, Inc.*, 63 pp.
Philips, Directv, TiVo, DIRECTV Receiver with TiVo Viewer's Guide, 154 pgs.
PocketRemote: Integrating a Universal Remote Control with a Handheld Computer, Angus Huang, Submitted to the Department of Electrical Engineering and Computer Science, Feb. 1, 2002, 2002 Angus Huang, 106 pgs.
RCA, Tivo Viewer's Guide, 1999, 2000 by TiVo, Inc., 96 pgs.
*Roku, Inc.*, v. *UEI, Inc.*, U.S. Pat. No. 10,600,317, Declaration of Margaret Schmidt, 7 pgs.
Sony, 2001 Home Network Products, SVR-2000 Digital Network Recorder, 2001 Sony Electronics Inc., 6 pgs.
Sony, 3-060-082-01 (1 ), Digital Network Recorder SVR-2000, Setup Guide, 2000 by Sony Corporation, Sunnyvale, CA, 94089, http://www.tivo.com, 68 pgs.
Sony, Digital Network Recorder, Installation Guide, SVR-3000, 2002 by Sony Electronics Inc., 58 pgs.
The Essential Guide to User Interface Design, Second Edition, an Introduction to GUI Design Principles and Techniques, Wilbert O. Galilz, Whiley Computer Publishing, John Wiley & Sons, Inc., 2002, 786 pgs. (Uploaded in eight parts).
Transcript of the Sep. 30, 2020 Deposition of Dr. Turnbull, 166 pp.
TiVo Installation Guide—Series 2 Digital Video Recorder, archived by web.archive.org on Aug. 12, 2004, with Affidavit of Elizabeth Rosenberg attached ("TiVo"), 88 pp.
U.S. International Trade Commission, Washington, D.C., in the Matter of Certain Electronic Devices, Including Streaming Players, Televisions, Set Top Boxes, Remote Controllers, and Components Thereof, Inv. No. 337-TA-1200, Initial Determination on Violation of Section 337 and Recommended Determination on Remedy and Bond, 154 pp.
Notice of Allowance issued in U.S. Appl. No. 17/665,219, dated May 16, 2023, 6 pgs.
Z—Zilog, Z90356 and Z90351, 64KWord Television 50 Controller With Expanded OSD Features, PB000102-1102, Product Brief and Product Block Diagram, 6 pgs., ZiLOG Worldwide Headquarters, San Jose, CA., zservice@zilog.com; www.zilog.com.
Examination report issued on European patent application No. 11870232.3, dated Dec. 14, 2016, 3 pages.
Examination report issued on European patent application No. 11872554.8, dated Jul. 31, 2018, 5 pages.
Examination report issued on European patent application No. 15796548.4, dated Aug. 16, 2019, 5 pages.
Examination report issued on European patent application No. 16747061.6, dated Apr. 14, 2020, 5 pages.
Examination report issued on European patent application No. 21170794.8, dated Aug. 31, 2022, 3 pages.
Extended European Search Report issued on European Patent Application No. 11870232.3, dated Nov. 19, 2014, 7 pages.
Extended European Search Report issued on European Patent Application No. 11872554.8, dated Feb. 26, 2015, 5 pages.
Extended European Search Report issued on European Patent Application No. 12763258.6, dated Jan. 2, 2014, 7 pages.
Extended European Search Report issued on European Patent Application No. 12763258.6, dated Jul. 28, 2014, 8 pages.
Extended European search report issued on European patent application No. 21170794.8, dated Sep. 20, 2021, 7 pages.
Final Office Action issued in U.S. Appl. No. 17/733,254, dated Jan. 10, 2023, 11 pgs.
Final Office Action issued on U.S. Appl. No. 14/736,909, dated Aug. 16, 2018, 6 pgs.
Ingrid Wickelgren, Apr. 1997, IEEE Spectrum, vol. Apr. 1997, pp. 20-25.
International Preliminary Report on Patentability issued on PCT application No. US/2015/030258, dated Dec. 1, 2016, 7 pages.
Non-final Office Action from U.S. App. No. 18/224,106, dated Feb. 15, 2024, 7 pp.
Non-Final Office Action issued in U.S. Appl. No. 17/733,254, dated Sep. 27, 2022, 10 pgs.
Non-Final Office Action issued on U.S. Appl. No. 14/736,909, dated Apr. 4, 2018, 11 pages.

(56) References Cited

OTHER PUBLICATIONS

Non-Final Office Action issued on U.S. Appl. No. 16/106,831, dated Jul. 25, 2019, 6 pgs.
Non-Final Office Action issued on U.S. Appl. No. 16/596,549, dated Sep. 2, 2020, 7 pgs.
Notice of Final Rejection issued on Korean patent application No. 10-2016-7033626, dated Aug. 6, 2021, 9 pages.
Office Action issued on Brazilian patent application No. BR112014006930.1, received Nov. 8, 2019, 2 pages.
Office Action issued on Brazilian patent application No. BR112014006930.1, received Oct. 27, 2020, 3 pages.
Office Action issued on Chinese patent application No. 201680008875.3, dated Sep. 1, 2020, 22 pages.
Office Action issued on Chinese patent application No. 201680008875.3, received Sep. 19, 2019, 9 pages.
Office action issued on Indian patent application No. 201747027318, dated Apr. 12, 2021, 6 pages.
Office Action issued on Israeli patent application No. 253817, received Oct. 12, 2020, 4 pages.
Office Action issued on Japanese patent application No. 2017-541066, dated Feb. 18, 2020, 18 pages.
Office Action issued on Japanese patent application No. 2017-541066, received Oct. 8, 2019, 18 pages.
Final Office Action from U.S. Appl. No. 17/686,039, dated Oct. 3, 2023, 11 pp.
Non-final Office Action from U.S. Appl. No. 17/686,039, dated Jan. 4, 2024, 11 pp.
Non-Final Office Action issued in U.S. Appl. No. 17/186,156, dated Aug. 4, 2022, 14 pgs.
Extended European search report issued on European patent application No. 19871693.8 dated Jun. 14, 2022, 10 pages.
Extended European Search Report issued on EP patent application No. 13162427.2, dated May 14, 2014, 14 pages.
Extended European Search Report issued on EP patent application No. 13162431.4, dated Jan. 20, 2014, 7 pages.
Extended European Search Report issued on European patent application No. 12765455.6, dated Aug. 5, 2014, 9 pages.
Final Office Action from U.S. Appl. No. 17/524,777, dated Apr. 24, 2023, 18 pp.
Final Office Action issued in U.S. Appl. No. 17/524,549, dated May 31, 2022, 26 pgs.
Final Office Action issued in U.S. Appl. No. 17/524,777, dated Apr. 11, 2022, 17 pgs.
Final Office Action issued in U.S. Appl. No. 17/524,827, dated Jun. 22, 2022, 21 pgs.
Int. Search Report and Written Opinion of PCT Appln. No. US2012/54372, received Nov. 27, 2012, 15 pgs.
Int'l Search Report and Written Opinion of PCT Appln. No. PCT/US14/38151, dated Jun. 23, 2014, 9 pgs.
Non-Final Office Action issued in U.S. Appl. No. 17/524,827, dated Mar. 7, 2022, 17 pgs.
Non-Final Office Action issued in U.S. Appl. No. 17/525,113, dated Mar. 18, 2022, 16 pgs.
Non-Final Office Action issued on U.S. Appl. No. 17/524,777, dated Jan. 25, 2022, 17 pgs.
Non-Final Office Action issued on U.S. Appl. No. 17/524,549, dated Dec. 9, 2022, 34 pgs.
Non-Final Office Action issued on U.S. Appl. No. 17/524,549, dated Feb. 22, 2022, 24 pgs.
Partial European Search Report issued on EP patent application No. 13162427.2, dated Jan. 23, 2014, 6 pages.
Non-Final Office Action issued on U.S. Appl. No. 15/843,376, dated Jul. 12, 2018, 7 pgs.
Non-Final Office Action issued on U.S. Appl. No. 15/843,407, dated Sep. 20, 2018, 9 pgs.
Non-Final Office Action issued on U.S. Appl. No. 16/393,348, dated Aug. 8, 2019, 7 pgs.
Non-Final Office Action issued on U.S. Appl. No. 16/197,748, Notification Date of Sep. 6, 2019, 9 pp.
Office Action issued on Brazilian patent application No. BR1120140069263, received May 12, 2020, 2 pgs.
Office Action issued on EP patent application No. 13162427.2, received Apr. 3, 2017, 6 pages.
Office Action issued on EP patent application No. 13162431.4, dated Apr. 4, 2017, 5 pages.
Office action issued on Korean patent application No. 10-2017-7024670, mailed May 24, 2022, 11 pages.
Preliminary office action issued on Brazilian patent application No. BR1120120154028, received Aug. 19, 2019, 2 pages.
Preliminary Report on Patentability issued on PCT/US12/027841, received Oct. 10, 2013, 7 pgs.
Extended Search Report from European application number 22821119.9, dated Oct. 2, 2024, 13 pp.
Non-final Office Action from U.S. Appl. No. 17/887,624, dated Aug. 9, 2024, 32 pp.
Final Office Action from U.S. Appl. No. 17/888,602, dated Aug. 9, 2024, 21 pp.

* cited by examiner

| Function | Appliance | | | | | |
|---|---|---|---|---|---|---|
| | TV | AVR | STB/DVR | DVD | CD | Etc... |
| Power on | CEC | CEC | CEC | CEC | IR | |
| Power off | CEC | CEC | CEC | CEC | IR | |
| Volume up | IR | CEC | n/a | n/a | n/a | |
| Volume down | IR | CEC | n/a | n/a | n/a | |
| Mute | IR | CEC | n/a | n/a | n/a | |
| Play | n/a | n/a | CEC | CEC | IR | |
| Pause | n/a | n/a | CEC | CEC | IR | |
| FF | n/a | n/a | CEC | CEC | IR | |
| Rew | n/a | n/a | CEC | CEC | IR | |
| Sound field A | CEC | IP | IP | n/a | n/a | |
| Sound field B | CEC | IP | IP | n/a | n/a | |
| Input 1 | CEC | IR | n/a | n/a | n/a | |
| Input 2 | CEC | IR | n/a | n/a | n/a | |
| Etc..... | | | | | | |

| | Appliance | TV | STB/DVR | DVD | AVR |
|---|---|---|---|---|---|
| State | Power | On | On | On | On |
| | Input | HDMI1 | — | — | S/PDIF2 |
| Function | Volume | Off | — | — | Active |
| | Transport | — | Active | Off | — |

Activity= "watch TV"
Activity = "Watch a movie"
Activity = "Listen to music"

FIG. 12

Current appliance state

| | Appliance | TV | STB/DVR | DVD | AVR |
|---|---|---|---|---|---|
| State | Power | On | Off | On | ?? |
| | Input | HDMI2 | — | — | ?? |

SYSTEMS AND METHODS FOR ASSOCIATING SERVICES AND/OR DEVICES WITH A VOICE ASSISTANT

RELATED APPLICATION INFORMATION

This application claims the benefit of and is a continuation of U.S. application Ser. No. 17/673,145, filed on Feb. 16, 2022, which application claims the benefit of and is a continuation-in-part of U.S. application Ser. No. 17/552,361, filed on Dec. 16, 2021, which application claims the benefit of U.S. application Ser. No. 17/137,960, filed on Dec. 30, 2020, which application claims the benefit of U.S. Provisional Application No. 62/956,478, filed on Jan. 2, 2020.

Through U.S. application Ser. No. 17/137,960, this application also claims the benefit of and is a continuation-in-part of U.S. application Ser. No. 16/717,546, filed on Dec. 17, 2019, which application claims the benefit of U.S. Provisional Application No. 62/789,857, filed on Jan. 8, 2019.

This application is also related to U.S. application Ser. No. 17/461,237, filed on Aug. 30, 2021, This application claims the benefit of and is a continuation of U.S. application Ser. No. 16/778,241, filed on Jan. 31, 2020, which application claims the benefit of and is a continuation of U.S. application Ser. No. 16/199,463, filed on Nov. 26, 2018, which application claims the benefit of and is a continuation of U.S. application Ser. No. 15/900,342, filed on Feb. 20, 2018, which application claims the benefit of and is a continuation of U.S. Application No. 15,789,547, filed on Oct. 20, 2017, which application claims the benefit of and is a continuation of U.S. application Ser. No. 15/259,847, filed on Sep. 8, 2016, which application claims the benefit of and is a continuation of U.S. application Ser. No. 14/136,023, filed on Dec. 20, 2013, which application claims the benefit of and is a continuation-in-part of U.S. application Ser. No. 13/899,671, filed on May 22, 2013, which application claims the benefit of and is a continuation of U.S. application Ser. No. 13/657,176, filed on Oct. 22, 2012, which application claims the benefit of U.S. Provisional Application No. 61/552,857, filed Oct. 28, 2011, and U.S. Provisional Application No. 61/680,876, filed Aug. 8, 2012.

The disclosure within each of these applications is incorporated herein by reference in its entirety.

BACKGROUND

Systems and method for associating accounts and/or devices with another device are generally known in the art. For example, users are currently required to create a username and password pair for an account. Once created, a user can associate the corresponding account with another device using a one-time password or code, typically provided by use of a text message sent to a phone or an email sent to an email address. This mechanism for associating an account with a device suffers the disadvantage of requiring the user to be logged into or to log into their existing account via use of the username and password pair. Furthermore, while systems and methods for providing password-less authentication are known in the art, such as described in U.S. Pat. Nos. 10,735,196, 10,136,315, and 9,537,661, these systems have been seen to be overly complicated and/or cumbersome to use. Accordingly, a need remains for a system and method that allows a user to associate a service and/or a device with another device, such as a universal voice assistant, that does not require the use of a password/username, and that is relatively simpler to use.

SUMMARY

In accordance with these and other needs, the following generally describes systems and methods for associating services and/or devices with another device, for example a voice assistant.

In an example system, an app installed on a smart device is caused to retrieve from a cloud-server a one-time use code. The one-time use code is then provided to a controllable device and the controllable device is caused to provide the one-time use code back to the smart device. The app causes the one-time use code provided back to the smart device by the controllable device to be authenticated. In response to the one-time use code being authenticated, the controllable device is bound to the app whereupon the controllable device is controllable through use of the app.

In an example system, a first app installed on a controllable device is caused to retrieve from a cloud-server a one-time use code. The one-time use code is then caused to be provided to a second app installed on a smart device. The smart device is also used to scan a bar code having data that functions to uniquely identify a controlling device. The one-time use code and the data the functions to uniquely identify the controlling device is then used to bind the controlling device and the controllable device whereupon the controllable device is controllable through use of the controlling device.

In an example method, a first code is provided from an app to a device and preferably contains the following information: App name, app version, company that owns the app (in either name or id), and a certificate of the app (either self-signed or from a root CA). This information is usable, in whole or in part, for the device to confirm only the matching app is provided access to the code and to identify the app ownership or legitimacy of the information. Upon getting the code, the device can validate the code before proceeding to the second code exchange.

The second code from the device to the app preferably contains the following information: Device id, name, model (or other device identifying data), a certificate of the device (either self-signed or from a root CA, which is similarly used to identify/authenticate the device), and a challenge code that can be used to validate the device identity, for example, information encrypted by the device's private key. The app can use a cloud service to help validate the code sent by the device and, once the cloud service confirms the identity of the device, the cloud service can setup the mapping between the mobile app and the device and send back to the app a confirmation code. The app forwards the confirmation code to the device and the confirmation code could include some information that the device needs to decode, such as the access_key for the mobile app to talk to the device directly. The decoded data could have checksum to make sure the information is correct after decoding.

It will also be appreciated that the device can optionally return at least a part of the decoded data to the mobile app. For example, the device can share the access_key with the mobile app so the mobile app can use the access_key in the control message to the device. Similarly, a session key that can be used for encrypt/decrypt the communication between the mobile app and the device.

A better understanding of the objects, advantages, features, properties and relationships of the subject systems and methods will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the described system and methods, reference may be had to various examples shown in the attached drawings.

FIG. 7 illustrates an example preferred command matrix for use in a control environment, for example, as illustrated in FIG. 6.

FIG. 11 illustrates example activity configuration matrices such as may be defined during the steps of FIG. 10.

FIG. 12 illustrates an example current appliance state matrix which may be maintained by a data repository associated with a controlling device for use in determining the commands necessary to invoke one of the states defined by the matrix of FIG. 11.

FIG. 27 illustrates example steps for using an authenticated device with a virtual user account to provide password-less log-in.

DETAILED DESCRIPTION

Personal communication, productivity, and entertainment devices are known to include voice platforms, for example, the "ALEXA" cloud-based, voice service platform, the "SIRI" cloud-based, voice service platform, the "GOOGLE ASSISTANT" cloud-based, voice service platform, etc. Such voice service platforms generally function to convert spoken words to text using automatic speech recognition (ASR), to deduce the speaker's meaning using natural language understanding (NLU), and to provide the underlying customer intent to an app—also referred to as a "skill," "action," or the like. An app, once installed on a voice service enabled device, functions to give the voice service enabled device an ability to communicate with other devices, websites, services, and the like that have been associated with the voice service enabled device and, in some instances, functions to provide a user interface for interacting with such associated devices, websites, services, and the like.

Figure 1:
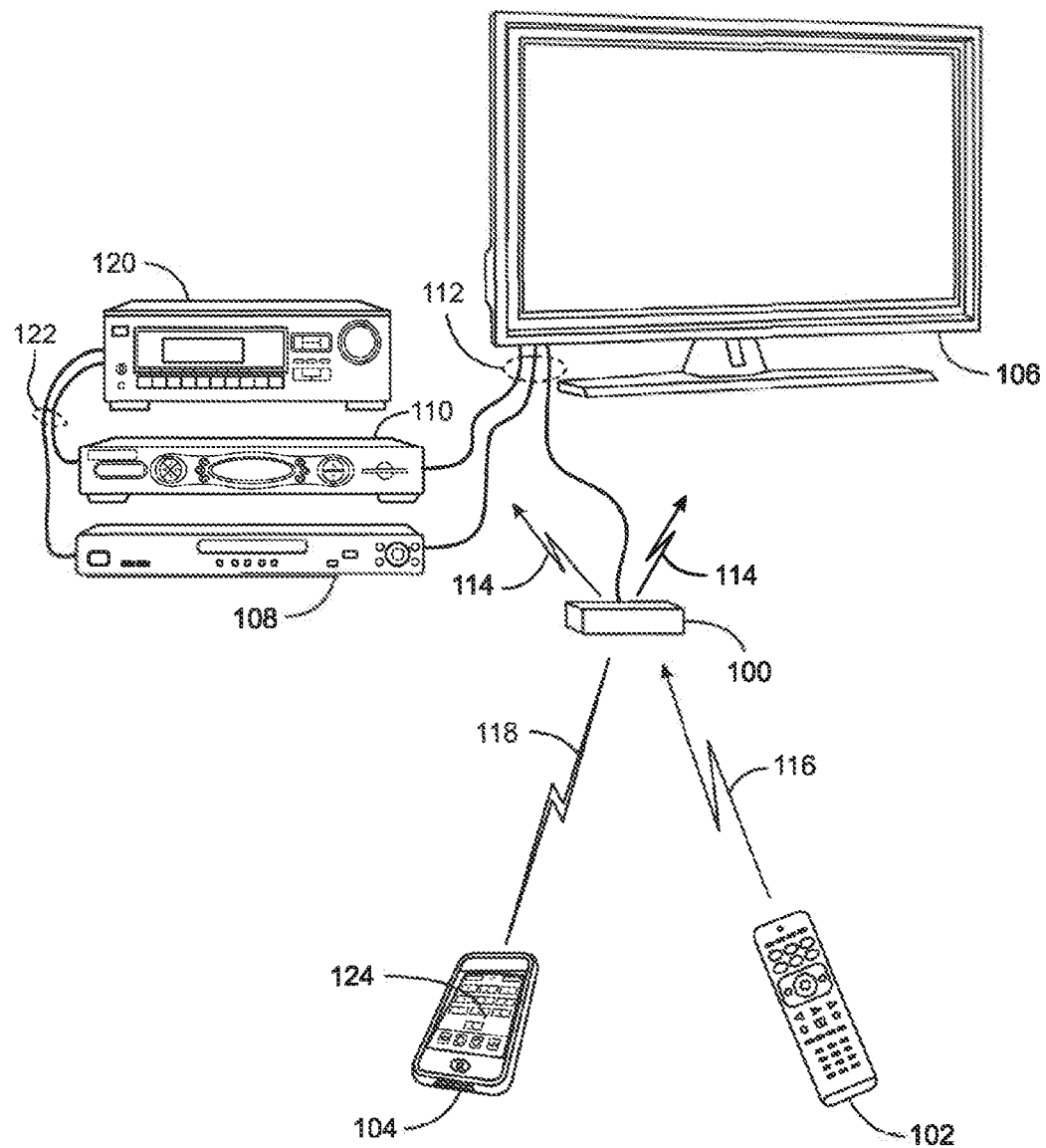
FIGS. 1 and 2 illustrate example systems in which a standalone device may be utilized to control operation of several appliances.

With reference to FIG. 1, there is illustrated an example system in which a device 100 (which is preferably capable of supporting one or more cloud-based, voice service platforms for the purpose of making the device 100 voice service enabled) may be used to issue commands and/or communications to appliances, such as a television 106, a cable set top box or Internet enabled streaming device (alone or combined with a digital video recorder) 110, a DVD player 108, and an AV receiver 120. While illustrated in the context of a television 106, STB/DVR 110, a DVD player 108, an AV receiver 12, a router, a hub, and the like. When the appliances are controllable appliances, such as when the appliances are televisions, VCRs, DVRs, DVD players, cable or satellite converter set-top boxes ("STBs"), amplifiers, CD players, game consoles, home lighting, drapery, fans, HVAC systems, thermostats, personal computers, etc., it will be appreciated that such devices may have an associated app, also referred to herein as a "skill," "action," or the like, that functions to provide the cloud-based voice service platform enabled device 100 with an ability to communicate with these devices (and with other devices, websites, services, and the like as desired and/or required).

In the illustrative example of FIG. 1, appliance commands may be caused to be issued by device 100, when appropriately configured, in response to infrared ("IR") request signals 116 received from a remote control device 102 and/or radio frequency ("RF") request signals 118 received from an app 124 resident on a smart device 104 or any other device from which device 100 may be adapted to receive requests, using any appropriate communication method. In addition, the device 100, when appropriately configured, will respond to voice communications received via use of, for example, one or more microphones provided to device 100 or otherwise linked to device 100. As illustrated, requested transmission of any commands from the device 100 to appliances 106,108,112,120 that have been associated with/linked to the device 100 may take the form of wireless IR signals 114, CEC commands issued over a wired "HDMI" interface 112, RF signals such as contemplated by "RF4CE," "ZWAVE," and "BLUETOOTH," etc. as appropriate to the capabilities of the particular appliance to which each command may be directed. For example, in the system illustrated, AV receiver 120 may not support "HDMI" inputs, being connected to audio source appliances 108,110 via S/PDIF interfaces 122. Accordingly, device 100 may be constrained to transmit all commands destined for AV receiver 120 exclusively as IR signals, while commands destined for the other appliances 106 through 110 may take the form of either CEC, RF, or IR signals as appropriate for each command. By way of example without limitation, certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over "HDMI" connection 112.

It will, however, be appreciated that, while illustrated in the context of IR, RF, and wired CEC signal transmissions, in general, transmissions to and from device 100 may take the form of any convenient IR, RF, hardwired, point-to-point, or networked protocol, as necessary for a particular embodiment. Further, while wireless communications 116, 118, etc., between example devices are illustrated herein as direct links, it should be appreciated that in some instances such communication may take place via a local area network or personal area network, and as such may involve various intermediary devices such as routers, bridges, access points, hubs, etc. The network may also include devices that would be coupled via use of cloud to cloud communications. Thus, the concepts described hereinafter may be used in connection with devices that have a cloud interface, i.e., that support a cloud API, as well as a local area network interface. Since these items are not necessary for an understanding of the instant invention, they are omitted from this and subsequent FIGS. for the sake of clarity.

In some instances, the device 100 will communicate with another device, such as a hub device, to cause the hub device to transmit commands to appliances that have been associated with the hub device. Such communications can be caused to be issued from the device 100 in response to a voice command being received from a user, a command being received from a remote control, etc.

Since smart device remote control apps are well known, for the sake of brevity the operation, features, and functions thereof will not be described in detail herein. Nevertheless, if a more complete understanding of the nature of such apps is desired, the interested reader may turn to, for example, the before mentioned U.S. patent application Ser. No. 12/406, 601 (now U.S. Pat. No. 9,503,562) or U.S. patent application Ser. No. 13/329,940, (now U.S. Pat. No. 8,243,207).

Figure 2:
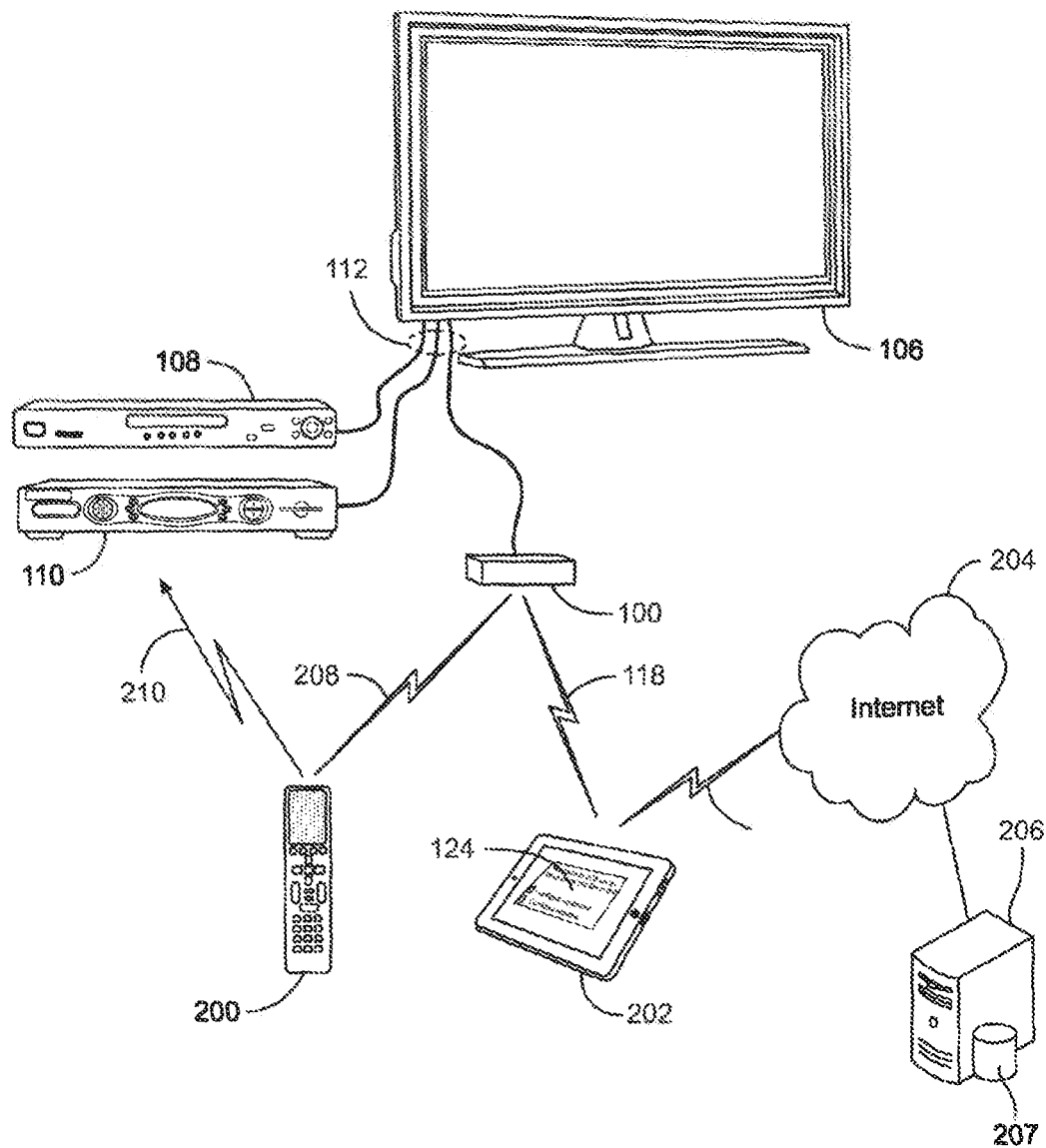

Turning now to FIG. 2, in a further illustrative embodiment, device 100 may receive wireless request signals from a remote control 200 and/or an app resident on a tablet computer 202. As before, command transmissions to appliances 106, 108, 110 may take the form of wired CEC commands or wireless RF or IR commands. However, in this example remote control 200 may be in bi-directional communication 208 with device 100 and accordingly the device 100 may delegate the transmission of certain commands, such as IR commands 210, to the remote control device 200 or to yet another device, such as a hub device adapted to provide command signaling as described above, e.g., to use the hub device as a relay device for those commands determined to be best executed by that device. As also generally illustrated in FIG. 2, a setup app 214 executing on a smart device, such as tablet computer 202, may be utilized in conjunction with an Internet (212, 204) accessible or cloud based server 206 and associated database 207 to initially configure device 100 for operation with the specific group of appliances to be controlled, e.g., to communicate to device 100 a matching command code set and capability profile for each particular appliance to be controlled, for example based on type, manufacture, model number, etc., as will be described in greater detail hereafter.

Figure 3:
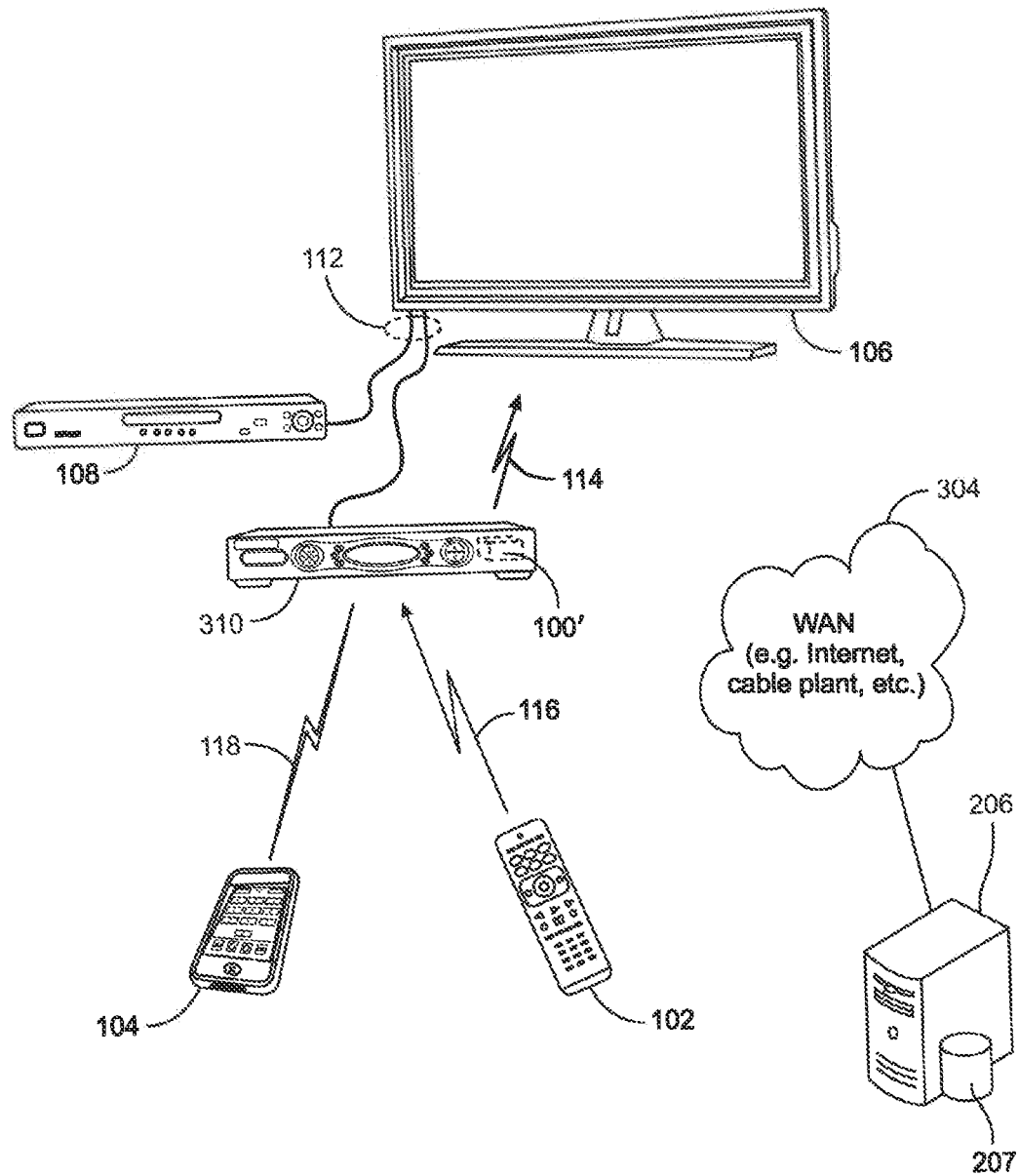
FIGS. 3 and 4 illustrate example systems in which control functionality may be incorporated into an appliance which is part of a home entertainment system.

With reference to FIG. 3, in a further illustrative embodiment a device and/or module having control functionality 100' may be embedded in an appliance, for example STB/DVR 310. In this example, remote control 102 and/or smart device 104 may transmit wireless request signals directly to STB/DVR 310 for action by the built-in device 100', which actions may, as before, comprise CEC command transmissions via "HDMI" connection 112 or wireless RF or IR command transmissions 114, originating in this instance from an appropriate RF transmitter or IR blaster provisioned to the STB/DVR appliance 310. In this configuration, a set up application resident in STB/DVR 310 may be utilized to configure device 100', using for example an Internet connection 304 accessible through a cable modem and/or cable distribution system headend.

Figure 4:
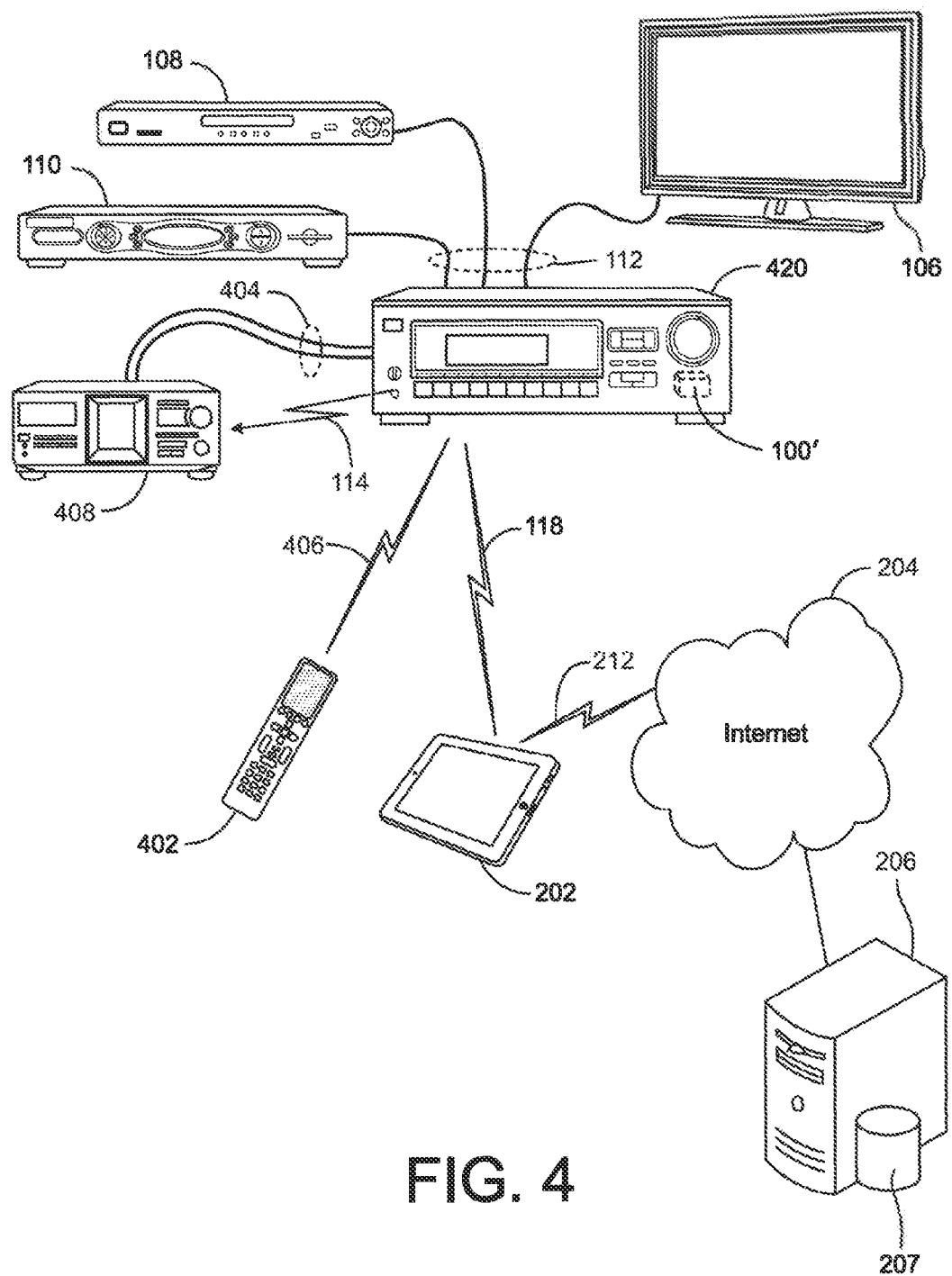

In the further illustrative embodiment of FIG. 4, a device having control functionality 100' may be embedded in an AV receiver 420 which may serve as an "HDMI" switch between various content sources such as a STB/DVR 110 or a DVD player 108 and a rendering device such as TV 106. In addition to "HDMI" inputs, AV receiver 420 may also support various other input formats, for example analog inputs such as the illustrative input 404 from CD player 408; composite or component video; S/PDIF coaxial or fiberoptic; etc. In this embodiment, request signals 406, voice commands, etc., may be directed to AV receiver 420, for example from remote control 402, for action by device 100'. As before, resulting appliance commands may be transmitted using CEC signals transmitted over "HDMI" connections 112, RF, or via IR signals 114 transmitted from an associated IR blaster. As appropriate for a particular embodiment, initial configuration of device 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying controlling device concept described herein. For example, device 100' may be incorporated into an Internet-capable TV, an "HDMI" switch, a game console, etc.; appliance command set and capability database 207 may be located at an internet cloud or a cable system headend, may be stored locally (in all or in part), which local storage may take the form of internal memory within the device 100' itself or in an appliance such as a TV, STB or AV receiver, or may take the form of a memory stick or the like attachable to a smart device or appliance; etc.

Figure 5:
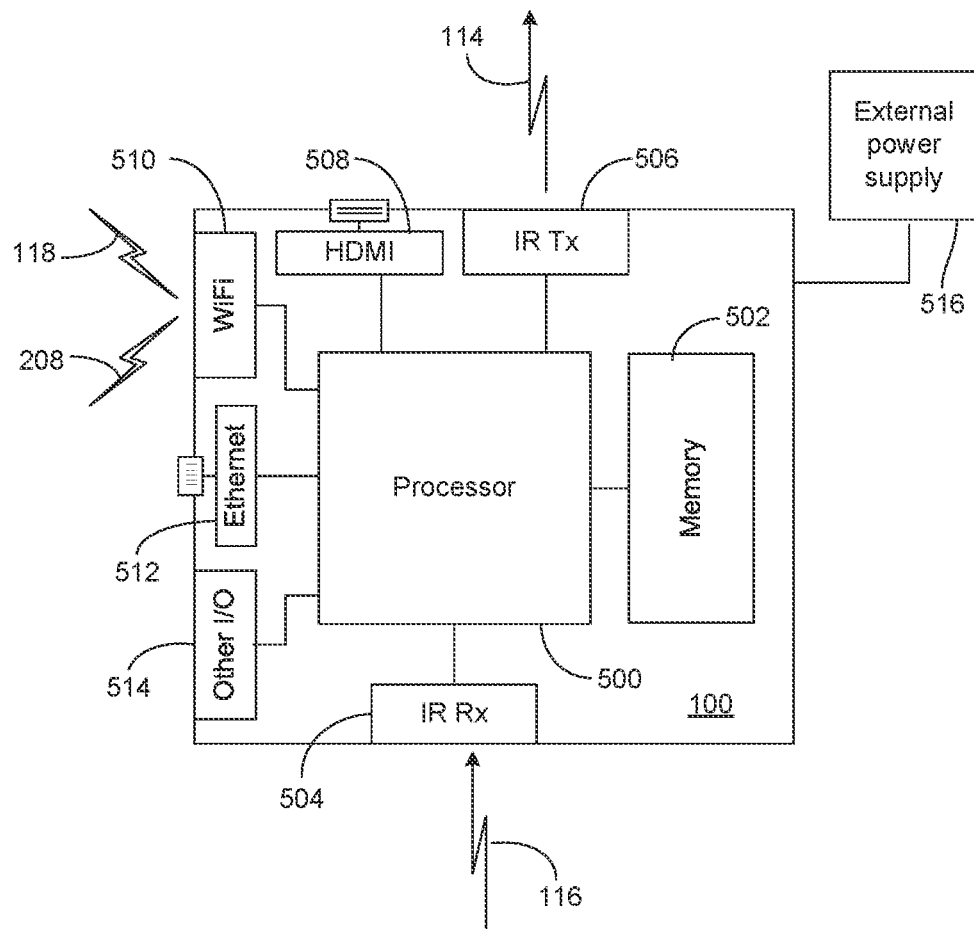
FIG. 5 illustrates a block diagram of an example controlling device.

With reference to FIG. 5, an example device 100 (whether stand alone or in an appliance supporting functionality embodied as a device 100') may include, as needed for a particular application, a processor 500 coupled to a memory 502 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example device 100 platform may include IR receiver circuitry 504 and IR transmitter circuitry 506; one or more microphones; an "HDMI" interface 508; one or more RF, e.g., WiFi, transceivers and interfaces 510; an Ethernet interface 512; and any other wired or wireless I/O interface(s) 514 as appropriate for a particular embodiment, by way of example without limitation "BLUETOOTH," "RF4CE," "USB," "ZIGBEE," "ZENSYS," "X10/INSTEON," "HOMEPLUG," "HOMEPNA," etc. In some instances, the electronic components comprising the example device 100 platform may be powered by an external power source 516. In the case of a standalone device 100 such as illustrated in FIG. 1 or 2, this may comprise for example a compact AC adapter "wall wart," while integrated devices 100' such as illustrated in FIG. 3 or 4 may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

As will be understood by those skilled in the art, some or all of the memory 502 may include executable instructions that are intended to be executed by the processor 500 to control the operation of the device 100 (collectively, the device programming) as well as data which serves to define the necessary control protocols and command values for use in transmitting command signals to controllable appliances (collectively, the command data). In this manner, the processor 500 may be programmed to control the various electronic components within the example device 100, e.g., to monitor the communication means 504, 510 for incoming request messages from controlling devices, to monitor the microphones for sound signals, to cause the transmission of appliance command signals, etc.

To cause the device 100 to perform an action, the device 100 may be adapted to be responsive to events, such as a received voice signal, a received request message from remote control 102 or smart device 104, changes in connected appliance status reported over "HDMI" interface 508, "WIFI" interface 510, or "ETHERNET" interface 512, etc. In response to an event, appropriate instructions within the device programming may be executed. For example, when a command request is received via a microphone, from a smart phone 104, or the like, the device 100 may retrieve from the command data stored in memory 502 a preferred command transmission medium (e.g., IR, "RF4CE", CEC over "HDMI," IP over "WIFI,", etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the device programming in order to facilitate adjustment of appliance settings (e.g., device input/output port settings, volume levels, picture parameters, etc.) to match user-defined activity profiles, e.g. "Watch TV", "View a movie", etc. It will also be appreciated that the command values, protocols to use, etc. may be obtained from a cloud-computing service as needed or as required.

Figure 6:
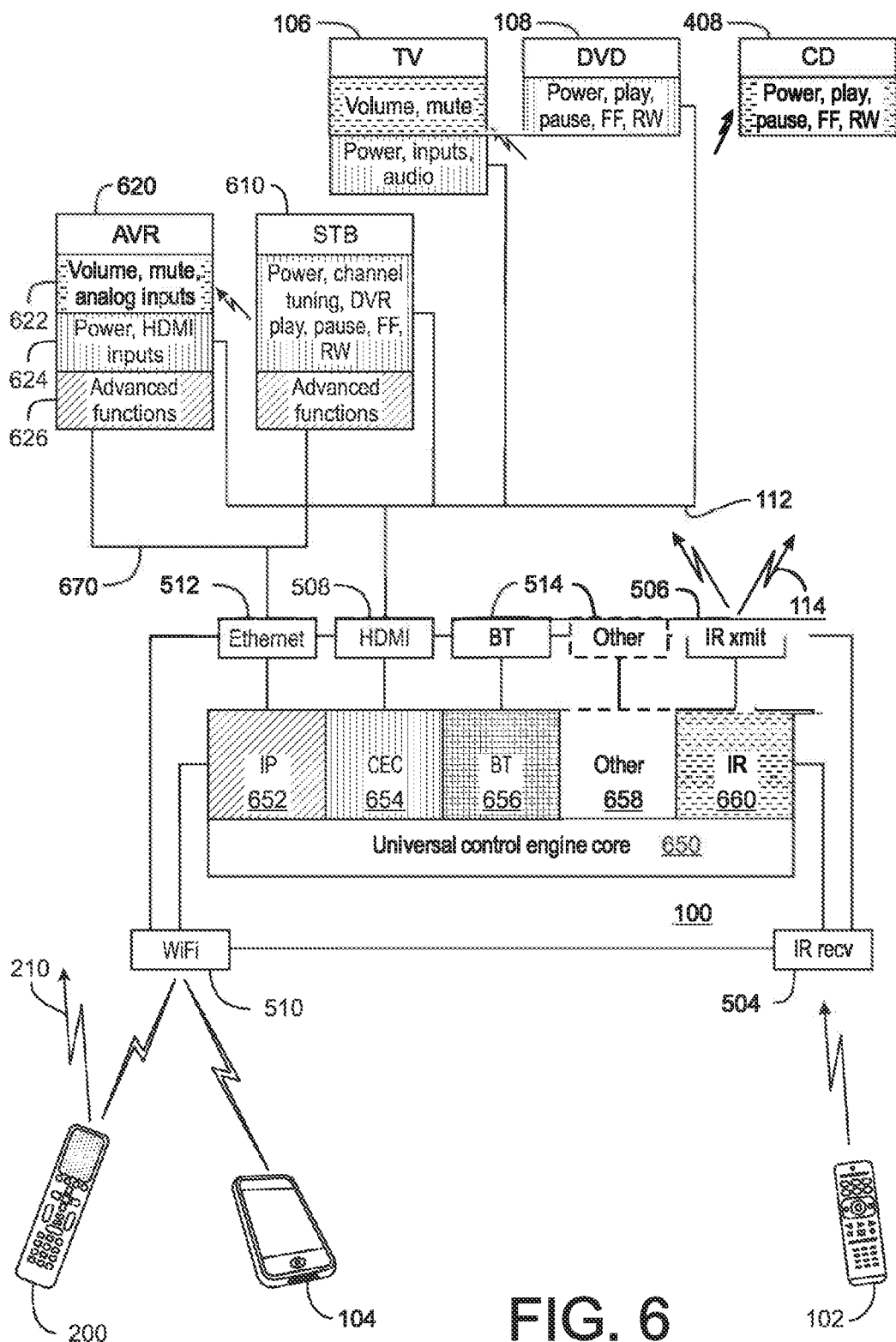
FIG. 6 illustrates a graphical representation of an example control environment.

An overview of an example control environment utilizing a device 100 is presented in FIG. 6. The programming of the example device 100 may comprise a universal control engine core 650 together with a series of scalable software modules 652 through 660, including apps or "skills," each module supporting a particular appliance command protocol or method and provisioned as appropriate for a particular embodiment. By way of example, the illustrative embodiment of FIG. 6 may include an internet protocol (IP) module 652, a CEC over "HDMI" module 654, a "BLUETOOTH" module 656, an IR module 660, and other modules(s) 658, e.g., an RF module, as appropriate for the particular application. The appliances to be controlled may include an IP enabled AV receiver 620, an IP enabled STB/DVR 610, TV 106, DVD player 108, and CD player 408. As illustrated, certain of these devices may be interconnected via "HDMI" 112 and/or Ethernet 670 interfaces. (In this regard, it should be appreciated that the illustrative interconnections 112 and 670 of FIG. 6 are intended to depict logical topography only, and accordingly details of exact physical cabling structure and/or the presence of any necessary switches, routers, hubs, repeaters, interconnections, etc., are omitted for the sake of clarity.)

The preferred method/protocol/medium for issuance of commands to the example appliances of FIG. 6 may vary by both appliance and by the function to be performed. By way of example, volume control and analog input selection commands 622 targeted to AV receiver 620 may be required to be issued via IR transmissions, while power on/off and "HDMI" input selection functionality commands 624 may be better communicated via CEC commands and advanced functionality commands 626 such as sound field configuration may be best communicated via an Ethernet connection. In a similar manner, the various operational functions of the other appliances may be best commanded via a mixture of mediums, methods, and protocols, as illustrated. As will be appreciated, in some instances a particular appliance may support receipt of an operational command via more than one path, for example the power on/off function of AV receiver 620 may be available not only as a CEC command, but also via an IR command. In such instances, the preferred command format may be that which has been determined to offer the greatest reliability, for example, in the above instance the CEC command may be preferred since this form of command is not dependent on line-of-sight and also permits confirmation that the action has been performed by the target appliance.

In order to determine the optimum method for each configured appliance type and command, the example device core program 650 may be provisioned with a preferred command matrix 700, as illustrated in FIG. 7. Example preferred command matrix 700 may comprise a series of data cells or elements, e.g. cells 712, each corresponding to a specific command 702 and a specific one of the appliances to be controlled 704. The data content of such a cell or element may comprise identification of a form of command/transmission to be used and a pointer to the required data value and formatting information for the specific command. By way of example, the data element 712 corresponding to the "Input 2" command 706 for the configured TV appliance 708, may comprise an indicator that a CEC command is to be used, i.e., an indicator of the transmission device that is to be used to communicate the command to the intended target appliance, together with a pointer to the appropriate command data value and HDMI-CEC bus address; while data element 714 corresponding to the same command function for the configured AV receiver 710 may comprise an indicator that an IR command is to be used, together with a pointer to appropriate command data and formatting information within an IR code library stored elsewhere in memory 502. In certain embodiments one or more secondary command matrices 716 may also be provisioned, allowing for the use of alternate command methods in the event it is determined by the device programming that a preferred command was unsuccessful. Command matrix 700 may also contain null entries, for example 718, where a particular function is not available on or not supported by a specific appliance. In an example embodiment, command matrix 700 may be created and loaded into the memory 502 of the device 100 during an initialization and set-up process, as will now be described in further detail.

In order to perform initial configuration of device 100, a setup application may be provided. In some embodiments, such a set up application may take the form of programming to be executed on any convenient device with a suitable user interface and capable of establishing communication with the device 100, such as without limitation a smart phone, tablet computer, personal computer, set top box, TV, etc., as appropriate for a particular embodiment. In other embodiments such a set up application may be incorporated into the device programming itself, utilizing for example a connected TV screen, smart device screen, etc. and an associated controlling device (which may include the smart device, a cloud-based voice service platform device, etc.) having input capabilities, e.g., keys, microphone(s), etc., for use as the user interface. Regardless of the exact form and location of the programming and user interface means, the series of steps which may be performed by a set up application when configuring the device 100 for operation with a specific set of appliances remains similar. Accordingly, it will be appreciated that the methods comprising the illustrative set up application presented below in conjunction with FIGS. 8 and 9 may be generally applied, mutatis mutandis, to various alternative set up application embodiments.

Figure 8:
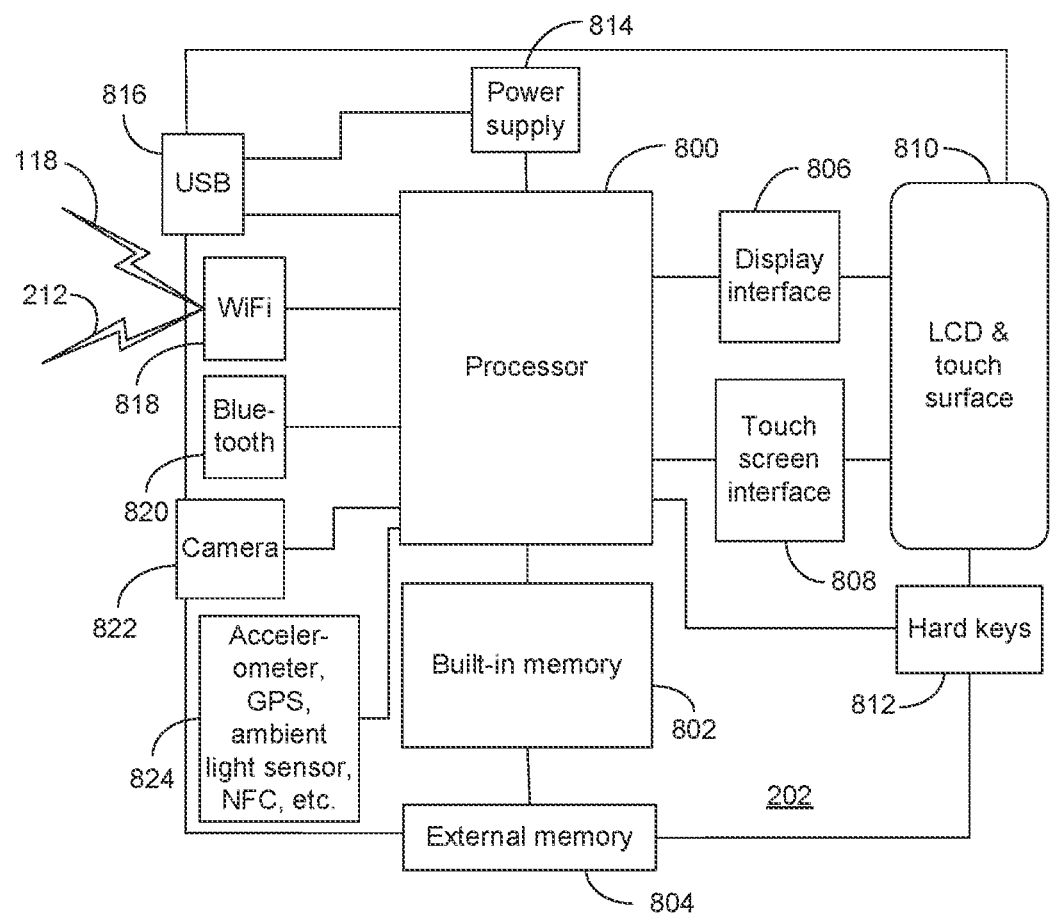
FIG. 8 illustrates a block diagram of an example smart device which may support a remote control app and a setup method for use in configuring the smart device as a controlling device.

With reference to FIG. 8, as known in the art a tablet computer such as the example device 202 of FIG. 2 may comprise, as needed for a particular application, a processor 800 and a memory 802, which memory may comprise a combination of ROM memory, RAM memory, and/or nonvolatile read/write memory and may take the form of a chip, a hard disk, a magnetic disk, an optical disk, a memory stick, etc., or any combination thereof. In some embodiments, provision may also be made for attachment of external memory 804 which may take the form of an SD card, memory stick, or the like. Hardware provisioned as part of an example tablet computer platform may include a microphone, an LCD touchscreen 810 with associated display driver 806 and touch interface 808; hard keys 812 such as for example a power on/off key; a USB port 816; "WIFI" transceiver and interface 818; a "BLUETOOTH" transceiver and interface 820; a camera 822; and various other features 824 as appropriate for a particular embodiment, for example an accelerometer, GPS, ambient light sensor, near field communicator; etc. The electronic components comprising the example tablet computer device 202 may be powered by a battery-based internal power source 814, rechargeable for example via USB interface 816.

Memory 802 may include executable instructions that are intended to be executed by the processor 800 to control the operation of the tablet computer device 202 and to implement various functionalities such as Web browsing, game playing, video streaming, etc. As is known in the art, programming comprising additional functionalities (referred to as "apps") may be downloaded into tablet computer 202 via, for example, "WIFI" interface 818, "USB" 816, external memory 804, or any other convenient method. As discussed previously, one such app may comprise a control app, for example as that described in co-pending U.S. patent application Ser. No. 13/329,940 (now U.S. Pat. No. 8,918,719) of like assignee and incorporated herein by reference in its entirety, which app may be for use in commanding the operation of appliances 106, 108, 110 and/or 120 via device 100 and/or for otherwise enabling the device 202 to communicate with device 100. In order to initially configure device 100 to match the appliances to be controlled and to establish an appropriate command matrix, tablet computer 202 may also be provisioned with a setup app 214, either as part of a control app or as separately downloadable app.

Figure 9:
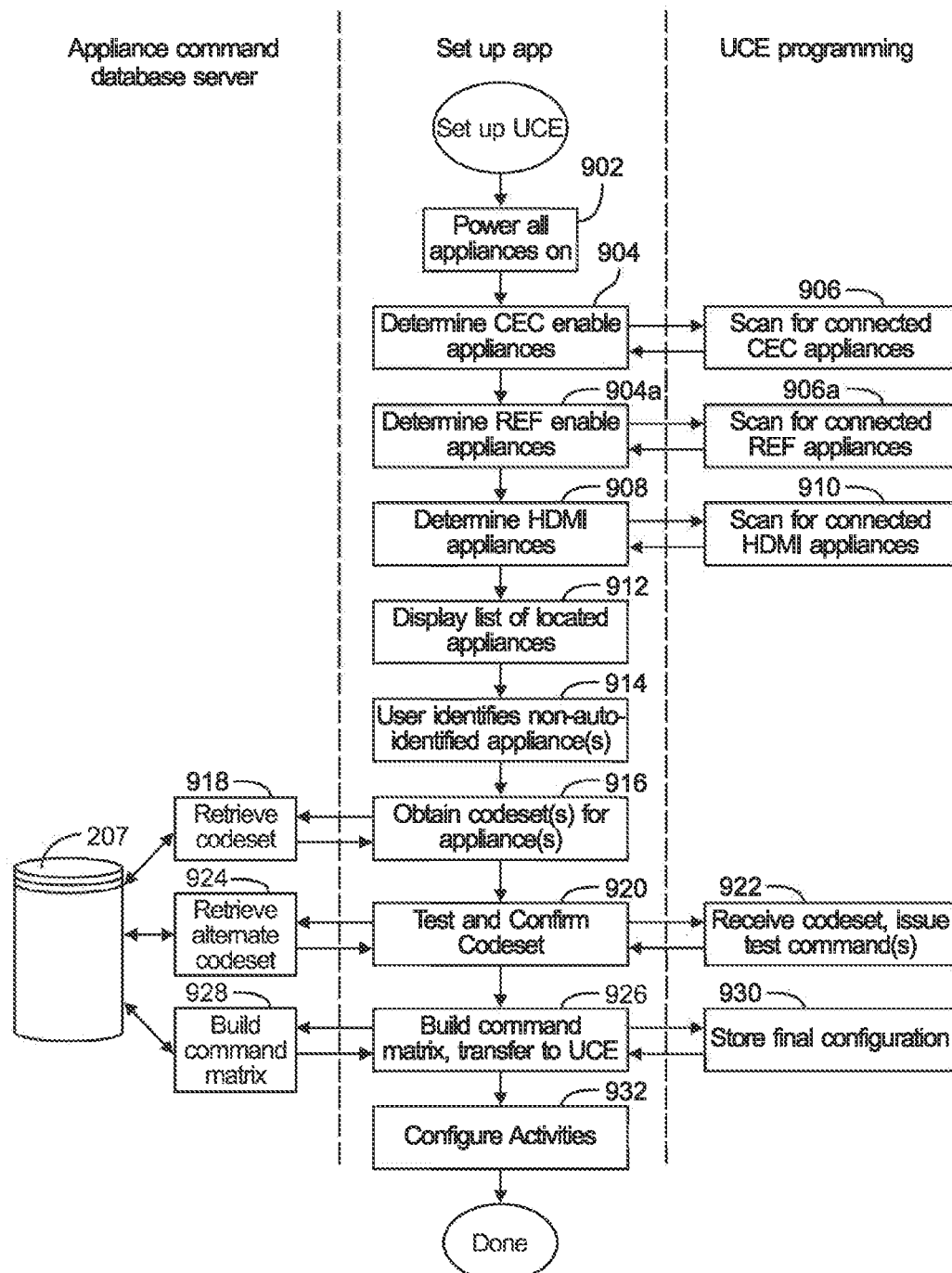
FIG. 9 illustrates an example series of steps which may be performed in order to set up and configure the smart device of FIG. 8.

With reference now to FIG. 9 such a setup app, upon being invoked at step 902 may initially request that the user place all of the appliances to be controlled into a known state, e.g., powered on, in order to enable the appliance detection and/or testing steps which follow. In some instances, this step may be omitted if it is determined that all appliances that are known to be within the ecosystem are already in a desired state, e.g., powered on. This determination may be monitored by monitoring the state of hardware that is associated with or otherwise connected to any such appliances. Next, at steps 904 and 904*a* the setup app may determine the identity of those appliances (and, thereby, determine those appliances which are CEC-enabled, RF enabled (e.g., RF4CE-enabled), etc.) This may be accomplished by communicating a request to the associated device 100, which at step 906 may, for example, cause the device programming to scan connected "HDMI" devices for appliances which are CEC-enabled and/or identifiable via interaction over the "HDMI" interface, for example as described in co-pending U.S. patent application Ser. No. 13/198,072 (now U.S. Pat. No. 8,812,629), of like assignee and incorporated herein by reference in its entirety, and communicate such appliance identities to the setup application. Likewise, this may be accomplished by communicating a request to the associated device 100, which at step 906*a* causes the device programming to scan for appliances which are RF-enabled and/or identifiable via interaction over one or more communication interfaces.

Thereafter, at step 908 the setup application may determine if additional non-CEC appliances are connected to the device 100 via the "HDMI" interface. This may be accomplished by requesting the device programming to scan for any further "HDMI" connections at step 910 and communicate the findings back to the setup application. Though not illustrated, it will be appreciated that where appropriate for a particular embodiment the device programming may conduct similar scans to in order to discover appliances connected via Ethernet, "USB," "BLUETOOTH," "RF4CE," "WIFI," etc., where such interfaces may be provisioned to a device 100.

Thereafter, at step 912 the setup application may display or otherwise communicate a listing of detected appliances (both identified and not yet identified) to the user. At step

914, the user may be prompted to enter appliance identifying information for those "HDMI" or otherwise connected appliances which were detected but not identified, as well as identifying information regarding any additional appliances which may form part of the system to be controlled but are not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; etc.; or any combination thereof as appropriate for a particular embodiment.

As noted above, once sufficient identifying information has been acquired, at step 916 the setup app may communicate that information to a database/cloud server, for example server 206, for performance of step 918, comprising identification of and retrieval of command codeset and capability data corresponding to the identified appliances from a database 207 and/or one or more appropriate "skills," and provision this data/programming to the setup application for processing and ultimate transfer to the device 100 in whole or in part. As will be appreciated, a transferred codeset may comprise complete command data values, formatting information, and/or one or more further transmission related parameters that would be used to transmit a command via a wireless connection, e.g., IR, RF, etc., or via a wired connection, may comprise one or more pointers to such command data values, formatting information, and/or one or more further transmission related parameters that are already stored in the memories 502 and/or 802/804 of the device 100 or the device upon which the setup application is currently resident, or a combination thereof. Where necessary, for example when database 207 may contain alternate codesets for an identified appliance, or where uncertainty exists regarding a particular appliance model number, etc., at steps 920, 922, and 924 various control paradigms and/or command data sets may be tested against the appliances to be controlled. Such testing may take the form of soliciting user response to effects observable commands, monitoring of "HDMI" interface status changes as described for example in U.S. patent application Ser. No. 13/240,604 (now U.S. Pat. No. 9,019,435), of like assignee and incorporated herein by reference in its entirety, or any other method as convenient for a particular application. Once appropriate codesets have been fully determined, at steps 926, 928, and 930 a suitable preferred command matrix, for example as illustrated in FIG. 7, may be constructed and stored into the memory 502 of example device 100, the matrix being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

The construction of said preferred command matrix may be performed at the database server or within the setup application, or a combination thereof, depending on the particular embodiment. Once a preferred command matrix has been finalized and stored in the device 100, at step 932 a series of desired appliance configurations associated with specific user activities may be configured and stored into the device 100, as will be now be described.

Figure 10:
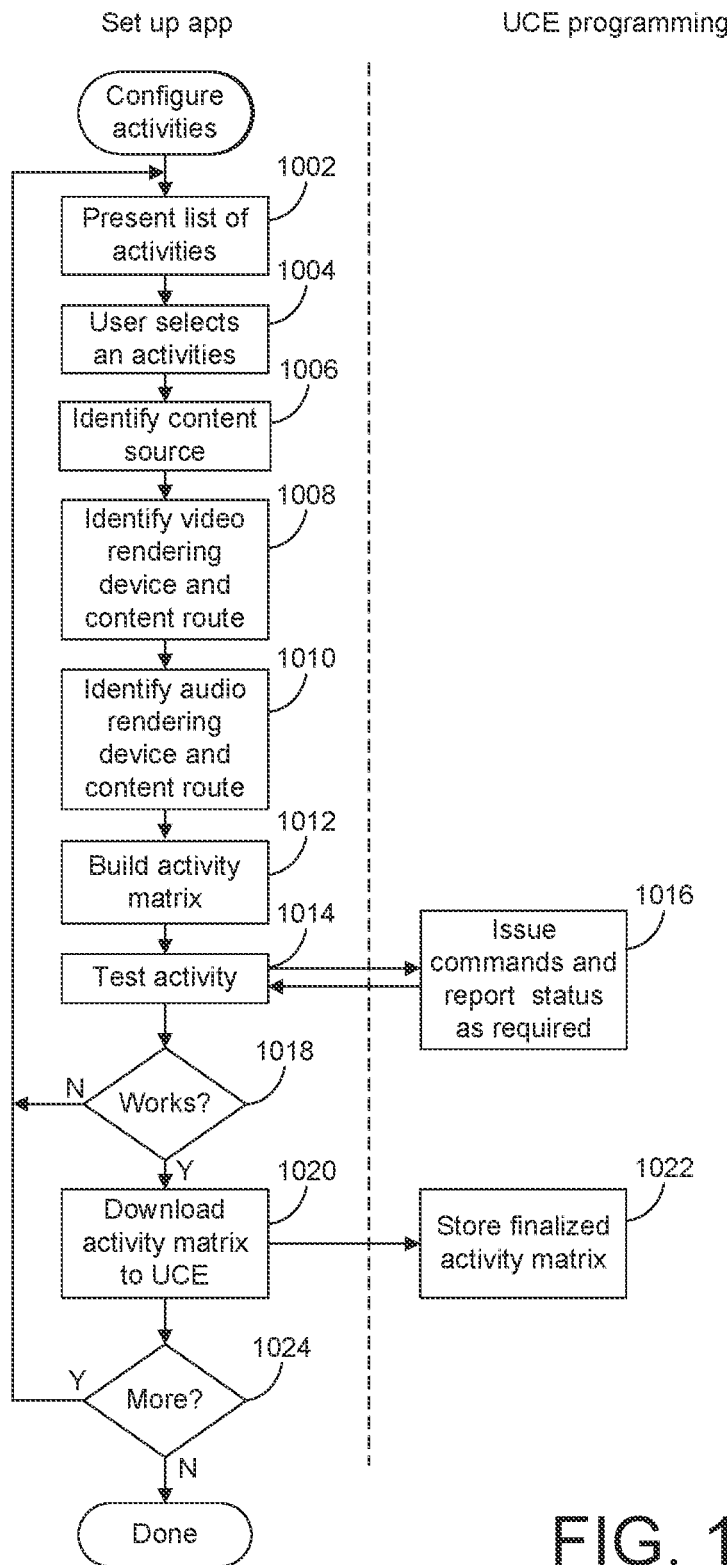
FIG. 10 illustrates an example series of steps which may be performed in order to define to a control device an appliance configuration which corresponds to a user activity.

Upon completion and storage of a preferred command matrix, an example setup application may subsequently guide a user through a series of steps in order to establish the desired appliance configurations for a series of possible activities. With reference to FIG. 10, at step 1002, the user may be presented with a list of possible activities, e.g., "Watch TV", "Watch a movie", "Listen to music", etc. In some embodiments, the user may also be able to edit activity titles and/or create additional user defined activities. At step 1004 a user may select a particular activity for configuration, for example "Watch TV". At step 1006, the user may be prompted to identify the content source for the activity being configured, for example cable STB/DVR 110 for the example "Watch TV" activity. Such a prompt may take the form of a listing of eligible appliances as determined during the foregoing appliance set up steps; explicit user provision of an appliance type; etc. Next, at steps 1008 the user may be prompted in a similar manner to select video and audio rendering appliances for use in this activity, for example TV 106 and AVR receiver 120 respectively. Depending upon the system topography and the interfaces in use (i.e. "HDMI"/CEC, IP, analog, etc.) the set up application in concert with device programming may be able to ascertain which input port of each rendering appliance is attached to the content source appliance identified for this activity and/or if any intermediate switching appliance is in use (for example AV receiver 420 of the system illustrated in FIG. 4). Where such information is obtainable, the set up application may automatically create all or part of an appropriate rendering device input selection for the activity being configured. If not, at steps 1008 and 1010, the user may be additionally requested to identify the applicable content route(s) to the rendering appliances, e.g., input port numbers, presence of intermediate switches, etc. During or upon conclusion of steps 1004 through 1010, the set up application may construct an activity matrix, for example as illustrated in FIG. 11. By way of example, activity matrix 1100 for a "Watch TV" activity may comprise a series of cells, for example 1110 or 1112, each corresponding to a desired configuration of a particular state 1106 or function 1108 of a specific appliance 1104 during the specified activity. By way of example, cell 1110 may indicate that the input of AV receiver 120 is to be set to "S/PDIF2", while cells 1112 and 1114 may indicate that transport function commands (e.g., "play", "pause", "fast forward" etc.) are to be directed to STB/DVR 110 and not to DVD 114. In this regard, it will be appreciated that while in some embodiments the assignment of functions such as, for example, volume control, to specific appliances during a particular activity may be performed within an individual controlling device, i.e., the controlling device may determine the appliance to which volume control commands are to be directed, in a preferred embodiment this assignment may be performed within the device 100, thereby ensuring consistency across each activity when multiple controlling devices are present in an environment, for example devices 102 and 104 of the environment illustrated in FIG. 1.

Returning now to FIG. 10, at steps 1014 and 1016 the newly-constructed activity matrix 1100 may be tested by causing the device programming, utilizing preferred command matrix 700, to issue the commands necessary to place the identified appliances into the desired state and thereafter receiving verification at step 1018 that the desired activity was successfully initiated. It will be appreciated that such verification may comprise, for example, detection and reporting of "HDMI" or other content streams and/or appliance status by device programming by directly monitoring CEC status or by using methods such as described for example in U.S. Pat. No. 9,019,435; solicitation of user input confirming correct operation; monitoring for presence or absence of analog input signals; recording of appliance status or error messages; etc.; or any combination thereof as appropriate for a particular embodiment.

If testing is unsuccessful, at step 1018 the set up application may return to step 1002 to allow reconfiguration of that activity and/or definition of alternative activities. If testing was successful, at steps 1020 and 1022 the completed activity matrix, for example 1100 as illustrated in FIG. 11, may be transferred to the device 100 for storage in device memory 502. Thereafter, at step 1024 the user may be offered the opportunity to return to step 1002 to define additional activity configurations, for example 1101,1102 as illustrated in FIG. 11, or to exit the activity configuration process.

Figure 13:
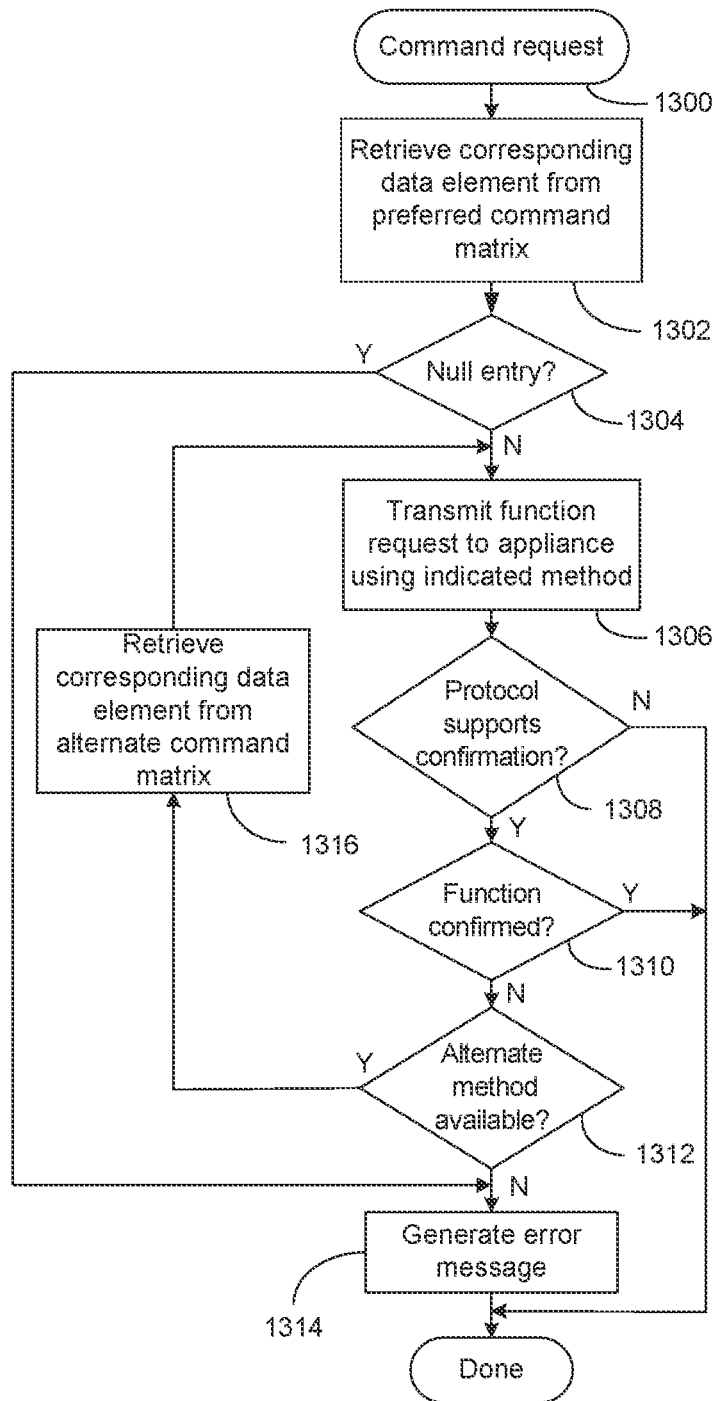
FIG. 13 illustrates an example series of steps which may be performed by a controlling device in issuing a function command to an appliance.

With reference now to FIG. 13, the series of steps performed by the device programming in order to convey a function command to an appliance in accordance with a command request 1300 received from a controlling device such as remote control 102 or 200, smart device 104 or 202, via voice input, etc., or in accordance with an internally generated requirement resulting from receipt of an activity request (as will be described hereafter) may initially comprise retrieval from a preferred command matrix that data element which corresponds to the requested command and target appliance. By way of specific example, receipt of a "TV power on" request from remote control 102, via voice input, or the like at a device 100 provisioned with the preferred command matrices illustrated in FIG. 7 may cause retrieval of data element 720, indicating that the command is to be communicated to the TV appliance, e.g., television 106, using an "HIDMI"/CEC command. At step 1304, the device programming may determine if the retrieved value constitutes a null element. If so, the referenced appliance does not support the requested command and accordingly at step 1314 an error message may be generated and the process thereafter terminated. As will be appreciated, the exact nature of such an error message may depend upon the particular embodiment and/or the requesting controlling device: for example, if the request originated from a controlling device which is in bidirectional communication with the device the error may be communicated back to the requesting device for action, i.e., display to the user, illuminate a LED, activate a buzzer, etc. as appropriate. Alternatively, in those embodiments where a device 100 is incorporated into an appliance as device 100', that appliance's front panel display, LEDs, speaker, etc. may be utilized.

If the retrieved preferred command matrix element data is valid, at step 1306 the device 100 may communicate the corresponding function command to the target appliance using the indicated command value and transmission method, e.g., for the example data element 720 this may comprise issuing a CEC "power on" command to CEC logical device address zero (TV) via the device's "HDMI" interface 508. Once the command has been issued, at step 1308 the device programming may determine if the communication interface and protocol used in issuing the command provides for any confirmation mechanism, i.e., explicit acknowledgement of receipt, monitoring of "HDMI" status on an interface, detection of a media stream or HDCP handshake, etc. If not, for example the command was issued using a unidirectional IR signal and no other confirmation means such as power or input signal monitoring is available, the device programming may simply assume that the command was successful and processing is complete. If, however, confirmation means exists, at step 1310 the device programming may wait to determine if the command was successfully executed. Once positive confirmation is received, processing is complete. If no confirmation or a negative confirmation is received, at step 1312 the device programming may determine if an alternative method is available to communicate the command to the target appliance. Returning to the specific example presented above this may comprise accessing a secondary command matrix 716 in order to determine if an alternative communication method is available for the specific function, e.g., "TV power on." If an alternative does exist, at step 1316 the substitute command value and transmission method may be retrieved and processing may return to step 1306 to initiate an alternative attempt. Returning again to the specific example, if the CEC "power on" command corresponding to data element 720 of matrix 700 issued to TV 106 cannot be confirmed, an IR "power on" command encoded according to SIRCS (Sony Infrared Control System) in correspondence with the equivalent data element in secondary matrix 716 may be attempted as a substitute.

In addition to relaying individual command requests as described above, an example device 100 may also support activity selection, whereby receipt of a single user request from a controlling device, via voice input, or the like may cause a series of commands to be issued to various appliances in order to configure a system appropriately for a particular user activity, such as for example, watching television. To this end a set of matrices defining desired equipment states suitable to various activities, for example as illustrated at 1100 through 1102 of FIG. 11, may be stored in device memory 502 for access by device programming when executing such a request. As illustrated in FIG. 12, in some embodiments the programming of an example device 100 may maintain an additional matrix 1200 representative of the current state of the controlled appliances, arranged for example by appliance 1202 and by operational state 1204. By way of example, data elements 1206 and 1208 in the illustrative table 1200 may indicate that TV 106 is currently powered on (1208) with "HDMI" port number 2 selected as the input (1206). The data contents of the elements in such a table may be maintained in any convenient manner as appropriate to a particular embodiment, for example without limitation retrieval of "HDMI"/CEC status; monitoring input media streams and/or HDCP status; measuring power consumption; construction of a simulated appliance state such as described for example in U.S. Pat. No. 6,784,805; etc.; or any combination thereof. In the case of certain appliances, such as for example AV receiver 120 which may be controllable only via unidirectional IR, the current state of the appliance may not be discernible. In such cases, a null data element 1210 maybe entered into example matrix 1200 to indicate that this appliance may require configuration using discrete commands only and/or user interaction. As will be appreciated, in some embodiments the data contents of the illustrative table may be maintained in memory 502 on an ongoing basis by device programming, while in other embodiments this data may be gathered "on the fly" at the time the activity request is being processed. Combinations of these methods may also be used, for example "on the fly" gathering for appliances connected via an HDMI bus combined with maintenance of a simulated state for appliances controlled via IR signals.

Figure 14:
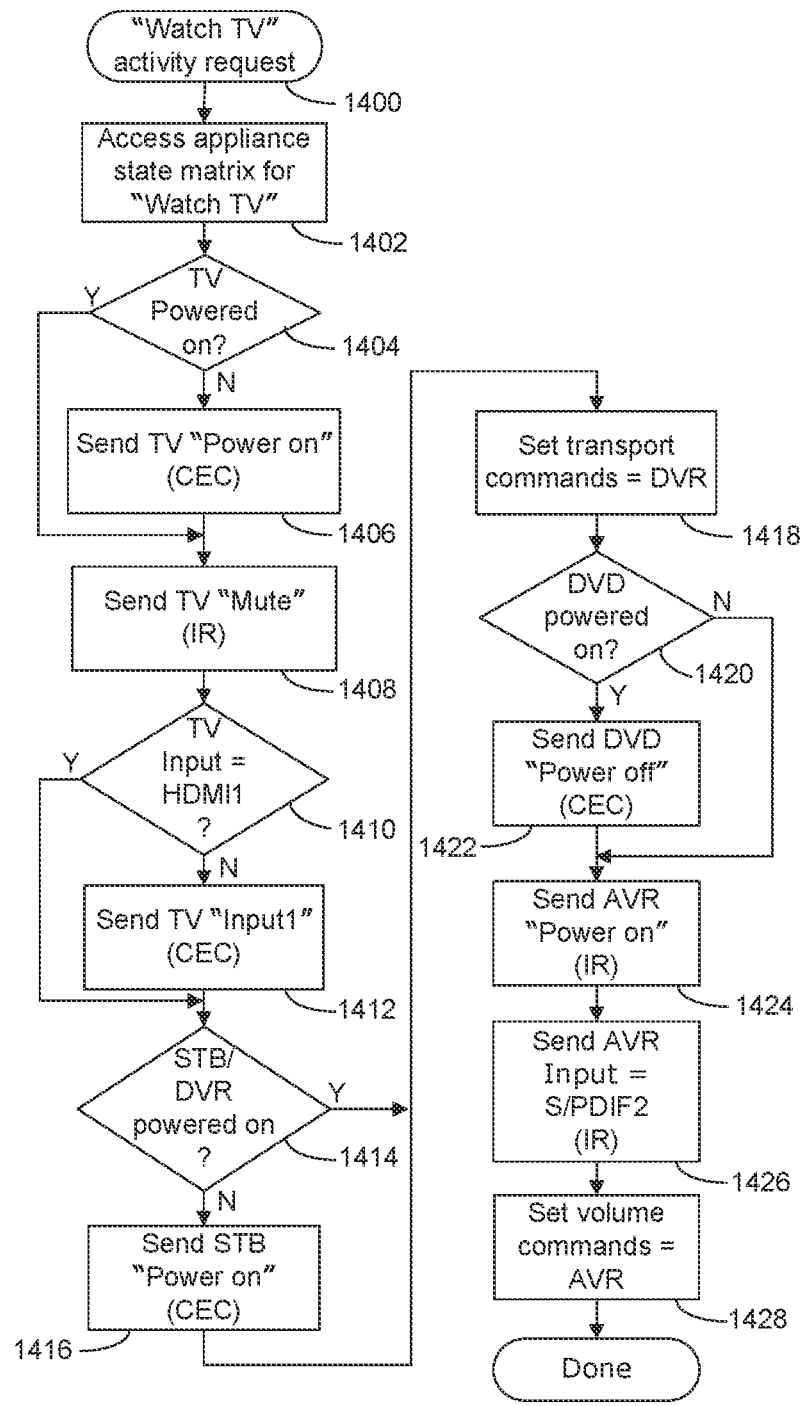
FIG. 14 illustrates an example series of steps which may be performed by a controlling device in establishing appliance states matching a desired activity defined in one of the matrices of FIG. 11.

In order to configure a group of appliances for a desired activity, device programming may compare a desired state matrix, for example 1100, to a current state matrix, for example 1200, element by element, issuing commands as necessary to bring appliances to the desired state. By way of example, an example series of steps which may be performed by the programming of a device in order to affect a "Watch TV" activity configuration will now be presented in conjunction with FIG. 14. For the purposes of this example, the reader may also wish to reference the equipment configuration of FIG. 1 and the activity and current state matrices 1100 and 1200 of FIGS. 11 and 12.

Upon receipt of a "Watch TV" request 1400, at step 1402 the example device programming may access an applicable appliance state matrix 1100. Next, at step 1404 it may be determined by the device programming whether the present "power" state of TV 106 as indicated by current state matrix 1200 matches the desired state stored in the corresponding data element of matrix 1100. If the states match, processing may continue at step 1408. If the states do not match, at step 1406 a "power on" command may be communicated to TV 106. As will be appreciated from the earlier discussion in conjunction with FIG. 13 and inspection of example preferred command matrix 700, in the illustrative system communication of the "power on" command to TV 106 may comprise a CEC command issued over "HDMI" connection 112. Next, at step 1408 a "mute" command may be communicated to TV 106, since element 1116 of illustrative matrix 1100 indicates that TV 106 is not the primary audio rendering appliance. In accordance with preferred command matrix 700, communication of the "mute" command to TV 106 may comprise an IR transmission 114. Thereafter, at steps 1410,1412 the active input of TV 106 may be set to "HDMI1" via a CEC command, and at steps 1414,1416 a CEC "power on" command may be communicated to STB/DVR 110 if that appliance is not already powered on. At step 1418, the example device programming may set an internal status to indicate that future transport command requests (e.g., play, pause, FF, etc.) should be routed to STB/DVR 110, as indicated by element 1112 of matrix 1100. Thereafter, at steps 1420,1422 a CEC "power off" command may be communicated to STB/DVR 108 if that appliance is not already powered off. Thereafter, at steps 1424 and 1426 "power on" and "input S/PDIF2" commands may be communicated to AV receiver 120 via IR signals. As will be appreciated, it may not be possible to determine the current status of AV receiver 120, as indicated for example by elements 1210 and 1220 of matrix 1200, and accordingly so-called "discrete," or explicit, function commands may be issued which may establish the desired status regardless of the current state of the appliance. Finally, at step 1428 the example device programming may set an internal status to indicate that future volume control command requests (e.g. volume up/down, mute) should be routed to AV receiver 120, as indicated by element 1118 of matrix 1100, whereafter processing of the activity request is complete.

Figure 15:
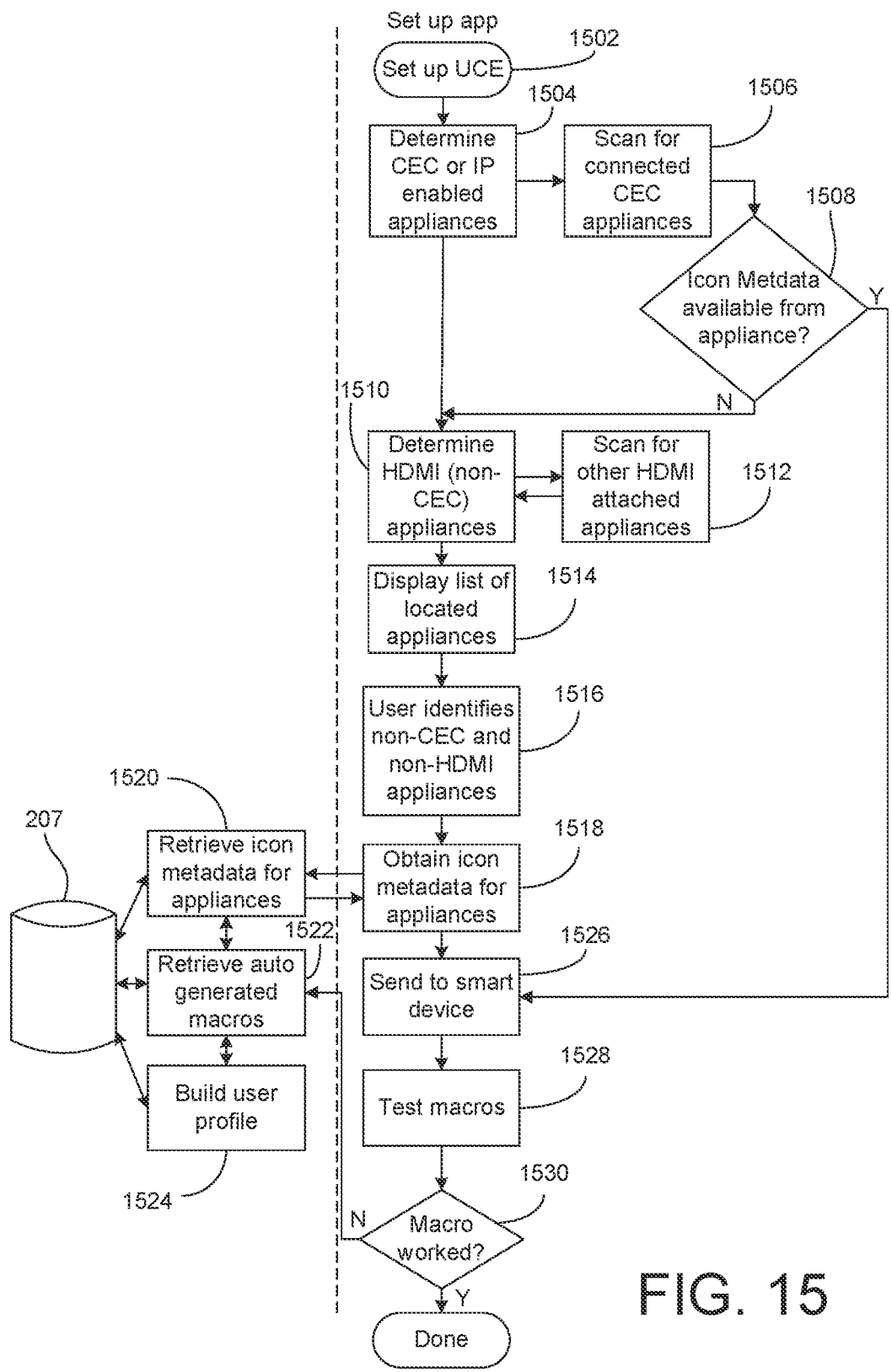
FIG. 15 illustrates an example series of steps which may be performed by a smart device to setup command control macros.

As noted above, the example device 100 may also support activity selection, whereby receipt of a single user request from a smart device, via a voice signal, etc., may cause a series of commands to be issued to various appliances in order to configure a system appropriately for one or more user activities, such as "watch TV," "watch movie," "listen to music," etc. To setup the user interface of the smart device to support such macro command functionality, an example method is illustrated in FIG. 15. More particularly, with reference to FIG. 15, upon invocation of a setup app at step 1502 a user may be requested to place all of the appliances to be controlled into a known state, e.g., powered on or already joined in a wireless network, in order to enable the appliance detection and/or testing steps which follow. Next, at step 1504 the setup app may determine the identity of those appliances, and thereby determine which of those appliances are CEC-enabled or IP enabled. This may be accomplished by communicating a request to the associated device 100, which at step 1506 may cause the device programming to scan connected "HDMI" devices for appliances which are CEC-enabled and/or identifiable via interaction over the "HDMI" interface, for example as described in co-pending U.S. patent application Ser. No. 13/198,072 (now U.S. Pat. No. 8,812,629), of like assignee and incorporated herein by reference in its entirety, and communicate such appliance identities to the setup application. Next, at step 1508 the setup app may also determine if the appliances have any associated icon information (for example stored as metadata on the appliance, available from a remote server, or the like) as well as information related to interface connection types, e.g., "WIFI," "HDMI" input/output, for use in the creation of supported macros. If the icon information is available, the icon information may be sent to the smart device by the appliance and/or retrieved by the smart device using other information provided by the appliance as appropriate as shown in step 1526. An icon corresponding to the icon information may then be automatically added to the user interface of the smart device whereupon an activation of the added icon may be used to provide access to command and control functionalities associated with the corresponding controllable device, including commands in the form of a listing of automatically generated macros available for that controllable device as described below. Thus, icon information provided to the smart device may be used in connection with information stored on the smart device, stored in the internet cloud and/or at a remote server to automatically add an icon to the user interface of the smart device where the icon can be in the form of a logo for the controllable appliance, icons in the form of logos for content (e.g., television station logos) that can be accessed via the controllable appliance, etc. In a further illustrative embodiment, icons may function as soft keys which may be selected to cause the performance of a further action for example, to display a device control page (e.g., to present television control soft keys such as channel up, channel down, etc.), cause the transmission of commands, etc. as described for example in U.S. patent application Ser. No. 10/288,727, (now U.S. Pat. No. 7,831,930) of like assignee and incorporated herein by reference in its entirety, or any other method as convenient for a particular application. In a similar manner, an appropriate app or "skill" can be retrieved for use by the smart device, for example from a cloud-based service, to enable the smart device (which may or may not include an associated display) to provide an appropriate user interface, to receive input via use of a voice signal, and/or to enable transmission and/or receipt of desired signals to and/or from the device 100.

The setup application then continues to step 1510 (after scanning for CEC connected appliances as discussed above) whereat the setup application may next determine if additional non-CEC appliances are connected to the device 100 via the "HDMI" interface. This may be accomplished by requesting the device programming to scan for any further "HDMI" connections at step 1512 and communicate the findings back to the setup application. Though not illustrated, it will be appreciated that, where appropriate for a particular embodiment, the device programming may conduct similar scans in order to discover appliances connected via Ethernet, "USB," "BLUETOOTH," "RF4CE," "WIFI," etc., where such interfaces may be provisioned to a device 100.

Thereafter, at step 1514 the setup application may display, annunciate, etc. a listing of detected appliances (both identified and not yet identified) to the user. At step 1516, the user may then be prompted to provide appliance identifying information for those "HDMI" or otherwise connected appliances which were detected but not identified, as well as identifying information regarding any additional appliances which may form part of the system to be controlled but which were not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; MAC address; etc.; or any combination thereof as appropriate for a particular embodiment.

Once appropriate identifying information has been acquired, at step 1518 the setup app may communicate that information to a database server, for example server 206, for performance of step 1520 in which the database server uses the identification information to retrieve icon information as needed (e.g., when such data was not obtainable from the appliance), command information and/or app/"skill" programming as discussed previously, and in step 1522, to automatically generate executables, including macros which correspond to the appliance or a plurality of appliances considering their capability data as maintained in a database 207 and/or as retrieved from the appliances. Any such data gathered from and/or created by the server 206 will then be provisioned to the setup application for processing and ultimate transfer to the smart device and/or device 100 as required. As will be appreciated, the transferred information and/or metadata may comprise user interface data, complete command data values, appliance input/output data and current status, formatting information, pointers to command data values and formatting information already stored in the memories 502 and/or 802/804 of the device 100 or the device upon which the setup application is currently resident, etc. Where necessary, for example when database 207 may contain alternate codesets, icon metadata, or macro information for an identified appliance, or where uncertainty exists regarding a particular appliance model number, etc., at steps 1528, 1530, and 1522 various control paradigms and/or command data sets may be tested against the appliances to be controlled. Such testing may take the form of soliciting user response to effects observable commands, monitoring of "HDMI" interface status changes as described for example in U.S. Pat. No. 9,019,435, of like assignee and incorporated herein by reference in its entirety, or any other method as convenient for a particular application. Once appropriate codesets and macro operations have been fully determined, at steps 1528 and 1530 a suitable preferred user profile 1524, may be constructed and stored into the memory 502 of example device 100, the user profile 1524 being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said user profile 1524 may be performed at the database server or within the setup application, or a combination thereof, depending on the particular embodiment.

Figure 16:
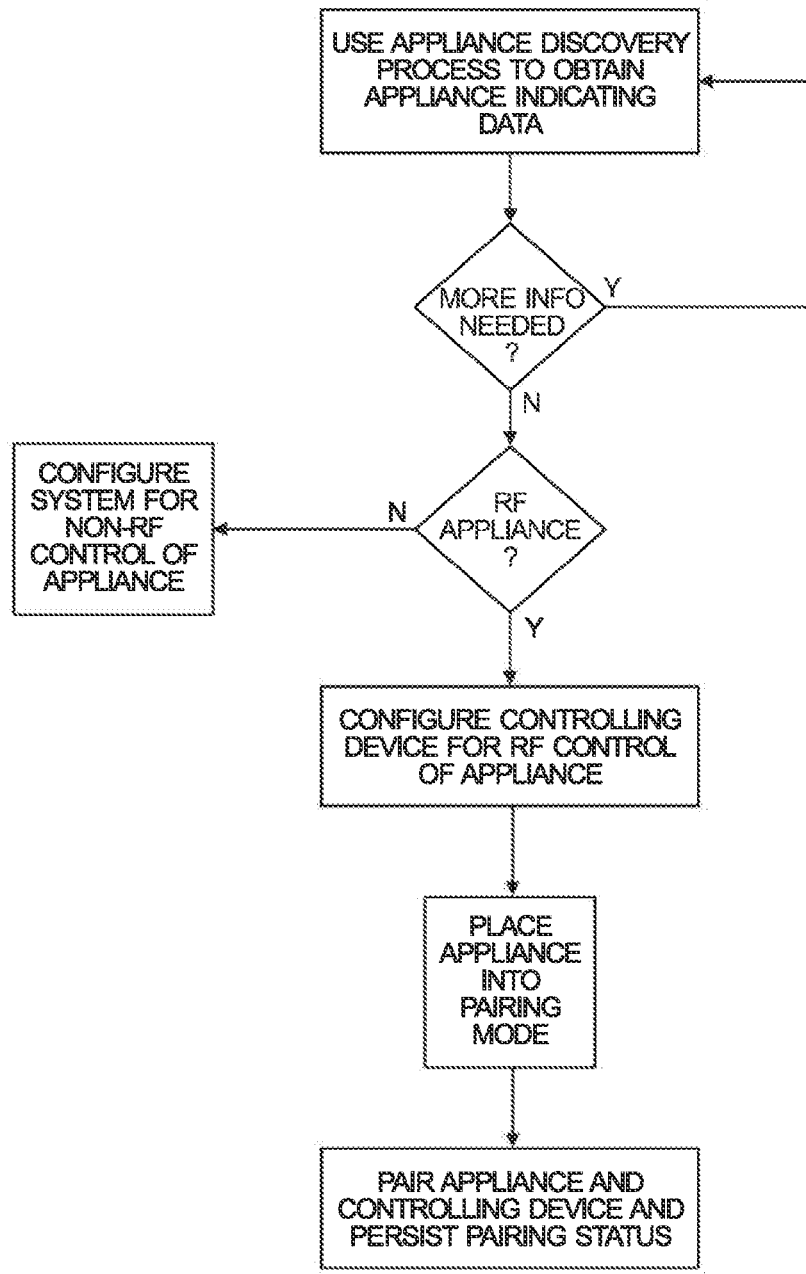
FIG. 16 illustrates an example series of steps which may be performed to configure a controlling device for issuing command communications via use of RF communication methodologies.

It is also contemplated that the methods described above can be used to provide a device 100 with universal RF controlling capabilities. To this end, as illustrated in FIG. 16, a host device, e.g., a device 100 having some or all of the functionalities described above, can use an appliance discovery process, which may entail using a multi-cast discovery schema, to obtain information about one more appliances 106, 108, 110, etc. For example, the host device may, through use of the appliance discovery process, such as described in U.S. application Ser. No. 13/198,072 (now U.S. Pat. No. 8,812,629), receive from an appliance through use of an interconnection with the appliance, e.g., a wired or wireless coupling between the appliance and the host device, first appliance related data, e.g., appliance ID, brand name, model number, name, parameters associated with a communication methodology supported by the appliance, etc. The first appliance related data retrieved from the appliance (if the first appliance related data does not itself indicate that the appliance is responsive to a particular RF protocol) can then be used to determine if the first appliance related data received from the appliance corresponds to a single one of the plurality of appliance records/appliance profiles that are stored within a database (for example, a database associated with a cloud server) or multiple ones of the plurality of appliance records stored within the database as described previously. It is to be further appreciated that such information may be obtained by reading such information from a provided token, QR code, or the like as also described previously.

When it is determined that the first appliance related data received from the appliance corresponds to a single one of the plurality of appliance records stored within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of codesets the RF codeset that is supported by that appliance. A controlling device in communication with the host device (or the host device itself) can then be provisioned with the indicated RF codeset—as described above—to thereby configure the controlling device (or the host device in the event the host device is intended to be a controlling device) to issue commands directly to the appliance, via use of a RF transmitter, where the command that is caused to be issued for reception by the appliance will correspond to a command event received at the controlling device, e.g., an event indicative of an input element being activated, a communication being received from an external device, etc. Likewise, via use of such gathered information, a smart device in communication with the device 100 can be provisioned with an app/"skill" to provide an appropriate user interface, to receive input via use of a voice signal, and/or to enable transmission and/or receipt of desired signals to and/or from the device 100 as needed or required.

When it is determined that the first appliance related data received from the appliance corresponds to multiple ones of the plurality of appliance records within the database, further appliance related data, e.g., further ones of appliance ID, brand name, model number, name, parameters associated with a communication methodology supported by the appliance, etc., is preferably caused to be iteratively received from the appliance through use of the same or other interconnections with the appliance until such time as no further appliance related data is capable of being retrieved from the appliance or until such time as all appliance related data received from the appliance corresponds to a single one of the plurality of appliance records stored within the database. Again, as before, when it is determined that the collective appliance related data received from the appliance corresponds to a single one of the plurality of appliance records within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of protocol codesets the RF codeset that is supported by that appliance. A controlling device, e.g., remote control 104 in communication with the host device (or the host device itself), can then be provisioned with the indicated RF codeset to thereby configure the controlling device (or the host device) to issue commands directly to the appliance, via use of a RF transmitter, where the command issued will correspond to a command event. Thus, it is to be appreciated that automatic device discovery and pairing actions described herein may be possible using partial data received from and or communicated via one or more input/output connections of one or more protocol types and that the controlling device having device 100 functionality may accordingly have multiple input/output connections and support one or more protocol types. For example, the controlling device having device 100 functionality may support "BLUETOOTH" low energy (BLE), "ZIGBEE," and/or "RF4CE" or otherwise use the same radio but with a different network protocol stack without limitation.

Once the appliance discovery and configuration processes have been completed and the controlling device loaded with the specific profile for the appliance, a RF pairing operation between the controlling device and the appliance is caused to be performed. In some instances, a command to place the appliance into a state for pairing the appliance with the controlling device may be transmitted to the appliance, whether initiated automatically upon conclusion of the discovery and configuration processes or initiated manually, via use of a protocol, e.g., IR, IP, CEC, etc., that the appliance profile indicates the appliance is responsive to. In this regard, the command for placing the appliance into a state for pairing may be issued from the controlling device or the host device as desired and in keeping with communication links available for use in transmitting such a command. In other instances, human interaction with a pairing button or other input element provided on the appliance to place the appliance into a pairing state may be required for this purpose. In the pairing state, the devices will exchange pairing information as needed to allow the devices to be subsequently communicatively linked together when proximate to each other whereby the controlling device can be used to communicate commands to the appliance via use of the appropriate RF protocol. If needed, a user may be required to enter a pin into the system, as known in the art, to facilitate such pairing. An example communication exchange to facilitate a pairing between a remote control and an appliance for use in transmitting "RF4CE" commands to the appliance may be found in U.S. Pat. No. 9,866,892 the disclosure of which is incorporated herein by reference in its entirety.

Once an appliance and a controlling device are paired, it will be appreciated that if it is determined that the appliance does not respond to a command transmitted via use of a provisioned RF protocol, e.g., determined by monitoring an "HDMI" connection, other command transmission protocols, such as CEC, IR, etc., can be used to convey a command as described above.

Figure 17:
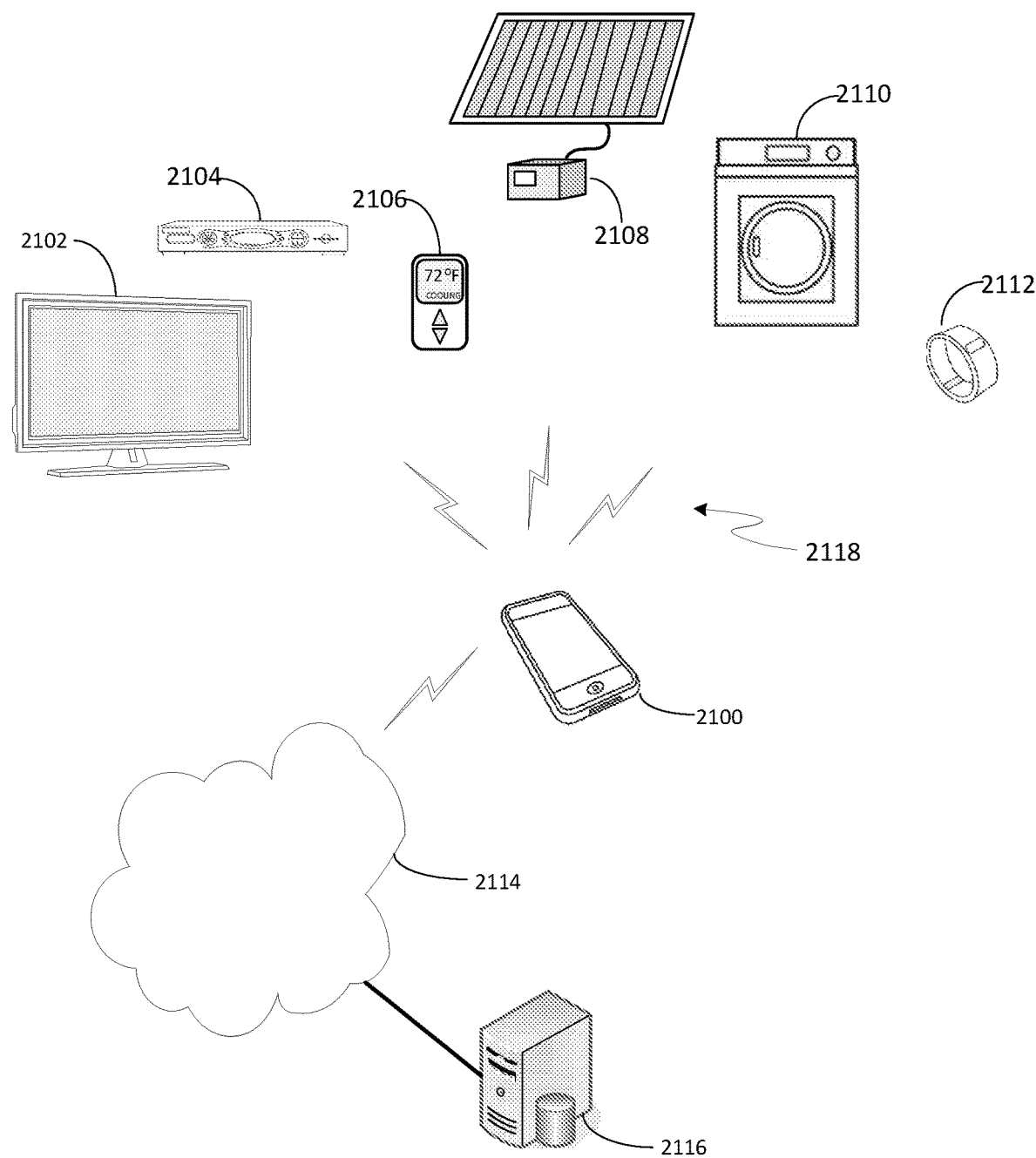
FIG. 17 illustrates an example system in which a smart device may be utilized to interface several different appliances.

As noted above, it is contemplated that, within an example system, such as illustrated in FIG. 17, apps or "skills" installed on a device 2100 may also provide interfaces to various services and/or to controllable appliances, such as, for example, a television 2102, a cable or satellite set top box 2104, a thermostat 2106, a solar power array controller 2108, a clothes washer and/or drier 2110, a personal fitness tracker or pedometer 2112, a media streaming service, a social networking service, etc. In this example, the device 2100 may be device 100 or may be a smart device 104 that is intended to communicate with a device 100 as described above without limitation. The interfaces may be used to display or otherwise annunciate information relevant to the operation and/or states of such services or devices, to receive input relevant to controlling the operation of such services or devices, to communicate with and/or control such services or devices, etc. To this end, the appliances may communicate with device 2100 using an available local wired or wireless network 2118 such as, for example, WiFi, Bluetooth, etc., or any other convenient means. It will be appreciated that depending on the particular networking technology in use various other items such as access points, routers, Internet gateways, etc., may be required in order to fully implement the illustrative network 2118—in the interests of clarity these are omitted from FIG. 17. Also, as illustrated in FIG. 17, smart device 2100 may be adapted to communicate with one or more remote servers 2116 (which may be services) by way of a wide area network 2114, such as for example the Internet.

It should be appreciated that, while an example embodiment is presented herein in terms of a group of household and/or personal appliances 2102 through 2112, the methods described herein may broadly apply to any group of appliances or equipment the elements of which support app driven user interfacing, for example without limitation those as may be found in offices, factories, schools, theaters, etc.

Accordingly, the example embodiment described hereafter is intended to be illustrative and not limiting.

Figure 18A:
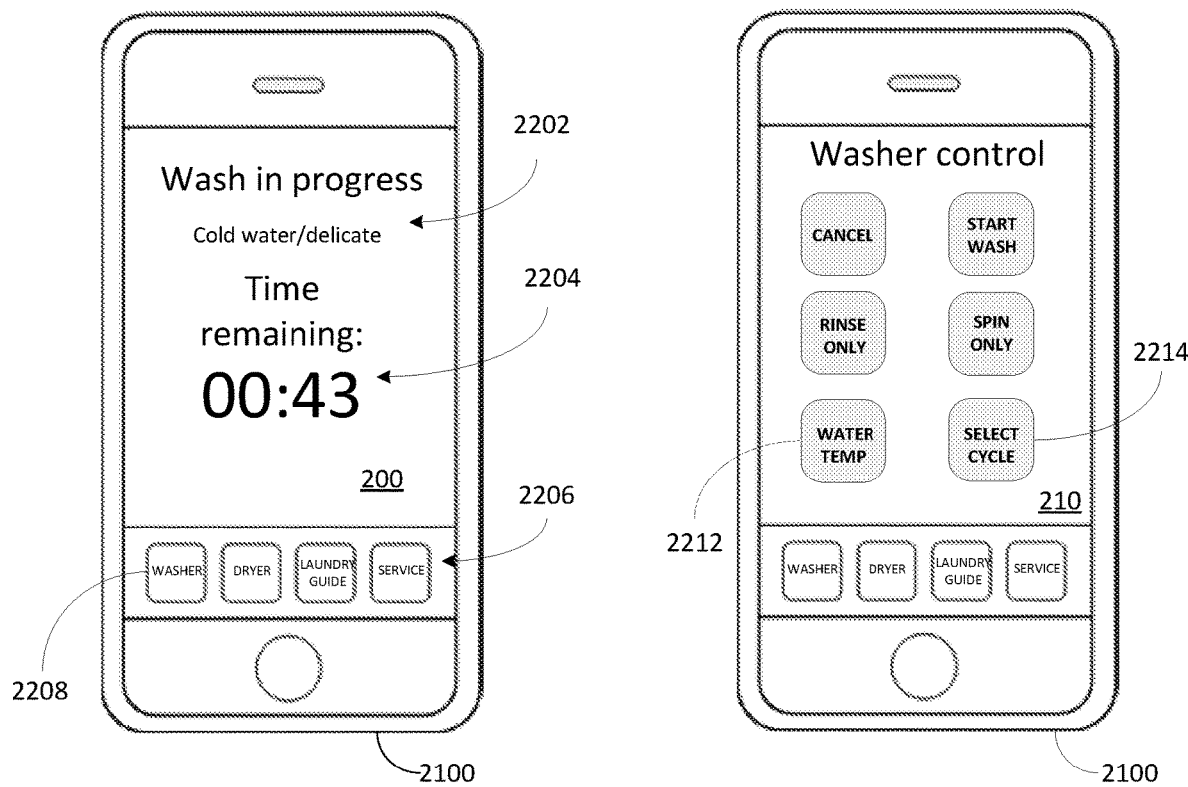
FIGS. 18A and 18B illustrate example smart device generated user interfaces appropriate for interacting with one of the appliances of FIG. 17.
Figure 18B:
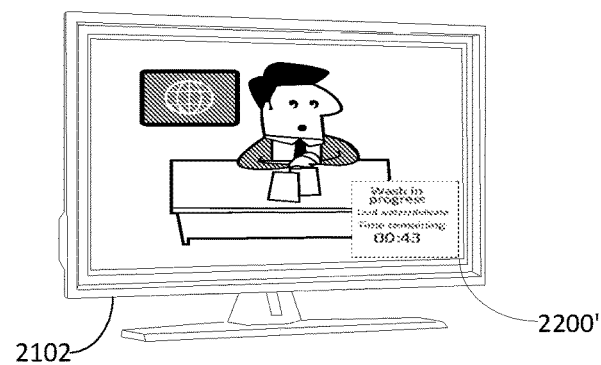

Turning now to FIG. 18A, an example user appliance interface 2200 presented by an app installed on device 2100 is shown by way of illustration. When invoked by a user of the device 2100, such an interface may display a current status of the appliance, in this illustrative example a clothes washer, including such example items as the wash cycle currently being performed 2202 and time remaining 2206. User interface 2200 may also include an example user input area 2206 with icons that are activable to access a companion appliance (e.g., a clothes dryer), GUIs, user guides, troubleshooting diagnostics, etc., as well as an icon 2208 which may access additional page(s) 2210 of the current device GUI, for example to cancel the current operation, initiate other operations, or to invoke further submenus such as selection of water temperature 2212 or fabric cycle 2214. As illustrated by way of further example in FIG. 2B, an example appliance app GUI 2200' may be adapted as appropriate for use with other types of smart devices, for example a "smart TV" 2102. As will be appreciated, in instances where device 2100 does not itself include a display, the device 2100 can be used in connection with a further device where the further device functions to present the user interface for device 2100. Accordingly, such further device would be provided with the programming required to allow device 2100 to receive communications from and provide communications to the device 2100. Such programming may be provided to the further device via use of a further installed app or "skill." Yet further, it is to be appreciated that any information that is described herein as being presented via use of display can be presented via use of a speaker, e.g., by using synthesized voice, and any information that is described herein as being received via a use of an input element can be received via use of one or microphones, e.g., by receiving voice signals and by processing the received voice signals via use of a cloud-based voice service platform.

In certain embodiments, a displayed GUI page may contain HyperText Markup Language (hereafter referred to as "HTML") links for use in accessing appliance related information and/or services. Since methods for displayed HTML links are well known in the art, they will not be described in greater detail herein. Nevertheless, for additional details pertaining to HTML link operation, the reader may turn to commonly assigned U.S. application Ser. No. 13/542,146 (US 2012/0278693), filed on Jul. 5, 2012, entitled "System and Method for Ubiquitous Appliance Control," the disclosure of which is incorporated herein by reference in its entirety. A displayed HTML page (or speech output, illuminated LEDs, or the like) may also function to provide notifications and which may inform a user that an app update or a new app is available for a single OS or across the different Oss, including cloud-based voice service platform operating systems, in the user's environment for the one or more of appliances. The user may select a displayed link or otherwise provide a voice command to initiate a downloading of an app, an authentication of an app, and/or a commencement of a synchronization process. The GUI may also include selectable links to user manuals for the user appliances which are located within the user's environment or may include links to specific web based literature which may be used to highlight the appliance features, or may notify the user that a new app may be available for a new OS for which an app was not available as of the last synchronization cycle, etc.

Figure 19:
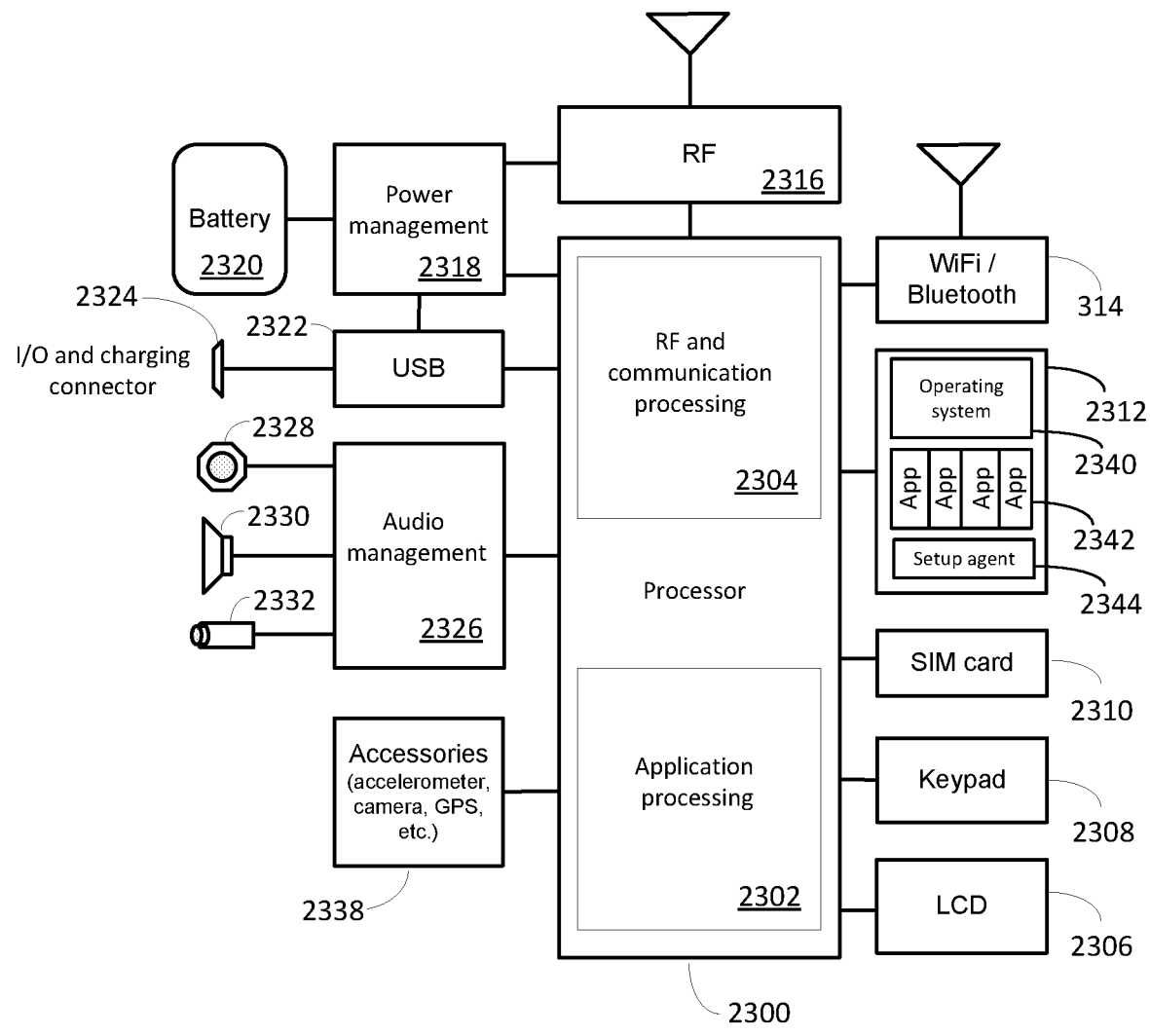
FIG. 19 illustrates in block diagram form an example smart device which may be used in the example systems of FIGS. 17 and 18A.

With reference to FIG. 19, as is known in the art, the smart device 2100 of FIGS. 17 and 18A may include as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof, one or more microphones, a subscriber identification module (SIM) card 2310; memory means 2312 which may comprise ROM, RAM, Flash, or any combination thereof, "WIFI" and/or "BLUETOOTH wireless interface(s) 2314; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. As further noted, the smart device 2100 may itself be a smart device 100 or the smart device 2100 may include a control device 100' as described previously. Programming may be provided and stored in memory means 2312 to control the operation of smart device 2100 by way of operating system 2340 software such as for example iOS, Android, Linux, Web apps, etc., which operating software may support voice-enabled control as sell as the download and execution of various add-on apps 2342 as necessary for a particular purpose, all as well known in the art. As noted above, a setup agent software 2344 is also provisioned to smart device 2100 in order to facilitate detection, installation, and operation of manufacturer-supplied appliance interface apps, as will now be described in further detail. It is also to be understood that, while the illustrated smart device 2100 is particularly adapted to receive input via use of a keypad and/or touchpad display that is provided as an integral part of the smart device 2100, the smart device 2100, or other like smart devices such as the TV illustrated in FIG. 2B, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 20:
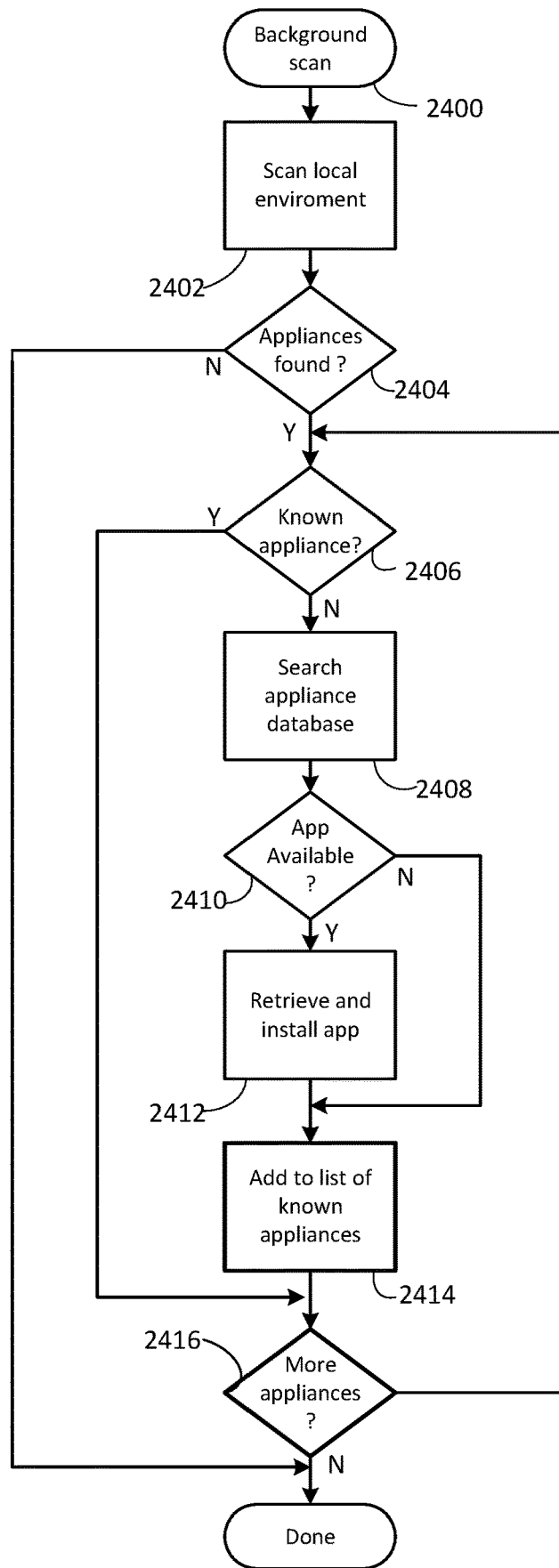
FIG. 20 illustrates in flow chart form an example series of steps carried out by a smart device setup agent upon detection of a network enabled appliance in its environment.

With reference now to the flowchart of FIG. 20, at step 2400 the setup agent 2344 may periodically initiate a scan 2402 of its current wired or wireless, network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the smart device using for example its GPS or the like type of functionality, etc.), or when connecting to new networks, or may be manually initiated by a user of smart device 2100 (for example in response to an activation of a user input element, in response to the smart device 2100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the smart device 2100, then at step 2406 the setup agent may next determine, using the information received, if a responsive appliance is already known to the setup agent, e.g., determine if the appliance has already been detected during a previous detection operation or otherwise manually indicated to the smart device 2100. Such a determination may be made, for example, by consulting a setup agent-administered listing of appliance identities, maintained as will be described hereafter at step 2414. If the appliance is already known to the setup agent, processing continues at step 2416 to determine if further responsive appliances have been detected.

If it is determined that a newly-responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download. Such a database may be stored in local memory 2312 as part of the setup agent programming, may be located at a cloud based data storage facility or server 2116, or a combination thereof, as appropriate for a particular embodiment. If no app is available, processing continues at step 2414, adding the instant appliance identity to the listing of known appliance identities. If it determined that an app is available, at step 2412 the appropriate app may be recommended to the user or may be downloaded to the smart device 2100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of smart device 2100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download, or may be requested from smart device user each time download is to be performed.

When an app is downloaded and installed, in some embodiments the setup agent may register that app with a cloud based service, by way of forwarding unique identity information regarding the app and the environment (e.g., network and/or app owner information) in which it is operational to a server system such as for example the server 2116 of FIG. 17. Such registration information may be subsequently utilized for the purpose of synchronizing multiple instances of the same app across different Operating Systems, as will be further described hereafter in conjunction with FIG. 21.

In some embodiments, the setup agent may, in conjunction with the installation of certain apps which require specific equipment configurations, also generate macro command sequences as necessary to place various appliances into the required state upon initiation of the app. By way of illustration without limitation, a TV viewing or game show participation app may require that a TV 2102 to be set to a particular input and/or a cable set top box 2104 be tuned to a particular channel, etc., in which case a command sequence ("macro") may be created by the setup agent to be executed every time that app is initiated. As will be understood by those skilled in the art, a single GUI may display all of the app links and common macros across the OS's.

Since methods for control of entertainment appliances and/or use of macros are well known in the art, these will not be discussed further herein, however for additional information the interested reader may turn to for example U.S. patent application Ser. No. 13/657,176 (now U.S. patent Ser. No. 13/657,176)" or Ser. No. 13/071,661 (now U.S. Pat. No. 9,852,615), both of common ownership and both incorporated herein by reference in their entirety.

Next, at step 2414, the setup agent may add the current appliance identity into a local tabulation of known appliances. Such an identity may comprise a serial number, MAC address, or any other data value suitable to uniquely identify the appliance. Thereafter, at step 2416 the setup agent may ascertain if additional responsive appliances were detected and, if so, the process described above is repeated, until all responding appliances have been accounted for.

Provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc.

Figure 21:
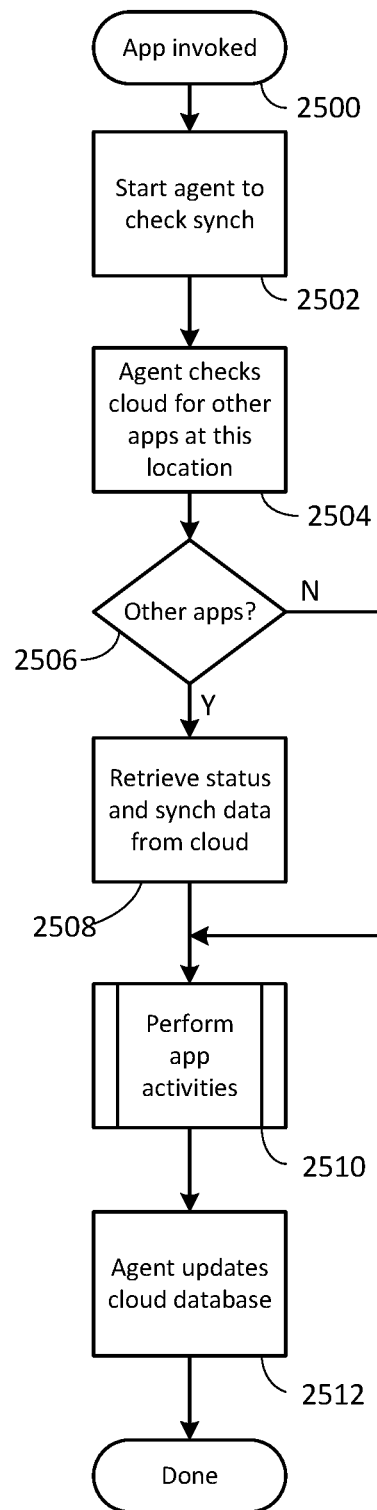
FIG. 21 illustrates in flow chart form an example series of steps carried out by a smart device setup agent to synchronize status and other data across multiple instances of an appliance interface app.

With reference now to the flowchart of FIG. 21, when an individual appliance associated app, for example such as the app illustrated in FIG. 2A, is invoked at step 2500, in some embodiments the app may initially invoke a setup agent at step 2502 in order to effect synchronization of this app's appliance status values with those of any other instances of the same app which may be present in the current environment and/or resident on other devices registered to the same owner. To achieve this, at step 2504 an example setup agent 2344 may access a cloud based database service, located for example on server 2116, in order to determine if any other instances of this app are present in the current environment, have common ownership, and/or the like. To accomplish such a check, the setup app may provide a unique app identity and unique environment identity to the database service. As appropriate for a particular implementation, an app identity may comprise a label value assigned by the developer(s) of the app; a manufacturer and appliance model number; or any other data which may serve to uniquely identify the specific app. An environment identity may comprise a "WIFI" network name; access point address; one or more MAC addresses; a user id; etc.; or any other data which may serve to uniquely identify the specific environment in which the app is currently active. The cloud based service may compare the provided values against a database of installed app information in order to determine if other instances of the app are present in the local environment and/or to determine if a corresponding app might be newly available for use on any of smart devices within the local area network. If an app is newly available, the app can be provisioned to such devices and synchronized with existing apps within the network as described above.

At step 2506 it may be determined, based on the response from the database service, whether any other instances of this app are in fact registered at the current environment. If not, processing continues at step 2510 where control may be returned to the app for the performance of the function(s) for which it was invoked. If, however, it is determined that other instances of the instant app are present, then at step 2508 the most recently saved status of the app may be downloaded from the corresponding entry in the cloud database and used to pre-configure the current instance. Such status information may include, as required for a particular appliance and/or app, items such as control settings, progress indicators, reminders, timeouts, state switches, authentications, cookies, shopping cart contents, service information, error logs, etc., without limitation.

At step 2510 the function(s) for which the app was invoked may then be performed, after which at step 2512 updated app status data reflecting the new state of the app may be uploaded to the cloud database for storage and subsequent use by this or other instances of the app.

As described above, a voice platform enabled smart device 2100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the smart device 2100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the smart device 2100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platform software, the smart device 2100 may be caused to first install such software in memory whereupon execution of that software may be used to perform further device discovery for use in obtaining one or more apps (also known as a "skill," "Action," or the like as noted above) for use in connection with the voice service platform supporting software to thereby configure the smart device 2100 to communicate with that appliance. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

In a similar manner, a voice platform enabled smart device 2100 can be used to discover a service and, after the service is discovered, a finger print for the service, e.g., manufacturer information, brand information, information about an app running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the smart device 2100 does not have the appropriate software for supporting that service already installed thereon, e.g., the "ALEXA" cloud-based voice service platform software, the "SIRI" cloud-based voice service platform supporting software, the "GOOGLE ASSISTANT" cloud-based voice service platform software, the smart device 2100 may be caused to first install such software in memory whereupon execution of that software may be used to perform further service discovery for use in obtaining one or more apps (also known as a "skill," "Action," or the like as noted above) for use in connection with the voice service platform supporting software to thereby configure the smart device 2100 to communicate with that service. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

It is further contemplated that the system may listen for and/or solicit the user to speak keywords for this same purpose. In this regard, the keywords might not only include the above noted information usable to form a fingerprint for an appliance and/or a service but might also include keywords that are known to be recognizable by a specific cloud-based, voice service platform. For example, upon the user speaking a wake work specific to a given type of digital assistant, e.g., "Alexa," "Hey Google," Hey Siri," Hey Xfinity" or the like, the system may cause the operating software associated with that digital assistant to be provided to the smart device 2100 for installation (or may cause such operating software to be enabled if already resident of the smart device 2100) and, if needed or desired, the operating software for the voice enabled platform, once operating on the smart device 2100, can be used to perform further appliance and/or service detection processes for use in connection with configuring the smart device 2100 with apps usable to communicate with such appliance and/or services as described above.

For use in identifying the appropriate operating software and/or apps that are to be provisioned to the smart device 2100 as a part of these above-described processes, the system preferably maintains a database in which fingerprint information is cross-referenced to such operating software and/or apps. The database may be stored in memory of a local device and/or stored in memory associated with a server device that is accessible via a wide-area-network, e.g., stored in database associated with a cloud-computer service. In this manner, information needed to locate and download the appropriate operating software and/or apps can be deduced by a device and used to retrieve such software and/or apps from its own memory and/or memory associated with still further services, e.g., from a database associated with a third party server. It is also contemplated that any such software and/or app providing service can track owner information, e.g., log-in information, privileges, appliance(s) registered to the user, etc., to limit the ability to access and download apps, to seamlessly integrate downloaded and installed apps into the system, etc. as described above. For example, a cloud service provided for the noted purposes may function to authenticate a user when they log into the service and thereafter, using device and/or service discovery information received from one or more devices on the user's system, establish an ownership mapping between the user, the smart device, and appliances/services that will be included in the user's "connected" environment.

As will be further understood by those of skill in the art, when using an app lookup API it is feasible for the voice assistant operating on the voice enabled platform of smart device 2100 to notify a user that a new skill to a matching appliance or service that was recently added to a network, e.g., a local area network, is available for installation. The availability of a new, matching skill can be indicated to the user on the device 2100, such as by having the device 2100 display a special illumination pattern via use of LEDs, via an audible a notification, or the like. A user can then ask the voice assistant to check what the notification is about, which will lead to a skill recommendation whereupon the user can voice an acknowledgement to permit installation of the skill. The installation of the skill can be performed via use of a cloud API call using input parameters such as the user identification, smart device 2100 ID, and skill ID. Alternatively, a user may also set a policy that any matched skills are allowed to be installed automatically in which case the smart device 2100 will skip the skill recommendation and invoke the skill installation API when a new, matching skill is discovered without further user intervention.

Figure 22:
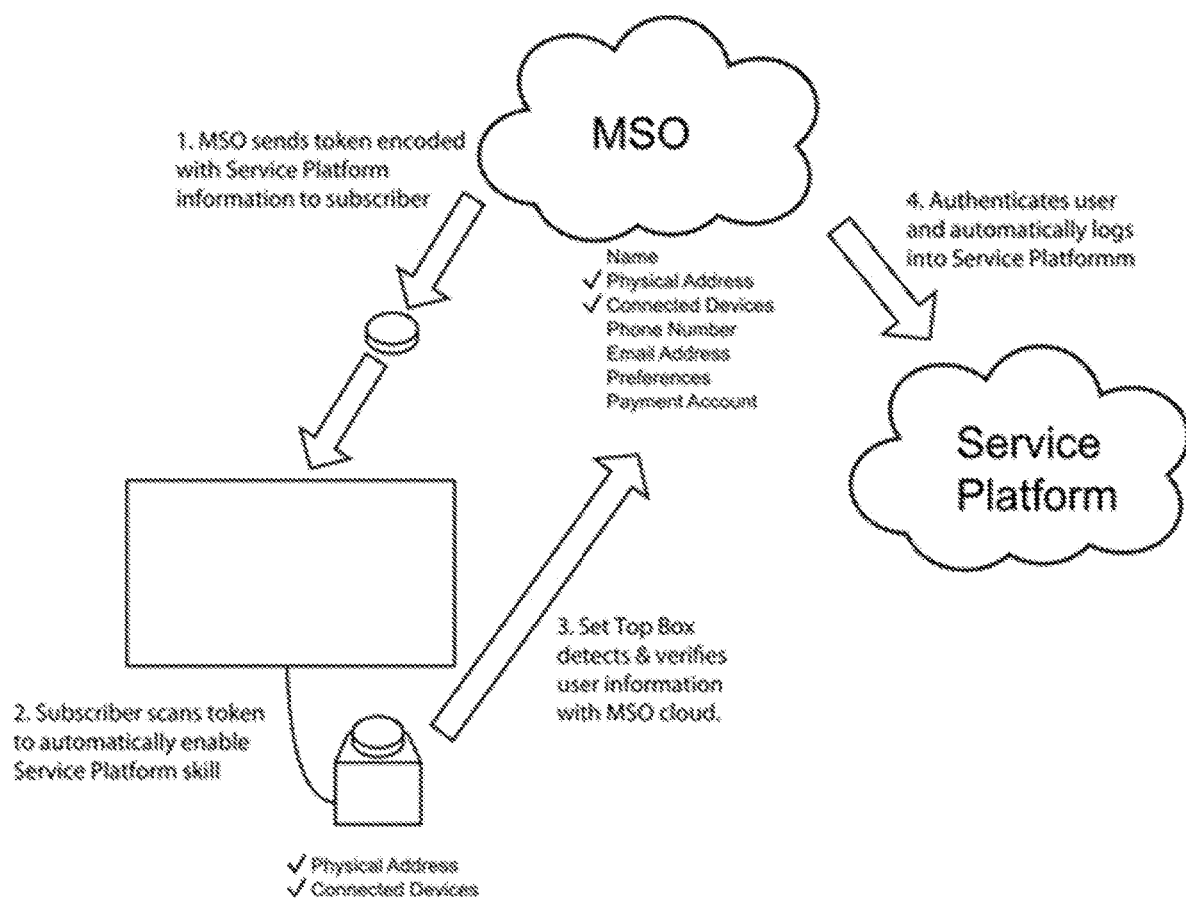
FIG. 22 illustrates a series of steps for using a token to facilitate installation of an app in a voice-enabled smart device.

In a further example, illustrated in FIG. 22, an operator of such a cloud service can leverage the noted ownership mapping to further recommend skills and/or facilitate installation of skills within the system of the user. For example, a MSO (multi-service operator) may provide an optical or RF readable token that is encoded with information that functions to identify a particular skill while the MSO database contains the user information as noted, e.g., name, home address, phone number, equipment list, email address, payment information, tv viewing history and habits, information related to a services account, such as, email address or user id, user authentication information, usage history and preferences, and/or the like, etc. As will be appreciated, some or all of this information may also be stored in database associated with one or more third party service providers.

As noted, this information can be leveraged by the MSO to send a personalized collection of tokens to its subscribers (for example electronically or via mail) and each token would be provided with data that will be usable to automatically enable a corresponding skill/app for a particular voice enabled platform on the subscriber's smart device 2100, e.g., their set-top box. By way of example, the tokens can provide data for use in installing a skill associated with a food delivery service, a ride sharing service, a review service, an e-commerce service, or the like. Upon receiving the token the user can scan, read, or otherwise obtain the data from the token—using the smart device or another device capable of forwarding such read data to the smart device—to automatically cause the associated skill to be installed on their smart device, in this example, their set-top box. Furthermore, because identifying information associated with the set-top box can be used to determine the user's home address, because the set-top box can be used to determine other connected appliances on the network of the user (as described above), and because some or all of this information can be verified to confirm the identity of the subscriber household, the system can be used to automatically log the user into an existing account with a service platform (or to create a new account with a service platform) to thereby allow such service to be quickly and easily integrated into the system. It is further contemplated that transactions between a subscriber and a service platform that would be performed via use of the voice enabled smart device, having the appropriate skill installed thereon, can then be monetized by the MSO per any agreement with the MSO and the service platform.

Figure 23:
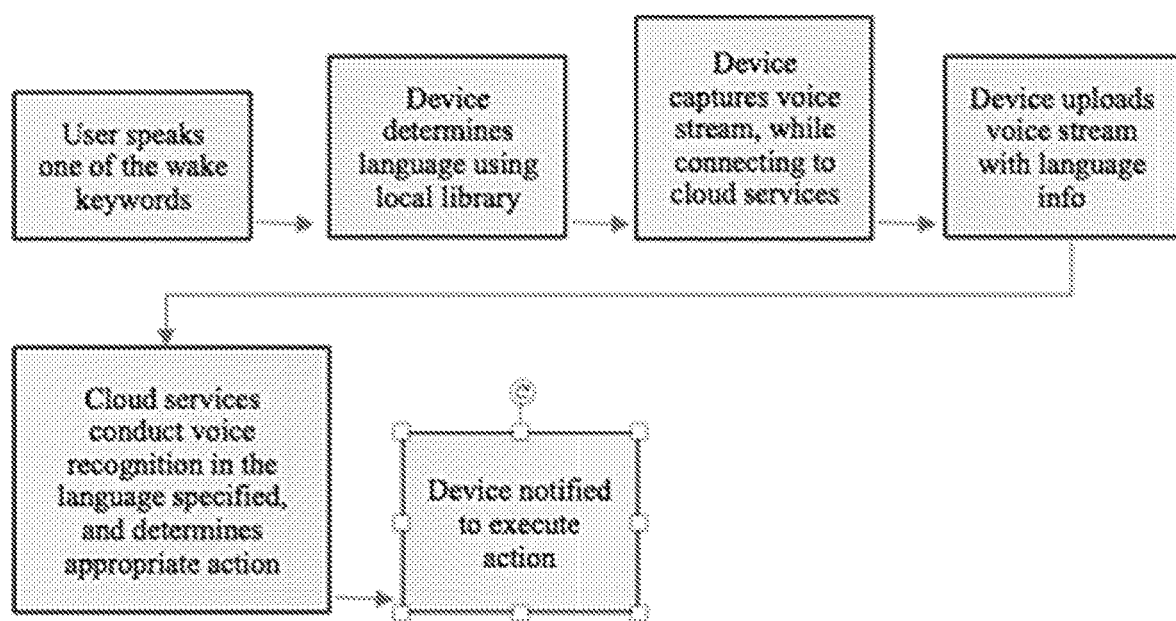
FIG. 23 illustrates a series of steps for processing voice input in a native language of a user.

In some instance, as shown in FIG. 23, it will also be desirable for a voice enable system to be adapted to recognize specific keywords, such as wake words, spoken in different languages. The recognition of these keywords, e.g., the same wake word spoken in English, Spanish, or Chinese, is preferably conducted locally on the smart device 2100 without the need for any cloud services. Once a particular keyword is detected, the voice enable device may be caused to wake to thereby capture the following voice input whereupon the following voice input would be provided to a voice processing cloud service together with information that identifies the language in which the words were spoken for further processing. It will be understood that a benefit to the user is being able to interact with the system in his/her native language with the system responding quicker to the user's commands because the voice process service will not need to recognize/detect the language in the full voice stream received from the user.

When a device having universal control engine functionality is aware of the devices that are found within or available to a network environment and the service related apps/"skill" installed on such devices (including itself), the device can further utilize the universal control engine functionality to issue commands to devices, and any apps installed thereon. For example, by being made aware of content that is available via use of an app and by being aware of a device on which the app is installed, the universal control engine can support content related macro commands. Upon a user issuing a voice command (or providing a command via an input element activation), the universal control engine functionality can issue commands to one or more given devices to cause an app to be opened and/or to cause content to be presented on a home theater device or devices. In this regard, it will be appreciated that a command to cause an app to perform a function can be sent to the device that supports the app and/or to the corresponding app service which may, in turn, control aspects of app usage, such as what is caused to displayed by the app. Thus, in response to user providing a request to "open app X on device Y" or a request to "open app X," e.g., functional operations to be performed, the universal control engine functionality can cause the appropriate commands to be sent to device Y, e.g., to turn device Y on, and to cause device Y, which is known to support app X, to cause app X to be opened/invoked. Likewise, a request to "play content Z in app X on device Y" would result in the universal control engine functionality issuing commands to device Y and/or app X on device Y (either via device Y or via a service associated with app X) as needed to cause content Z to commence playing. As will be appreciated, execution of such macro commands can also result in the sending of commands to cause one or more additional devices to be turned on, appropriate input/output ports to be made active, etc. as needed or desired to support the request. In addition, it will be appreciated that the discovery processes described above can be used to automatically generate a mapping between functional operations to be controlled via use of such macros, commands that are required to be issued to cause such functional operations to be performed, and devices and/or services to which such commands are to be directed.

Figure 24:
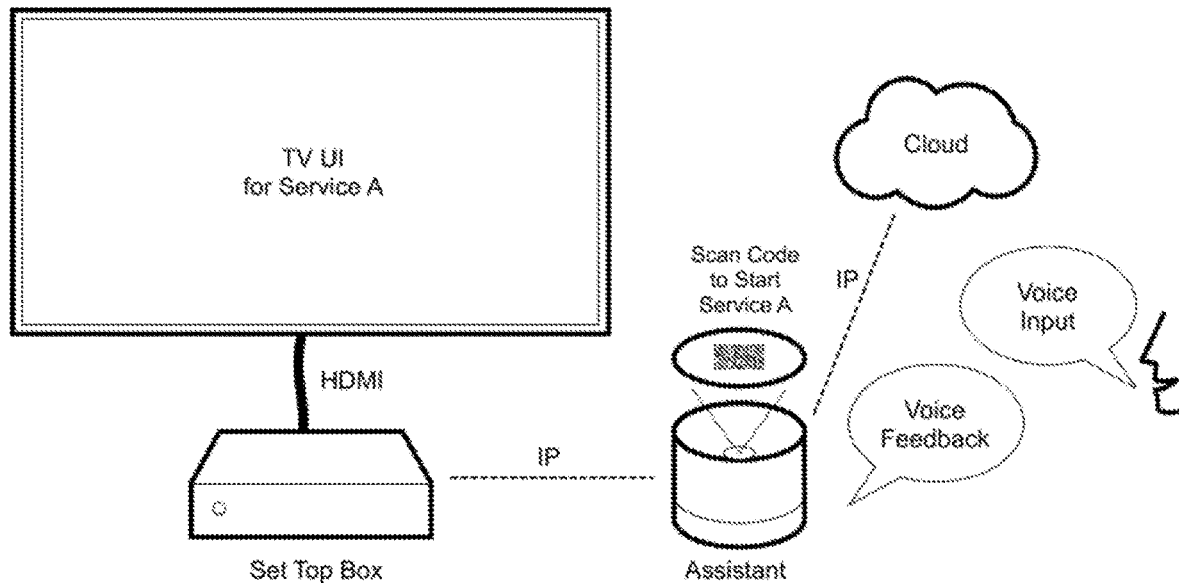
FIG. 24 illustrates an example system including a voice service enabled smart device.
Figure 25:
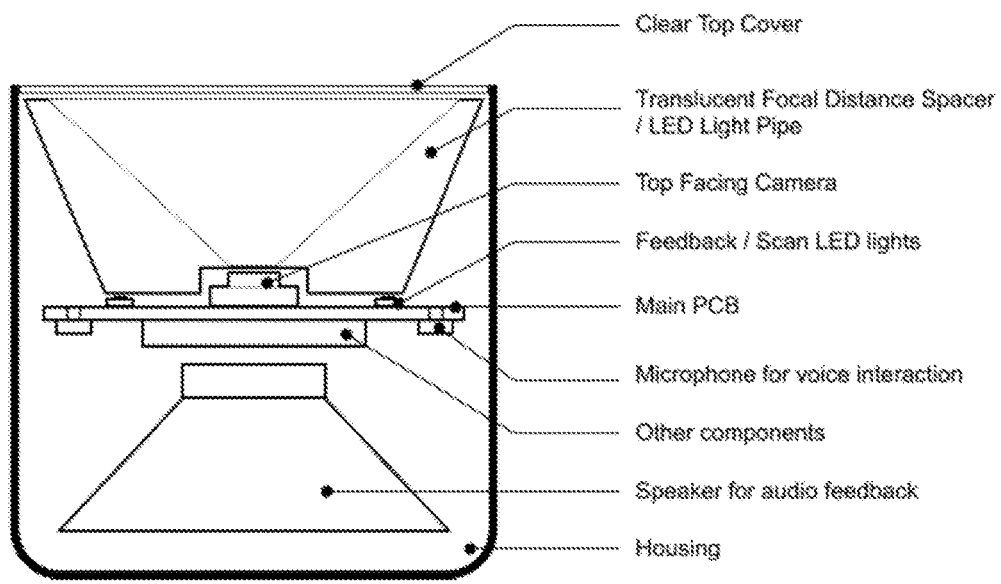
FIG. 25 illustrates example components of a voice service enabled smart device.

As further illustrated in FIGS. 24 and 25, in certain instances a voice enabled smart device may additionally include a camera in addition to devices that are meant to provide feedback to a user, such as a speaker, one or more LEDs, etc. Furthermore, when such a device is coupled to a media rendering device, such as a television, whether directly or via use of an intermediate device, such as a STB, the media rendering device is also usable as a means to provide feedback to a user (and to solicit input from the user, for example by providing a voice controlled graphical user interface). Thus, using the components of the example smart device as shown in FIG. 25 with the system shown in FIG. 24, a smart device can be used to scan, for example via use of an upwardly facing camera, ID barcodes, 2D QR codes or graphics, and even 3D objects. The scanning of such objects can then be used to initiate an interactive session with the user via use of the media rendering device. For example, by scanning a known object, e.g., a known QR code, that is linked to an interactive application, some or all of which may operate within the cloud, the interactive application can be invoked whereupon the interactive application will function to cause the smart device to generate a graphical user interface for display on the media rendering device and to cause the smart device to make active its microphone to receive commands from the user for interacting with the graphical user interface to perform some task, for example, to navigate to and to commence a viewing of/listening to a media.

In some instances, in connection with setting up a device to utilize a voice enabled platform, it may be desirable for the voice enabled platform service to ask permission, via use of an audio and/or visual interface supported by the device being setup or another device (e.g., a further device presenting an account webpage that is linked with the device being setup), to share some or all audio samples that would be provided to the voice enabled platform service with an audit team, for example, to respond to issues associated with use of the device and/or the voice enabled platform service, for use in periodic quality checks, and the like. In further instances, it may be desirable to seek such permission periodically or every time the device is used to access the voice enabled platform service. When permission is granted, the audio samples can be retrieved from a memory of the device via use of an appropriate communication to the device or from a data repository associated with the voice enabled platform service. To inform a user of a current privacy state associated with the use of the voice enabled platform service, an indicator—such as a LED on the device, a GUI presented on another device, etc.—may be used. It is also contemplated that a user may provide a voice command to alter and/or setup any such privacy settings and/or to establish parameters associated with the storing of any audio samples, e.g., to specify that any stored audio samples are to be automatically purged on a daily, weekly, monthly, basis and/or on user command, at any time.

In an instance where a device is to be configured to use a voice enabled service, to use an app/"skill" or the like, it may be desirable to use a display device, such as a TV, that is connected with the device via use of the home network to guide a user through the setup process. For example, by using a setup agent/discovery process such as described above or the like, the presence of the display device within the network can be determined. Once the presence of the display device within the network is determined, the device can be programmed to automatically use the display device to present video, interactive guides, etc. that are caused to be retrieved by the device from the Internet. In some instances, the device can be programmed to use a native device communication feature, such as "CHROMECAST" or "AIRPLAY," if the use of such a communication feature is supported by both the device and the display device. In some instances, the device may also cause additional commands to be automatically sent to the display device, as necessary, to place the display device into a state by which such information can be displayed to a user. As will be appreciated, by allowing a setup procedure on a device that has a small display or no display to automatically locate and use a display of a further device, such as a TV, to present instructional information, the setup procedure can be simplified.

In a similar manner, a technical support AI integrated into a device (or accessible to the device via use of a voice enabled service) can be used to cause information related to a user request concerning an issue with the device or another device on the network (which other devices would be known to the device as a result of the aforementioned discovery processes) to be presented on a display device or otherwise communicated to the user via use of output elements of the device itself. It is contemplated that this would be an interactive experience with the aim of having the AI help the user identify, and fix, the source of the user issues. In this regard, it will also be appreciated that, because the subject system can detect and recognize devices within the networked environment, the AI will be able to predict common issues for those devices, interconnections between those devices, capability compatibilities between devices, etc. In some instances, a user communication can be parsed by the AI to connect the user to a live service technician as appropriate to the issue and/or the device believed to be a result of the issue whereupon the service technician can provide trouble shooting information to the user, again by being displayed on a display device as described above or otherwise communicated to the user via use of the device itself.

When a remote control device having control capabilities is provided with a microphone, for example by being a device that supports a voice enabled service, it is contemplated that the microphone can be leveraged to provide a further (or alternative) method for configuring the device to control other controllable appliances within a home. For example, it is contemplated that a device that is aware of other controllable appliances in the home, such as a device having the aforementioned, universal control functionality, can be used to generate audio tones. The audio tones could be generated by the device itself or be caused to be generated by another device, such as a TV, coupled to the device. The audio tones that are caused to be generated by the device can then be received by the microphone of the remote control device and the data within the audio tone can then be used by programming on the remote control to configure the remote control to communicate commands to such controllable devices. The tone that are caused to be generated by the device may include data that is indicative of a command codes set that is stored in a memory of the remote control device, may include data that specifies a new command codes set that is to be stored in the memory of the remote control device, and other data as would be needed to associate commands to be transmitted to an intended target device in response to corresponding inputs being provide to the remote control.

It is similarly contemplated that a user could utilize a website, app, or the like to generate the audio tones that are needed to configure the remote control to control functional operations of one or more controllable appliances. In such an instance, a user may specify to the website, app, or the like some controllable appliance identifying information, such as brand and model, whereupon the website, app, or the like would use the provided information to generate the appropriate audible tones. The appliance identifying information may also be retrieved by the website, app, or the like by polling one or more devices in the home to the extent the website, app, or the like is capable of communicating with such devices.

To provide a simplified process for logging into accounts and/or to authenticate devices without requiring a user to enter a password/username combination, a "magic code" can be provided to the user. The magic code may be provided in the form of a QR code, an ultrasonic transmission, or other communication means as desired. The magic code may also or alternatively be provided by use of a machine spoken utterance or via a display of a second device, e.g., a smart phone or tablet computing device. The magic code, when spoken or displayed for manual entry by a user, will generally be in the form of a series of numbers, letters, and/or symbols. Regardless of the form in which the magic code is provided, the magic code will preferably be provided with an expiration time. The expiration time may be set to be a predetermined amount of time after the magic code is first provided (e.g., the code is valid for 10 minutes after it is provided), a real time (e.g., the code expires at midnight on the day it is provided), a relative time (e.g., the codes expires upon guest checkout), and/or the like as needed for any particular purpose. In some instance, the geo location of a user and/or a device can be utilized in combination with the magic code to provide an additional layer of security to the system. For example, a geo fencing process can be used to ensure that the magic code was provided to the system at (or proximate to) the same location it was requested.

From the perspective of an end user, the magic code eliminates the hassle of having to use a username/password when logging into an account or authenticating a device. From the perspective of a service provider, the magic code eliminates the need for additional backend infrastructure to save/keep track of a user's account details. Furthermore, because the need for storing user account details is eliminated, in the rare occasion of a data breach, no user information is present for a hacker to obtain. Owing to the attaching of an expiration time to the magic code, the code has the advantage of being usable in commercial hospitality settings (e.g., hotels, "Airbnb,", public computer, television, etc.) and the like to provide temporary access to external property management systems. Still further, a magic code can be used to eliminate the typically lengthy process of having to enter account and device information to onboard a device into a system, particularly when the onboarding process is required to be performed via interactions with a device, such as a television or other device having limited input means, such as for instance a lack of physical keyboard.

Figure 26:
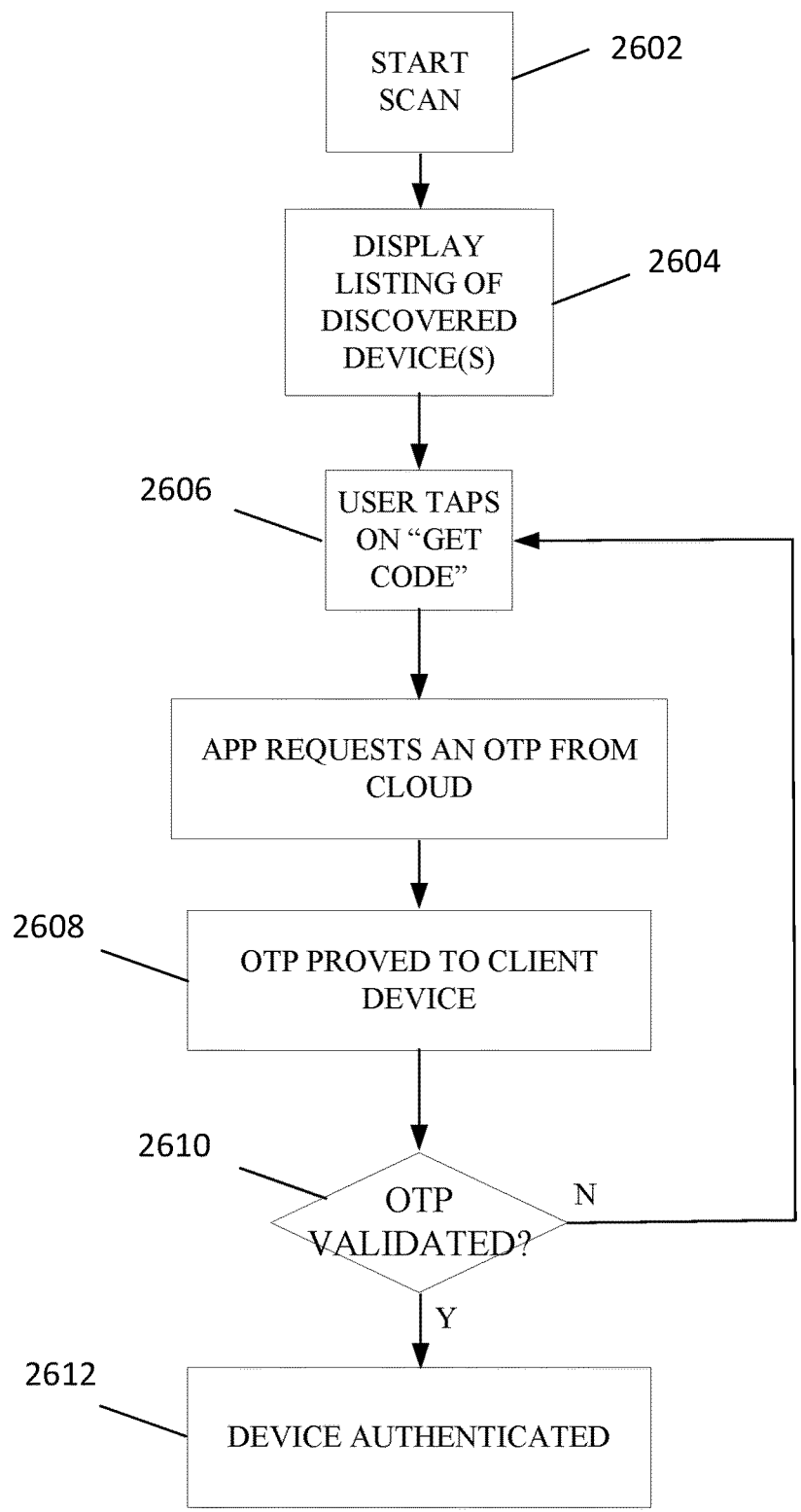
FIG. 26 illustrates example steps for using a magic code to authenticate a device for binding within the system.

For facilitating use of a magic code to onboard a device, a user will be required to download and interact with an app. When interacting with the app, a virtual user identification will be associated with the user/app. Local device authentication is then used to bind the app with a device. The local authentication process is generally illustrated in FIG. 26.

To bind the app with a device, such as a voice assistant device like the "NEVO BUTLER," the app, installed on a mobile device, will perform a scan 2602 to determine one or more devices capable of communicating with the mobile device. This scan can be performed using, for example, BLE WiFi, or any other communication protocol as desired. The one or more device discovered during this scan may then be presented to the user 2604 via the display associated with the mobile device. The user may then request 2606 a magic code for the system from a cloud-server for use in authenticating/binding a selected one or more of the located device(s) to the app/user. The magic code, once retrieved from the cloud-server by the app installed on the mobile device, may be provided 2608 to the selected one or more of the located device(s) via use of a wireless transmission, such as a BLE transmission, by requiring a user to key-in the code (as displayed or spoken to the user via the app) at the device, or the like. The code is then to be returned to the mobile app via use of the communication channel between the mobile device and the selected one or more of the device(s) for validation 2610. If validated, the one or more devices are authenticated with/bound to the app 2612. If not the process may be repeated. Once authenticated, the app can be used to control one or more functions of the controllable appliance using one or more of the methods described above.

By way of further example, to onboard a device via use of the app a first code is caused to be provided from the app to the device and the first code preferably contains the following information: App name, app version, company that owns the app (in either name or id), and a certificate of the app (either self-signed or from a root CA). This information is usable, in whole or in part, for the device to confirm only a matching app is provided access to the code and for the device (or an associated process executing on another device) to identify the app ownership or legitimacy of the information. Upon getting the code, the device can validate the code (or cause the code to be validated at another device) proceeding to a second code exchange.

The second code that is caused to be provided from the device to the app upon the first code being validated preferably contains the following information: Device id, name, model (or other device identifying data), a certificate of the device (either self-signed or from a root CA, which is similarly used to identify/authenticate the device), and a challenge code that can be used to validate the device identity, for example, information encrypted by the device's private key. Upon receiving the second code, the app can use a cloud service to help validate the code sent by the device and, once the cloud service confirms the identity of the device, the cloud service can setup the database mapping between the mobile app and the device and send back to the app a confirmation code. The app will cause the confirmation code to be provided to the device and the confirmation code could include some information that the device needs to decode, such as the access_key for the mobile app to talk to the device directly. The decoded data could have checksum to make sure the information is correct after decoding.

It will also be appreciated that the device can optionally return at least a part of the decoded data to the mobile app. For example, the device can share the access_key with the mobile app so the mobile app can use the access_key in the control message to the device. Similarly, a session key that can be used for encrypt/decrypt the communication between the mobile app and the device.

As to the linkage between a user and an authenticated device, it is contemplated that there may be different user roles relative to the device. For example, a user may be deemed to be an owner (e.g., an individual owner in the consumer setting, a property manager in a commercial setting, etc.), an installer, a user other than the owner that needs to control functional operations of the device (e.g., a guest or family member), or a new owner of a second hand device, etc.

An owner can claim ownership of a device by associating his/her user id with the device. As noted above, in the subject systems and methods, a user is not required to know this user ID. A bound to device can have multiple owners and, preferably, an owner has the right to view (and manage as appropriate) any other user/owner that is associated with the device. For associating a user ID with a device as an owner, the system may support one or more of various ownership claim processes as described below.

In a first scenario anyone can become an owner of a device as long as he/she goes through a certain account linking process, such as described above in reference to FIG. 26. As one example, a user uses the mobile phone app to do WiFi onboarding of a device. Once that process is done, the system will consider the user id associated with the app that has been linked to the device as the owner of the device that gets the IP address after WiFi onboarding.

In a second scenario a user can request ownership of a device from his/her mobile app and, in response, the cloud-server associated with the app will send a challenge to the device. If the user can verify the challenge successfully, he/she becomes the new owner of the device. The challenge can be a onetime passcode generated by cloud-based authentication service. The onetime passcode can be spoken by and/or displayed by the device as appropriate. The challenge will be entered into the app for authentication by the cloud-based server. The challenge can also be a pushed QR code from the cloud-server that is displayed on the device's screen (or an associated screen) so user can scan it for authentication as described above.

In a third scenario, an installer is the owner when he/she helps the facility manager to setup a device. Once that is done, there is a workflow for the installer to confirm installation with the facility manager where he/she signs off as the owner and transfers the full control back to the facility manager. An owner of the device could block other users from becoming a new owner by setting up the restriction in the associated cloud-server. An owner can also lift the restriction for certain users (family member, etc.) so the other user can go through the binding process to become another owner.

In a fourth scenario an owner can grant access to another user so the user can control the device. Such a grant can be time bound so it becomes invalid at an established expiration time. The owner can use the app to request from the cloud-server a short URL and the URL can be shared or provided to the corresponding app as installed on a mobile device of another user whereupon the user can click on the URL from his/her app to get the access to the device. The short URL will link to a specific device and the user can be provided with various degrees of control, e.g., the overall right to control the device, a single function such as turn on/off TV, a group of functions such as volume change and channel change etc., all within a grant period. In an example, the short URL can be embedded into a QR code so the user can scan the QR code with their mobile app.

In the case where a device is sold to another person, typically it is the responsibility of the owner to wipe out any user claims on that device before putting it on to the market. In this scenario, the owner can trigger a factory reset of the device, which will in turn remove all the owners and users bounded with the device. The owner can also use a user interface provided by the app to list all the current users of the device and decided to delete them all before selling it. Still further, the system could set a rule to wipe out any previous owner/user association if a new user becomes the owner of a device.

By way further example considering a system which includes device 100 (e.g., a device that is voice service enabled and which is configurable as a controlling device via use of the control engine), there will always be at least one owner for the device 100 that is responsible to set up the device and use its control function to manage other devices in his/her possession. As discussed above, a companion mobile app is used to set up a device 100 and the setup process need not ask a user to login using an email address or password. Rather, when the app is linked to the device 100 on the user's network, a virtual user account will be automatically created because it is recognized that the owner still needs to be identified, for example being identified by a Globally Unique Identifier ("GUID'), i.e., a globally unique ID (string) that identifies a digital entity (person, place, or thing) that needs to be managed and kept available for a length of time.

Once the device 100 is bound to the app, an owner can share the control of the device (and any devices controllable via use of device 100) to someone else (e.g., a friend, family member, etc.) and, as noted above, this control can be limited to certain functions, certain times, and/or the like as desired by the owner. By delegating the control function to another user, the ownership remains unchanged and, while the system can support multiple user bindings, the system should ensure that sufficient protection is in place so that the device 100 cannot be configured by a neighbor or somebody visiting. Thus, it is preferred that the owner be in control of the device sharing and user binding. If the owner ends ownership, all users created by that owner should likewise be prohibited from controlling the device 100.

Table 1 is used to compare the subject virtual user account solution against a traditional user email/password solution.

TABLE 1

|  | Email/Password | Virtual Account |
| --- | --- | --- |
| Account creation | Triggered by user | Automatically |
| Account login | User provide email address as user name and input password | Mobile app does it automatically for the user |
| Recover user name | Check if email address is used | Use account recover URL |
| Recover password | Password reset URL | N/A |
| User name stored in mobile app | As an option | The idea is to store only the access token and refresh token locally |
| Password stored in mobile app | As an option, not recommended | The idea is to store only the access token and refresh token locally |
| User name stored in cloud backend | Yes | Yes |
| Password stored in backend | Only hash value | Only hash value, used on the first time to get tokens |
| Personal email address | Used as user name, stored in cloud | Not stored in cloud or app. User can specify it to receive the recovery URL |
| Methods to share control | Through a URL for sharing control | Through a URL for sharing control |
| Switch between phones | As long as the same account login is used | Special workflow is needed to transfer login information |
| Lost phone | Follow steps to login again | Use recovery URL |

As concerns the virtual user account, when the companion mobile app is started on the mobile device, the companion mobile app will look for an access token and a refresh token to access the corresponding cloud service. If the app cannot find them on the mobile device, the app will request a new set from the cloud service and the cloud service will make sure the user ID associated with the request is unique and, if so, will return to the companion mobile app the access token and refresh token that links to the account, which the mobile app will accept and stores locally on the mobile device.

Since such a virtual user account information is stored locally, it means that the account information will be lost if the user deletes the mobile app, loses the mobile device upon which the mobile app is installed, or the like. According, it is recognized that a virtual user account recovery process is needed.

In one example of providing a means for recovery of a virtual user account, the system forces a user to forward a backup recovery URL to his/her recovery address that was established when the virtual user account is created by use of the mobile app. The URL would be a one-time use URL for the user to claim the virtual user account back. The recovery address can be an email address or a phone number (for SMS).

If the recovery URL is used by someone other than the owner, the owner will be locked out from his/her own app. However, the system can enforce another recovery URL to be sent to the same recovery address on file so if someone else used it, the owner can still take it back.

To ensure proper binding and/or controlling use of the device 100, the system may also be setup to confirm that a user has physical access to the device 100. One way to do such a verification is to have the cloud server use a LED, display, speaker, or the like associated with the device 100 to present the user with a validation code, such as a special pattern, and ask the user to confirm the code at their mobile app. Similarly, in the WiFi onboarding procedure, a validating bootstrap step may be used with the device 100 to confirm a device/mobile app linkage is legitimate before configuring the device/mobile app. With such validation, a user is only allowed to proceed if he/she confirms the pattern combination and, as will be appreciated, because of this step, a WiFi onboarding bootstrap step can be used to associate a virtual user account with the device 100 as its owner. The mobile application should not, therefore, attempt to configure a device 100 whose provided validation code is not confirmed. In some circumstances, a validation code can be required to be periodically authenticated to ensure that the ownership of the device 100 remains as desired.

To allow a user to retrieve and use the same virtual user account GUID when the user changes their mobile device, the system can allow the owner to show the current virtual user account (retrieved from the cloud, with protection, in QR code format) in the mobile app of their first mobile device. By scanning the QR code with the new mobile device, the new mobile app can be redirected to an account transfer landing page and the transfer process can be performed automatically using the information in the QR code. Additional confirmation from the owner may be enforced to validate the operation as desired. Upon completion, both the virtual user account GUID and its correspondent device 100 information (validation code and ID) shall be transferred to the new mobile device/new companion app. Furthermore, because it is desired that the virtual user account GUID should not be revealed, the QR code is intended to be short lived so it cannot be reused.

As noted above, a QR code can be utilized by the system to onboard other devices, such as a controlling hub device, into a network. By way of further example, an app installed on a smart device, such as a TV can be used to move the onboarding experience to a second screen and lift the session using a simple QR code for the user to scan. The QR code is caused to be displayed on the TV and, once the user scans the QR code with their mobile device, the QR code takes the user to a second screen hosted on the web where the user is presented with instructions for completing the setup experience. On this screen hosted on the web, the user is prompted to scan the QR code (or bar code) associated with the device, e.g., as attached underneath the hub, as opposed to having to enter the lengthy serial number. Once the QR code is scanned, relevant information for authentication is extracted and the device is successfully onboarded into the system.

In a similar manner, a user can use a virtual assistant running on a mobile application to request a magic code through written text. The user can then copy this code with a simple click of a button and use this code to link to an account associated with a specific assistant service, such as a "GOOGLE ASSISTANT" account or and an "AMAZON ALEXA" account. The user is then redirected to a web page that asks for this code as an input. Once the user enters the code, the user's account is automatically linked to the device. Likewise, a user can use a device 100 with a built-in digital assistant to request a magic code through their voice and the user can again ask to link a specific assistant service. Once the assistant on the hub shares the code, user can input it on the corresponding retail assistant's web page that asks for this code as an input. Once the user enters the code, the user's account is automatically linked to the device 100.

Figure 27:
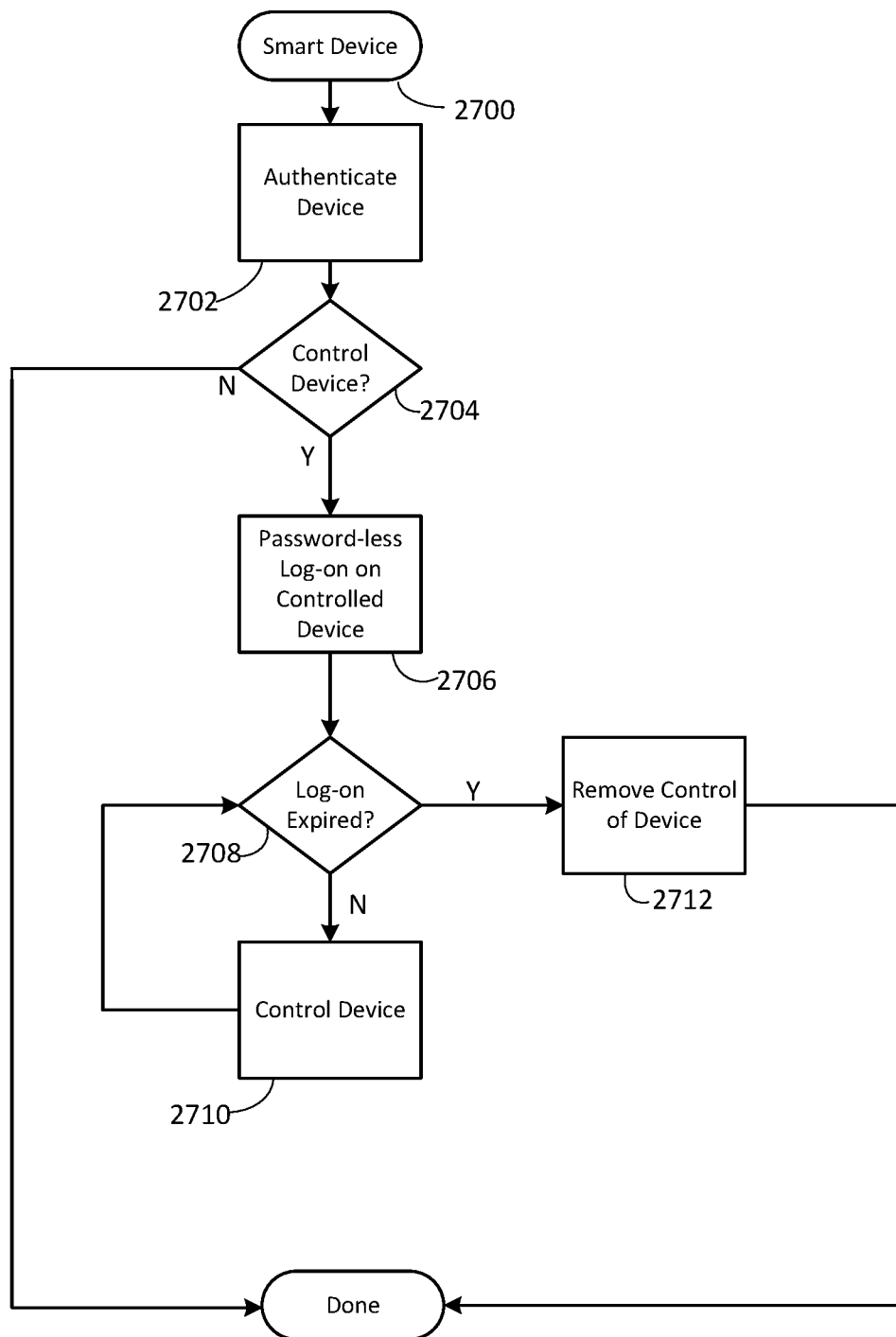

As such, in various example, such as illustrated in FIG. 27, a password-less log-in using a hardware device access, such as the NEVO BUTLER disclosed above, with a global unique identifier (e.g., a magic code), authentication code, etc. may be achieved. In this example, the device is authenticated at step 2702. By doing so, full lifecycle management of the password-less log-in may be achieved, including establishing ownership of the hardware device, passing ownership to a new individual, delegating access, recovering an account, providing temporary access, etc., as will be disclosed herein. At the step 2704, the smart device will determine if an associated device should be controlled. If so, the process provide for password-less log-on to the controlled device at step 2706. As will be detailed, the control may expire through any suitable means (step 2708) and control of the device will continue for the length of the authorization (step 2710). Once control is expired, the controlled device is removed (step 2712).

In this manner the user experience may be enhanced by utilizing cross-screen continuity of session, such as through home devices like a TV, thermostat, security system, voice assistance, etc. This user experience includes not only web continuity, but also native application continuity on a second screen using, for instance, deep links with password-less login.

As noted, the authentication code/process disclosed herein includes all use cases, such as home use and temporary use, such as home/condominium/apartment rental, hotel rental, residential visitation, etc., each of which may be tied to an external property management system. As disclosed, this authentication code/process may include additional security procedures and/or safeguards, including geo-fencing as to where the authentication code may be issued, used, etc., and/or expanded challenge questions to validate a user within a defined location. Finally, the user experience may include a possibility of using the authentication code/process to allow devices to authenticate with each other based upon proximity with no user involvement, including trusted brands, etc.

For the situation where the hardware device is a smart device comprising an app, such as a known QuickSet enabled device (having a Universal control engine), including the noted "NEVO BUTLER", the following use case scenarios are disclosed. The example smart device always includes an "owner" who is responsible for device set-up and whose device controls the function and management of other associated devices. It will be appreciated that the owner can have multiple smart devices. In one scenario, a companion app is utilized to set-up the smart device and to otherwise map the device to the owner account and obtain password control of the smart device). In this instance, the smart device should not ask the user to login using email address and/or password, but rather rely upon the authentication code/process disclosed herein. Although the authentication process does not rely upon the traditional user-name and password process, the owner and/or owner account still needs to be identified via the virtual user account identified by the global unique identifier embedded within the app.

The user can share, delegate, or otherwise transfer control of the smart device to another user as desired utilizing a restricted authentication code (e.g., the restricted magic code). By delegating the control function to another user, the underlying ownership remains unchanged. For interoperability, the smart device shall support multiple user bindings. In any event, sufficient protection is therefore provided as disclosed to ensure that the smart device cannot be configured by another individual (e.g., a neighbor, a visitor, a user with temporary access, etc.) by use of various security measures, including geo-fencing restrictions, etc. Thus, the owner is in control of the smart device sharing and user binding via use of the app. As will be appreciated, during ownership transfer, user privacy data is of concern, and any previous data stored and/or associated with a user is cleaned so that the new owner cannot obtain any information, including unauthorized access to the smart device.

A user may associate the current virtual user account with any other account as desired, including a social media account. Further, as disclosed the owner has the ability to retrieve the virtual user account in case of loss, deactivation, desynchronization, emergency, etc. In one example, if the user has an old smart device, the user can scan a QR code on the new smart device to transfer the account. In still other examples, if a third-party, such as a professional installer assists the owner in setting up the smart device, after setup is completed, the ownership mapping with the installer's account can be released to the owner so that the owner can claim rightful ownership of the smart device. This may occur, for instance, when an installer installs multiple smart devices, such as a hotel or other commercial establishment. As will be further understood, if a QuickSet is installed on the smart device, such as a television, then a code may be displayed to the owner to be validated, allowing access to the smart device.

For each example smart device, there are three states of operation, namely: factory default—either new or reset to default by an administrator (manufacturer, etc.) or the owner; configured but not associated with an owner—such as for instance during WiFi onboarding, installer setup, and/or WPS installation; or configured and associated with the owner. Further, for each user account, there may be various users of the smart device, namely: the owner, including a property manager if utilized in a professional setting; an installer; an additional user other than the owner, such as a family member, friend, authorized guest, etc.; or a new owner. In these instances, the following may be utilized for an authorization process.

TABLE 2

| User | Process | Factory Default | Configured-No Association | Configured-Yes Assciation |
|---|---|---|---|---|
| Owner | Claim Ownership | Through successful onboarding, such as WiFi, need physical possession verification | Through ownership pairing (e.g., URL) need physical possession verification | N/A |
| Owner | Share Control | N/A | N/A as app is not installed | Through share (e.g., URL) |
| Owner | Account Linking | N/A | Through OTP with OAUTH URL | |
| Owner | Control Devices | N/A | N/A as app is not installed | Full control, group and user friend name management |
| Owner | Manage shared controls | N/A | N/A | In the app-UI provided for the owner to manage shared controls |
| Owner | Manage Interop account linkings | N/A | N/A owner cannot manage links without app | In the app-UI provided for the owner to manage account linkings for interoperability. |
| Owner | Manage devices | N/A | N/A | In the app-UI provided for the owner to manage devices. |
| New Owner | Reclaim ownership | Through successful WiFi onboarding, need physical possession verification | Through ownership pairing (e.g., URL) need physical possession verification | Through successful WiFi onboarding, need physical possession verification if WiFi is different |
| Installer | Remove ownership mapping after installation | N/A | N/A | N/A |
| Family member/friend | Request control | N/A | Not supported | By click through shared URL sent by owner |

In one example virtual user account authorization process, on the companion mobile app of the smart device, the app starts up a determines whether the application is authorized via an access token and/or refresh token to access the cloud service. If the app determines that there is no access token and/or refresh token, the app will request a new set from the cloud service. The cloud service will them ensure that the user ID is unique and provide an access token or refresh token that links to the account. The mobile app accepts the provided token and stores it local to the smart device.

Because the virtual user account information is stored locally within the smart device, the account information will be lost if: the user deletes the mobile app; the user loses the phone; or the user changes the phone. When a virtual user account recovery process is needed, as disclosed a recovery process may be initiated. In one example, a user is forwarded a backup recovery URL to the user's recovery address that is associated with the account and typically provided when initiating the account. The provided URL is, in this example, a one time use URL provided to allow the user to claim the virtual user account back. As will be appreciated, the recovery address may be an email address of a phone number for texting and/or a voice call process. During the triggering of an account recovery process, the password associated with the account is reset to avoid saving user passwords and to enhance security.

In order to bind a virtual user account with the smart device, the following process is disclosed. In this example, the smart device participates in a WiFi onboarding process. During this process, the smart device utilizes a bootstrap step to confirm the mobile app located on the smart device is legitimate and once determined that it is a legitimate app, the app is configured. In one instance, the user can verify the app's legitimacy by a LED pattern displayed on the smart device and repetition of the displayed LED pattern by the user. If the LED pattern is successfully repeated, the WiFi onboarding process may be completed and the virtual user account associated with the smart device (e.g., the "NEVO BUTLER").

If the recovery URL is used by someone other than the owner, the owner will be locked out from the app. In this situation, another recovery URL can be sent to the same recovery address on file with the user such that is someone else used the previous URL, the owner could subsequently reobtain ownership.

Another layer of security is found in verifying that the user possesses physical access to the smart device. As detailed, one way to perform this verification is to use the LED pattern mentioned above. Other means include broadcasting a QR code, such as for example through ultra-sound, or scanning the LED pattern through a camera on the smart device (e.g., a phone camera). A user who cannot confirm possession through any suitable means cannot configure the smart device. Furthermore, confirmation of physical possession allows the authentication process to avoid determining whether the device is already bound with a specific virtual user account, thereby allowing a new owner to onboard the smart device and become the new owner.

In one example, every time the smart device goes through the WiFi onboarding successfully with a new virtual user account, the cloud backend will remove the privacy data associated with the smart device, including the associated smart device pairing information for interoperability, local databases for discovered devices, etc. The user shall be notified when they attempt to use a new virtual user account to do the WiFi onboarding so that the user understands the consequences of using a new virtual user account and may attempt to locate the original virtual user account. By purging privacy data, a new owner need not worry that someone else can still control the smart device through any previous interoperability pairings, etc. and the device is free to discover new interoperable devices as desired.

Because in some limited instances another user can access the smart device and possibly take ownership, in one example a different LED pattern may be displayed on the smart device to alert the user to a change in ownership. Also, when ownership changes, as noted above user control of various devices may be interrupted, thereby alerting the user to resent changes.

As will be appreciated, for users who do not use WiFi onboarding in the mobile app, to set up the smart device, a later process may be provided to allow the user to claim ownership of the smart device. In one example, a pairing process may be triggered by requesting the smart device to initialize ownership pairing. The authentication process will then provide a one-time password (OTP) code if the smart device is not already associated with an ownership account. The user will then follow the linking process from the mobile app and provide the OTP to the proper location (e.g., the webpage) to establish pairing.

In the example where control of the smart device is to be shared, in one instance the owner can generate a QR code with an invitation URL from the mobile app and when generating the code, the owner can provide a unique identifier (e.g. a share name, etc.) to allow the owner to track the authorization. By scanning and accessing the URL, the other user can accept the invitation and gain at least some control over the smart device. The OTP can be pushed to the smart device as a way of confirming the transaction. In this example, the URL is temporary and may be valid for a predetermined time, may be geo-fenced, etc.

For auditing purposes, the owner may be able to retrieve a listing of all current shared controls and owners and also manage them through any suitable means, including through the app. Additionally, to provide security, the other user (i.e., the other virtual user account) is not an owner of the smart device and cannot be allowed to access any setup features, or other ownership functions. Further, the owner can identify, control, and/or group which other device the other user may be allowed to control (i.e., only control a single television within a room, apartment, condominium, rental, etc.).

In still other examples, it will be appreciated that the owner may change, or otherwise need to transfer access to another mobile device and mobile app. In this instance, a user can retrieve the same virtual account when the mobile device changes. For example, in one instance the owner is allowed to show the new mobile app the current virtual user account, such as through a QR code, etc. In this instance it is beneficial, although not necessary, to enforce that the owner needs to validate the operation through any sufficient method outlines herein. In any event, upon verification of transfer, the user account and corresponding information regarding the smart device is transferred to the new mobile device without displaying, revealing, or otherwise jeopardizing security of the virtual user account.

In yet another instance, the owner may wish to remove or otherwise delete the smart device from the virtual user account. In one example, the owner can request or otherwise send a command to the server to unlink or otherwise unpair the smart device from the owner account. Upon unlinking the smart device, all user specific configurations within the smart device will be removed or otherwise disabled, including all interoperability pairings, WiFi SSID passwords, device databases, etc. For instances where the smart device is managed by a third-party, such as a service provider, an administrator of the device may request the smart device to be unlinked from the owner account, thereby resetting the smart device to an initial state (e.g., a factory rest).

For interoperability account linking records, in this example only the owner can list, manage, and/or review the records.

In an additional example, a user may wish to link their virtual user account with a third-party user account. In this example, the mobile app will support open authentication (OAUTH) based authentication processes and allow a user to login to the third-party account as desired. As will be understood, the user will be able to change the login method to use their third-party account and the mobile app will prompt the user for any login information as needed.

For additional security and/or privacy, the user may opt-in or opt-out of various data privacy processes, including purging privacy data associated during WiFi onboarding using different virtual user accounts. As can be understood, in most instances, this is sufficient but in the instance someone other than the original owner user may have physical access to the smart device and is associating it with a new virtual user account on their mobile device and the new user may elect to keep privacy data on the smart device. In this case, the original owner may be notified as desired.

While various concepts have been described in detail, it will be appreciated by those skilled in the art that various modifications and alternatives to those concepts could be developed in light of the overall teachings of the disclosure. For example, while the examples above may describe apps resident in a smart device, such as a phone or tablet, it will be appreciated that the teachings herein may be equally applicable to other app-capable device such as for example without limitation "smart" TVs, cable or satellite set top boxes, streaming video devices, home automation systems, and the like. Still further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer readable media having stored thereon instruction wherein the instructions, when executed by a smart device, cause the smart device to perform steps, comprising:
storing an information identifying a virtual user account that is associated with a user;
using the information identifying the virtual user account to retrieve from a cloud-server a one-time use code;
providing the one-time use code to a consumer electronic device;
receiving the one-time use code back from the consumer electronic device;
authenticating the one-time use code provided back from the consumer electronic device; and
in response to the one-time use code being authenticated, binding the smart device to the consumer electronic device whereupon the consumer electronic device is controllable through use of the smart device.

2. The non-transitory, computer readable media as recited in claim 1, wherein the binding to the consumer electronic device is temporary and expires after a predetermined time.

3. The non-transitory, computer readable media as recited in claim 1, wherein the binding to the consumer electronic device is geographically limited.

4. The non-transitory, computer readable media as recited in claim 3, wherein the one-time use code includes a geolocation of the consumer electronic device.

5. The non-transitory, computer readable media as recited in claim 1, wherein the instructions further allow the smart device to disassociate the virtual user account with the user.

6. The non-transitory, computer readable media as recited in claim 5, wherein the instructions further cause the smart device to unbind from the consumer electronic device when the smart device disassociates the virtual account with the user.

7. The non-transitory, computer readable media as recited in claim 5, wherein the instruction further cause the smart device to remove the stored information identifying the virtual user account when the smart device disassociates the virtual account with the user.

8. The non-transitory, computer readable media as recited in claim 7, wherein the instructions further cause the smart device to store information identifying another virtual user account different from the virtual user account and allow the smart device to associate the another virtual user account with another user.

* * * * *